US012539172B2

(12) United States Patent
Kim et al.

(10) Patent No.: US 12,539,172 B2
(45) Date of Patent: Feb. 3, 2026

(54) METHODS, SYSTEMS AND RELATED ASPECTS FOR OPTIMIZATION AND PLANNING OF CARDIAC SURGERY

(71) Applicants: THE JOHNS HOPKINS UNIVERSITY, Baltimore, MD (US); UNIVERSITY OF MARYLAND, College Park, MD (US); CHILDREN'S NATIONAL HOSPITAL, Washington, DC (US)

(72) Inventors: Byeol Kim, College Park, MD (US); Xiaolong Liu, College Park, MD (US); Axel Krieger, Alexandria, VA (US); Mark D. Fuge, College Park, MD (US); Phong Danh Nguyen, College Park, MD (US); Rachel Hess, College Park, MD (US); Pratham Vijay Nar, College Park, MD (US); Laura Olivieri, Washington, DC (US); Narutoshi Hibino, Baltimore, MD (US); Yue-Hin Loke, Washington, DC (US); Paige Mass, Washington, DC (US); Seda Aslan, Baltimore, MD (US)

( * ) Notice: Subject to any disclaimer, the term of this patent is extended or adjusted under 35 U.S.C. 154(b) by 459 days.

(21) Appl. No.: 17/906,798

(22) PCT Filed: Mar. 23, 2021

(86) PCT No.: PCT/US2021/023622
§ 371 (c)(1),
(2) Date: Sep. 20, 2022

(87) PCT Pub. No.: WO2021/195044
PCT Pub. Date: Sep. 30, 2021

(65) Prior Publication Data
US 2023/0157755 A1 May 25, 2023

Related U.S. Application Data

(60) Provisional application No. 63/107,886, filed on Oct. 30, 2020, provisional application No. 62/993,411, filed on Mar. 23, 2020.

(51) Int. Cl.
*A61B 34/10* (2016.01)
*G06T 7/149* (2017.01)
*G06T 19/20* (2011.01)

(52) U.S. Cl.
CPC .............. *A61B 34/10* (2016.02); *G06T 7/149* (2017.01); *G06T 19/20* (2013.01);
(Continued)

(58) Field of Classification Search
CPC ............................... G06T 7/149; G06T 19/20
See application file for complete search history.

(56) References Cited

U.S. PATENT DOCUMENTS 9,195,800 B2 * 11/2015 Grady .................... G16H 50/50
10,281,897 B2 * 5/2019 Di Cairano .......... G05B 19/106
(Continued)

OTHER PUBLICATIONS

Lyaskovsky, S. (Authorized officer), International Search Report and Written Opinion in corresponding International Application No. PCT/US2021/023622 mailed on Jun. 24, 2021, 12 pages.
(Continued)

*Primary Examiner* — John B Strege
(74) *Attorney, Agent, or Firm* — MH2 Technology Law Group LLP

(57) ABSTRACT

Provided herein are methods of generating optimized models of vascular grafts for subjects in certain embodiments. Methods of treating subjects in need of vascular grafts are also provided. Related systems and computer program products are additionally provided.

20 Claims, 36 Drawing Sheets

(52) U.S. Cl.
CPC ... *A61B 2034/102* (2016.02); *A61B 2034/108* (2016.02); *G06T 2207/10088* (2013.01); *G06T 2207/30104* (2013.01); *G06T 2219/2004* (2013.01)

(56) References Cited

U.S. PATENT DOCUMENTS

| | | | |
|---|---|---|---|
| 2009/0083680 A1* | 3/2009 | McConaghy | G06F 30/36 716/103 |
| 2016/0015505 A1 | 1/2016 | Johnson et al. | |
| 2016/0125161 A1* | 5/2016 | Sankaran | A61M 1/00 703/11 |
| 2017/0261949 A1* | 9/2017 | Hoffmann | G06N 7/01 |
| 2019/0240377 A1 | 8/2019 | Min et al. | |
| 2020/0008765 A1* | 1/2020 | Khan | A61B 6/032 |

OTHER PUBLICATIONS

Tang, X. (Authorized officer), International Preliminary Report on Patentability issued in corresponding International Application No. PCT/US2021/023622 mailed on Oct. 6, 2022, 8 pages.

\* cited by examiner

400

402 Parameterizing a model of a candidate vascular graft for the subject to produce a parameterized model of the candidate vascular graft 404 Generating surrogate models of hemodynamics of the parameterized model of the candidate vascular graft to produce at least one surrogate model of the parameterized model of the candidate vascular graft 406 Generating a constrained optimization from the surrogate models of the parameterized model of the candidate vascular graft 408 Identifying a set of globally optimal design parameters from the constrained optimization 410 Fabricating the vascular graft based at least in part on the set of globally optimal design parameters to produce a fabricated vascular graft 412 Implanting the fabricated vascular graft into the subject

FIG. 4

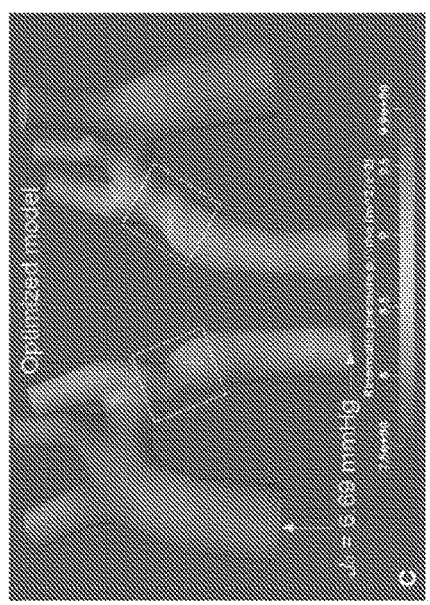
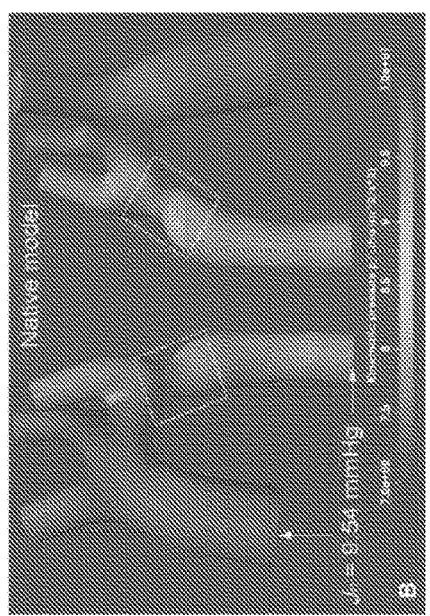
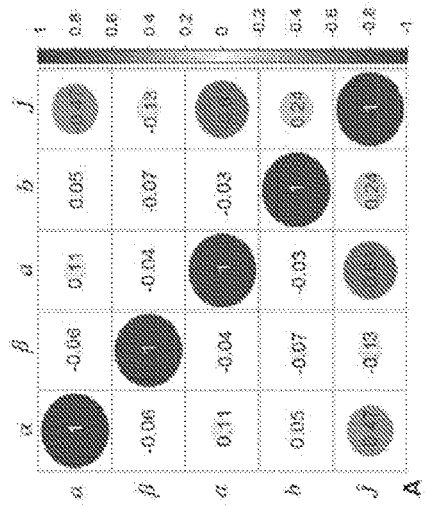
FIG. 26

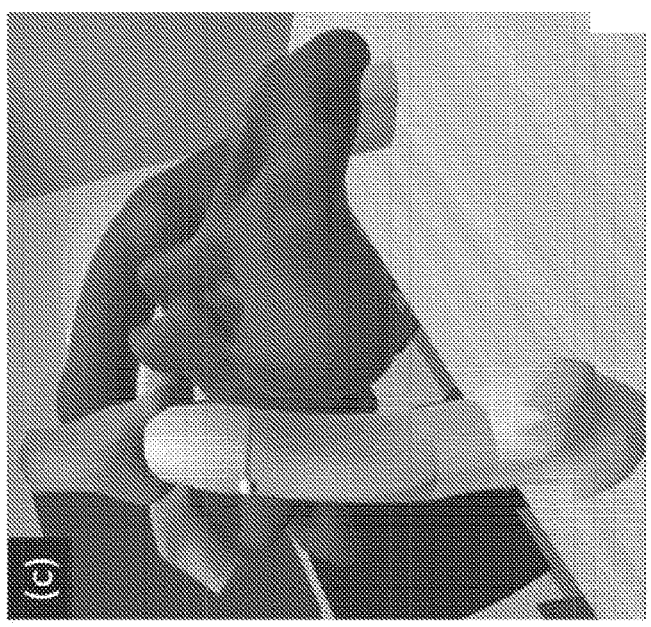
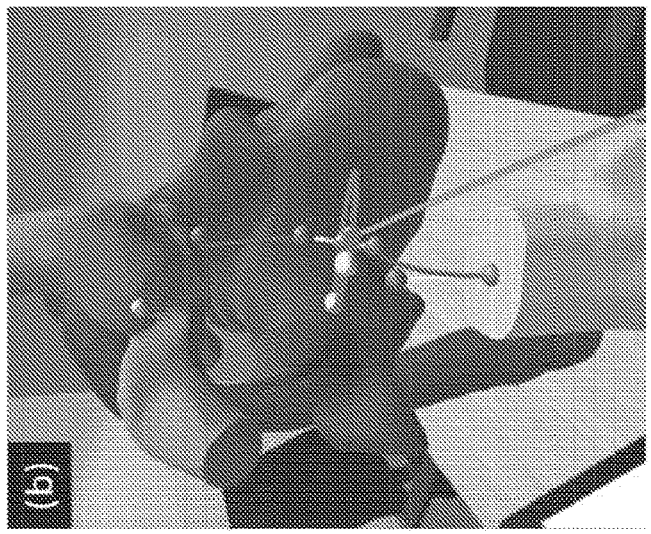
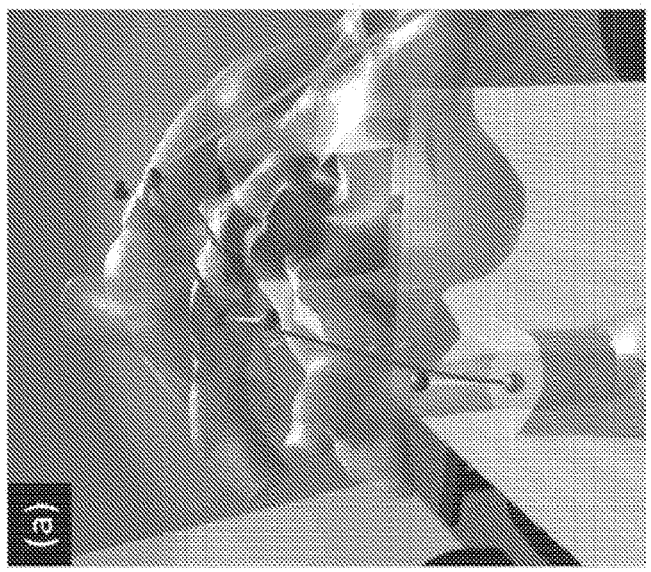
FIG. 29

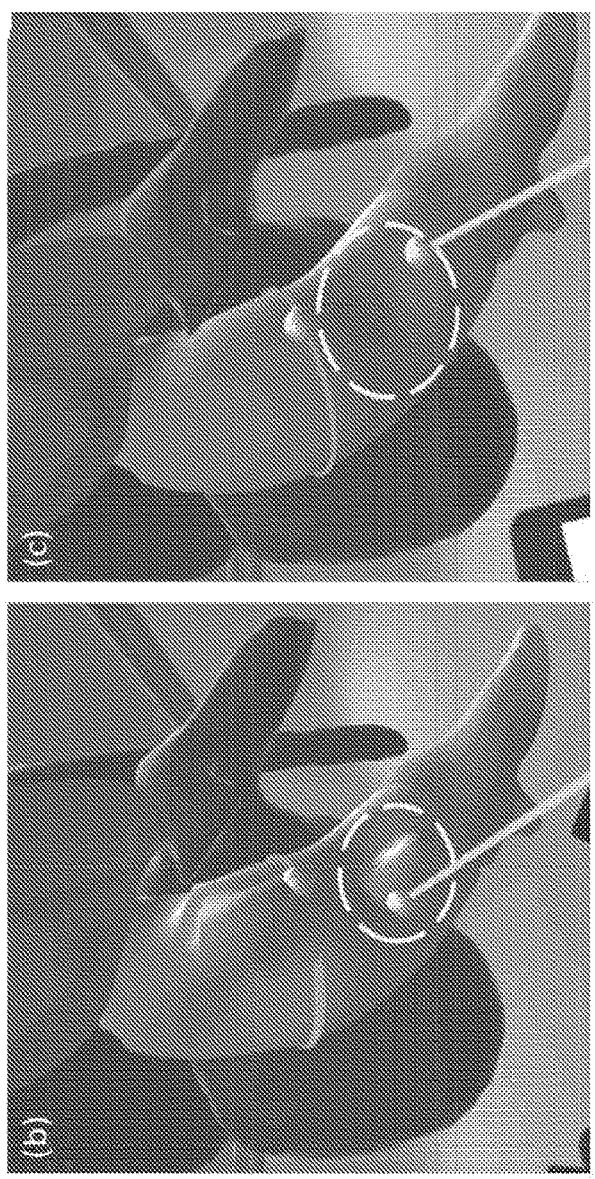
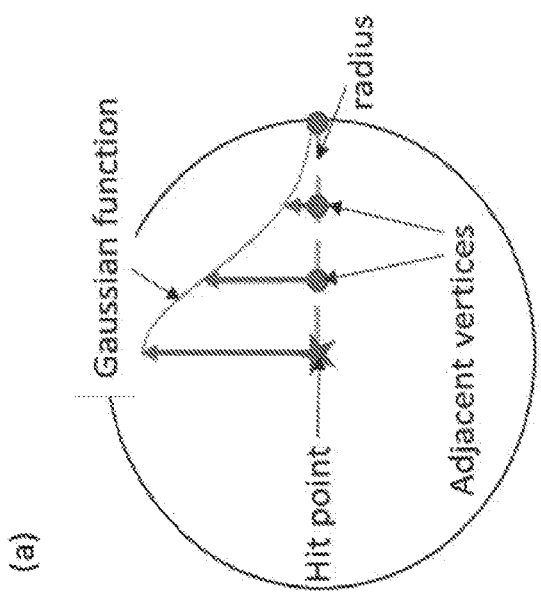
FIG. 30

METHODS, SYSTEMS AND RELATED ASPECTS FOR OPTIMIZATION AND PLANNING OF CARDIAC SURGERY

CROSS-REFERENCE TO RELATED APPLICATIONS

The present application is the national stage entry of International Patent Application No. PCT/US2021/023622, filed on Mar. 23, 2021, and published as WO 2021/195044 A1 on Sep. 30, 2021, which claims the benefit of priority of U.S. Provisional Application No. 62/993,411, filed on Mar. 23, 2020, and 63/107,886, filed Oct. 30, 2020, all of which are hereby incorporated by reference herein in their entireties.

STATEMENT OF GOVERNMENT SUPPORT

This invention was made with government support under grants NHLBI-R01 HL143468 and R21/R33HD090671 awarded by the National Institutes of Health. The government has certain rights in the invention.

BACKGROUND

An estimated 8 in 1000 babies are born with congenital heart disease (CHD). For the condition of single ventricle CHD, patients receive three stages of operations, to direct the deoxygenated blood outside the heart to the pulmonary artery, culminating in the Fontan procedure. The Fontan procedure has a 90% short term survival rate. However, the limitations of current synthetic grafts in shape, size, and growth potential introduce long term medical complications, increasing the morbidity rate. These limitations can be addressed by tissue engineered vascular grafts (TEVG), which is a clinically proven method where patient's native tissue, including collagen, vascular muscle, and endothelial cells, grow along the grafts over time. TEVG typically utilizes the 3D structure of the grafts for fabricating the scaffold using computer aided design (CAD). Its healthy hemodynamic performance is generally ensured through computational fluid dynamics (CFD) simulations.

A new set of design tools such as SURGEM and unconstrained clay modeling have been explored as CAD alternatives. SURGEM is a non-immersive virtual reality (VR) software that provides design parameters including graft's size, centerline, and anastomosis region on a tablet. Its interactive and easy setup have allowed surgeons to design Fontan grafts. However, SURGEM's strict design parameters permit users to only create cylindrical conduits, which limits the shape variability for meeting the needs of the patients. Despite the needs of understanding volumetric anatomical data of patients, SURGEM lacks the capability to provide depth perception. SURGEM is commercially unavailable and its performance against existing tools has not been compared. Unconstrained clay modeling uses 3D printed parts of patients' anatomies. On the 3D printed anatomies, a physician shapes clay into a desired graft structure, which is 3D scanned for CFD simulations. The unconstrained clay modeling method does not typically utilize training for creating designs, but since the method relies on 3D printed anatomies that are fixed in size, detailed and precise design modifications are a great challenge. Additionally, clay modeling design cannot be easily modified according to the CFD simulation results unless the clay has not been hardened.

Accordingly, there is a need for additional methods, and related aspects, for conducting pre-surgical three-dimensional (3D) planning and designing patient-specific hemodynamically-optimized vascular grafts.

SUMMARY

The present disclosure relates, in certain aspects, to methods, systems, and computer readable media of use in generating optimized models of vascular grafts for subjects. The present disclosure also provides methods, systems, and computer readable media that are useful in treating subjects that are in need of vascular grafts. These and other aspects will be apparent upon a complete review of the present disclosure, including the accompanying figures.

In one aspect, the present disclosure provides a method of generating an optimized model of a vascular graft for a subject at least partially using a computer. The method includes parameterizing, by the computer, at least one model of a candidate vascular graft for the subject to produce at least one parameterized model of the candidate vascular graft. The method also includes generating, by the computer, one or more surrogate models of hemodynamics of the parameterized model of the candidate vascular graft to produce at least one surrogate model of the parameterized model of the candidate vascular graft, and generating, by the computer, at least one constrained optimization from the surrogate models of the parameterized model of the candidate vascular graft. In addition, the method also includes identifying, by the computer, at least one set of globally optimal design parameters from the constrained optimization, thereby generating the optimized model of the vascular graft for the subject.

In another aspect, the present disclosure provides a method of generating an optimized vascular graft model for a subject at least partially using a computer. The method includes defining, by the computer, a design space for the vascular graft model, which design space comprises a set of design parameters and a set of pre-operative boundary conditions, and collecting, by the computer, a set of training data by sampling the design space and computing one or more hemodynamic simulations to produce one or more surrogate models. In addition, the method also includes performing, by the computer, at least one constrained optimization using the surrogate models, and determining, by the computer, at least one set of globally optimal design parameters from the constrained optimization, thereby generating the optimized vascular graft model for the subject.

In another aspect, the present disclosure provides a method of generating an optimized model of a vascular graft for a subject at least partially using a computer. The method includes obtaining, by the computer, at least one three-dimensional (3D) model of a native vascular geometry for the subject, and generating, by the computer, at least one 3D model of at least one cardiovascular surgical clamp. In addition, the method also includes producing, by the computer, one or more virtual cuts in the 3D model of the native vascular geometry at least proximal to the cardiovascular surgical clamp, and designing, by the computer, a vascular graft that optimizes hemodynamics between the virtual cuts in the 3D model of the native vascular geometry, thereby generating the optimized model of the vascular graft for the subject.

In another aspect, the present disclosure provides a method of treating a subject in need of a vascular graft at least partially using a computer. The method includes parameterizing, by the computer, at least one model of a candidate vascular graft for the subject to produce at least one parameterized model of the candidate vascular graft. The method also includes generating, by the computer, one or more surrogate models of hemodynamics of the parameterized model of the candidate vascular graft to produce at least one surrogate model of the parameterized model of the candidate vascular graft, and generating, by the computer, at least one constrained optimization from the surrogate models of the parameterized model of the candidate vascular graft. The method also includes identifying, by the computer, at least one set of globally optimal design parameters from the constrained optimization. In addition, the method also includes fabricating the vascular graft based at least in part on the set of globally optimal design parameters to produce a fabricated vascular graft, and implanting the fabricated vascular graft into the subject, thereby treating the subject in need of the vascular graft.

In another aspect, the present disclosure provides a method of generating an optimized model of a vascular graft for a subject at least partially using a computer. The method segmenting one or more images of native vascular anatomical structure and/or geometry for the subject to produce at least one three-dimensional (3D) model of the native vascular geometry for the subject, and smoothing one or more surfaces of the 3D model to produce a smoothed 3D model. The method also includes simulating, by the computer, blood flow inside the 3D model using computational fluid dynamics to determine one or more performance metrics selected from the group consisting of: power loss (e.g., indexed power loss (iPL)), pressure drop, flow distribution (e.g., hepatic flow distribution (HFD)), and wall shear stress (e.g., wall shear stress percentage (% WSS)) to produce performance metric results, and iterating one or more design modifications to the 3D model using one or more anatomical features of the subject and the performance metric results, thereby generating the optimized model of the vascular graft for the subject.

In another aspect, the present disclosure provides a method of generating an optimized model of a vascular graft for a subject at least partially using a computer. The method includes representing a shape of at least a portion of a non-optimized model of the vascular graft as two or more ellipses and/or circles at least at candidate anastomosis regions in the subject in a virtual reality environment, and connecting at least pairs of ellipses and/or circles to one another along a pathway between the candidate anastomosis regions in the subject in the virtual reality environment. The method also includes adjusting one or more aspects of one or more of the ellipses and/or circles and/or a mesh representation of the non-optimized model of the vascular graft based upon hemodynamic feedback data in the virtual reality environment, thereby generating the optimized model of the vascular graft for the subject.

In some embodiments, the methods disclosed herein include producing the surrogate models using at least one machine learning technique. In some of these embodiments, the machine learning technique comprises a Gaussian process regression. In some embodiments, the methods disclosed herein include introducing one or more uncertainty models into the design space and/or when performing the constrained optimization. In some embodiments of the methods disclosed herein, the set of design parameters comprises a graft geometry, a graft anastomosis location, and a graft anastomosis orientation. In some embodiments of the methods disclosed herein, the design space further comprises at least one uncertainty model of the graft anastomosis location (U1), at least one uncertainty model of the graft anastomosis orientation (U2), and at least one uncertainty model of the pre-operative boundary conditions (U3). In some embodiments, the methods disclosed herein include defining one or more blood flow boundary conditions (BCs) of the vascular graft model.

In some embodiments, the methods disclosed herein further include fabricating a vascular graft using the optimized vascular graft model to produce a fabricated vascular graft. In some of these embodiments, the methods further include implanting the fabricated vascular graft into the subject.

In some embodiments of the methods disclosed herein, the native vascular geometry comprises an ascending aorta, one or more aortic branches, an aortic arch, a descending aorta, a heart, an inferior vena cava, a superior vena cava, a brachiocephalic artery, at subclavian artery, a left pulmonary artery, a right pulmonary artery, and/or portion thereof. In some embodiments of the methods disclosed herein, the model of the vascular graft comprises a three-dimensional (3D) model. In some embodiments, the methods disclosed herein further include obtaining magnetic resonance angiography (MRA) data for a heart and vascular geometry of the subject, and/or phase-contrast MRI (PC-MRI) data of the subject for determining blood flow data for a computational fluid dynamics (CFD) simulation.

In some embodiments, the methods disclosed herein further include obtaining one or more images of one or more blood vessels of the subject to generate image data. In some of these embodiments, the image data comprises three-dimensional (3D) contrast-enhanced magnetic resonance angiography (MRA) data. In some embodiments, the methods disclosed herein include segmenting one or more images from the subject to produce the surrogate models of hemodynamics of the parameterized model of the candidate vascular graft.

In some embodiments, the methods disclosed herein include parameterizing the model of the candidate vascular graft using a plurality of parameters. In some of these embodiments, the plurality of parameters comprises a 10-dimensional design space $x=\{a, b, \alpha, \beta, \Delta L, D_{12}, v_1, v_2, \theta, D_{45}\} \in R^{10}$, where a and b comprise connection radii, $\alpha$ and $\beta$ comprise connections angles for the model of the candidate vascular graft, $\Delta L$ comprises an offset, $D_{12}$ is a first distance, $v_1$ is a Euclidean distance between two selected points, $v_2$ is a distance between two selected points, $\theta$ is an azimuth angle between a reference direction R and a direction of $v_1$, and $D_{45}$ is a second distance. In some of these embodiments, a is in a range of about $[-45°,45°]$, $\beta$ is in a range of about $[135°,180°]$, and $\theta$ is in a range of about $[0°,360°]$.

In some embodiments, the methods disclosed herein include performing one or more hemodynamic simulations to produce the surrogate model of the parameterized model of the candidate vascular graft. In some of these embodiments, the hemodynamics simulations comprise combining one or more native models and one or more candidate vascular graft models together to produce a full model. In some of these embodiments, the hemodynamics simulations comprise: generating separate surface meshes of the native models and the candidate vascular graft models to produce a set of surface meshes; combining the surface meshes to produce a combined surface mesh, generating at least one mesh for computational fluid dynamics (CFD) simulation, defining one or more boundary areas, and defining one or more % wall shear stress (WSS) measurement areas; and computing hemodynamics using the mesh to produce the surrogate model of the parameterized model of the candidate vascular graft. In some of the embodiments, the methods disclosed herein include evaluating hemodynamic performance of the model of the candidate vascular graft using one or more parameters selected from the group consisting of: indexed power loss (iPL), % WSS, and hepatic flow distribution (HFD).

In some embodiments, the methods disclosed herein include producing the surrogate model of the parameterized model of the candidate vascular graft using Algorithm 1. In some embodiments, the methods disclosed herein include generating one or more virtual pathways from a design space of the model of the candidate vascular graft; and eliminating at least one infeasible pathway. In some embodiments of the methods disclosed herein, the model of the candidate vascular graft comprises a model conduit-shaped graft or a model bifurcated Y-graft.

In another aspect, the present disclosure provides a system, comprising at least one controller that comprises, or is capable of accessing, computer readable media comprising non-transitory computer executable instructions which, when executed by at least one electronic processor, perform at least: parameterizing at least one model of a candidate vascular graft for a subject to produce at least one parameterized model of the candidate vascular graft; generating one or more surrogate models of hemodynamics of the parameterized model of the candidate vascular graft to produce at least one surrogate model of the parameterized model of the candidate vascular graft; generating at least one constrained optimization from the surrogate models of the parameterized model of the candidate vascular graft; and identifying at least one set of globally optimal design parameters from the constrained optimization.

In another aspect, the present disclosure provides a system, comprising at least one controller that comprises, or is capable of accessing, computer readable media comprising non-transitory computer executable instructions which, when executed by at least one electronic processor, perform at least: defining a design space for a vascular graft model, which design space comprises a set of design parameters and a set of pre-operative boundary conditions; collecting a set of training data by sampling the design space and computing one or more hemodynamic simulations to produce one or more surrogate models; performing at least one constrained optimization using the surrogate models; and determining at least one set of globally optimal design parameters from the constrained optimization.

In another aspect, the present disclosure provides a system, comprising at least one controller that comprises, or is capable of accessing, computer readable media comprising non-transitory computer executable instructions which, when executed by at least one electronic processor, perform at least: obtaining at least one three-dimensional (3D) model of a native vascular geometry for a subject; generating at least one 3D model of at least one cardiovascular surgical clamp; producing one or more virtual cuts in the 3D model of the native vascular geometry at least proximal to the cardiovascular surgical clamp; and designing a vascular graft that optimizes hemodynamics between the virtual cuts in the 3D model of the native vascular geometry.

In another aspect, the present disclosure provides a system, comprising at least one controller that comprises, or is capable of accessing, computer readable media comprising non-transitory computer executable instructions which, when executed by at least one electronic processor, perform at least: segmenting one or more images of native vascular anatomical structure and/or geometry for a subject to produce at least one three-dimensional (3D) model of the native vascular geometry for the subject; smoothing one or more surfaces of the 3D model to produce a smoothed 3D model; simulating blood flow inside the 3D model using computational fluid dynamics to determine one or more performance metrics selected from the group consisting of: power loss (e.g., indexed power loss (iPL)), pressure drop, flow distribution (e.g., hepatic flow distribution (HFD)), and wall shear stress (e.g., wall shear stress percentage (% WSS)) to produce performance metric results; and iterating one or more design modifications to the 3D model using one or more anatomical features of the subject and the performance metric results.

In another aspect, the present disclosure provides a system, comprising at least one controller that comprises, or is capable of accessing, computer readable media comprising non-transitory computer executable instructions which, when executed by at least one electronic processor, perform at least: representing a shape of at least a portion of a non-optimized model of a vascular graft as two or more ellipses and/or circles at least at candidate anastomosis regions in a subject in a virtual reality environment; connecting at least pairs of ellipses and/or circles to one another along a pathway between the candidate anastomosis regions in the subject in the virtual reality environment; and adjusting one or more aspects of one or more of the ellipses and/or circles and/or a mesh representation of the non-optimized model of the vascular graft based upon hemodynamic feedback data in the virtual reality environment.

In another aspect, the present disclosure provides a computer readable media comprising non-transitory computer executable instructions which, when executed by at least electronic processor, perform at least: parameterizing at least one model of a candidate vascular graft for a subject to produce at least one parameterized model of the candidate vascular graft; generating one or more surrogate models of hemodynamics of the parameterized model of the candidate vascular graft to produce at least one surrogate model of the parameterized model of the candidate vascular graft; generating at least one constrained optimization from the surrogate models of the parameterized model of the candidate vascular graft; and identifying at least one set of globally optimal design parameters from the constrained optimization.

In another aspect, the present disclosure provides a computer readable media comprising non-transitory computer executable instructions which, when executed by at least electronic processor, perform at least: defining a design space for a vascular graft model, which design space comprises a set of design parameters and a set of pre-operative boundary conditions; collecting a set of training data by sampling the design space and computing one or more hemodynamic simulations to produce one or more surrogate models; performing at least one constrained optimization using the surrogate models; and determining at least one set of globally optimal design parameters from the constrained optimization.

In another aspect, the present disclosure provides a computer readable media comprising non-transitory computer executable instructions which, when executed by at least electronic processor, perform at least: obtaining at least one three-dimensional (3D) model of a native vascular geometry for a subject; generating at least one 3D model of at least one cardiovascular surgical clamp; producing one or more virtual cuts in the 3D model of the native vascular geometry at least proximal to the cardiovascular surgical clamp; and designing a vascular graft that optimizes hemodynamics between the virtual cuts in the 3D model of the native vascular geometry.

In some embodiments of the systems or computer readable media disclosed herein, the instructions further perform at least: producing the surrogate models using at least one machine learning technique. In some of these embodiments, the machine learning technique comprises a Gaussian process regression. In some embodiments of the systems or computer readable media disclosed herein, the instructions further perform at least: introducing one or more uncertainty models into the design space and/or when performing the constrained optimization. In some embodiments of the systems or computer readable media disclosed herein, the set of design parameters comprises a graft geometry, a graft anastomosis location, and a graft anastomosis orientation.

In some embodiments of the system or computer readable media disclosed herein, the design space further comprises at least one uncertainty model of the graft anastomosis location (U1), at least one uncertainty model of the graft anastomosis orientation (U2), and at least one uncertainty model of the pre-operative boundary conditions (U3). In some embodiments of the systems or computer readable media disclosed herein, the instructions further perform at least: defining one or more blood flow boundary conditions (BCs) of the vascular graft model. In some embodiments of the system or computer readable media disclosed herein, the native vascular geometry comprises an ascending aorta, one or more aortic branches, an aortic arch, a descending aorta, a heart, an inferior vena cava, a superior vena cava, a brachiocephalic artery, at subclavian artery, a left pulmonary artery, a right pulmonary artery, and/or portion thereof. In some embodiments of the system or computer readable media disclosed herein, the model of the vascular graft comprises a three-dimensional (3D) model.

In some embodiments of the systems or computer readable media disclosed herein, the instructions further perform at least: obtaining magnetic resonance angiography (MRA) data for a heart and vascular geometry of the subject, and/or phase-contrast MRI (PC-MRI) data of the subject for determining blood flow data for a computational fluid dynamics (CFD) simulation. In some embodiments of the systems or computer readable media disclosed herein, the instructions further perform at least: obtaining one or more images of one or more blood vessels of the subject to generate image data. In some of these embodiments, the image data comprises three-dimensional (3D) contrast-enhanced magnetic resonance angiography (MRA) data. In some embodiments of the systems or computer readable media disclosed herein, the instructions further perform at least: segmenting one or more images from the subject to produce the surrogate models of hemodynamics of the parameterized model of the candidate vascular graft.

In some embodiments of the systems or computer readable media disclosed herein, the instructions further perform at least: parameterizing the model of the candidate vascular graft using a plurality of parameters. In some of these embodiments, the plurality of parameters comprises a 10-dimensional design space $x=\{a, b, \alpha, \beta, \Delta L, D_{12}, v_1, v_2, \theta, D_{45}\} \in R^{10}$, where a and b comprise connection radii, $\alpha$ and $\beta$ comprise connections angles for the model of the candidate vascular graft, $\Delta L$ comprises an offset, $D_{12}$ is a first distance, $v_1$ is a Euclidean distance between two selected points, $v_2$ is a distance between two selected points, $\theta$ is an azimuth angle between a reference direction R and a direction of $v_1$, and $D_{45}$ is a second distance. In some of these embodiments, $\alpha$ is in a range of about $[-45°, 45°]$, $\beta$ is in a range of about $[135°, 180°]$, and $\theta$ is in a range of about $[0°, 360°]$.

In some embodiments of the systems or computer readable media disclosed herein, the instructions further perform at least: performing one or more hemodynamic simulations to produce the surrogate model of the parameterized model of the candidate vascular graft. In some embodiments, the hemodynamics simulations comprise combining one or more native models and one or more candidate vascular graft models together to produce a full model. In some embodiments, the hemodynamics simulations comprise: generating separate surface meshes of the native models and the candidate vascular graft models to produce a set of surface meshes; combining the surface meshes to produce a combined surface mesh, generating at least one mesh for computational fluid dynamics (CFD) simulation, defining one or more boundary areas, and defining one or more % wall shear stress (WSS) measurement areas; and computing hemodynamics using the mesh to produce the surrogate model of the parameterized model of the candidate vascular graft. In some embodiments of the systems or computer readable media disclosed herein, the instructions further perform at least: evaluating hemodynamic performance of the model of the candidate vascular graft using one or more parameters selected from the group consisting of: indexed power loss (iPL), % WSS, and hepatic flow distribution (HFD).

In some embodiments of the systems or computer readable media disclosed herein, the instructions further perform at least: producing the surrogate model of the parameterized model of the candidate vascular graft using Algorithm 1. In some embodiments of the systems or computer readable media disclosed herein, the instructions further perform at least: generating one or more virtual pathways from a design space of the model of the candidate vascular graft; and eliminating at least one infeasible pathway. In some embodiments of the systems or computer readable media disclosed herein, the model of the candidate vascular graft comprises a model conduit-shaped graft or a model bifurcated Y-graft.

In another aspect, the present disclosure provides a method of generating a synthetic branched vascular conduit. The method includes identifying deepest points in concave regions on each side of a branch in a vascular conduit model that comprises at least one branch, and using the deepest points and/or a shape formed by the deepest points as a reference to segment an electrospinning mandrel into two or more mandrel segments. In addition, the method also includes attaching one or more handles to one or more of the mandrel segments, and forming the synthetic branched vascular conduit using the mandrel segments via an electrospinning process, thereby generating the synthetic branched vascular conduit.

BRIEF DESCRIPTION OF THE DRAWINGS

The accompanying drawings, which are incorporated in and constitute a part of this specification, illustrate certain embodiments, and together with the written description, serve to explain certain principles of the methods, systems, and related computer readable media disclosed herein. The description provided herein is better understood when read in conjunction with the accompanying drawings which are included by way of example and not by way of limitation. It will be understood that like reference numerals identify like components throughout the drawings, unless the context indicates otherwise. It will also be understood that some or all of the figures may be schematic representations for purposes of illustration and do not necessarily depict the actual relative sizes or locations of the elements shown.

FIG. 4 is a flow chart that schematically depicts exemplary method steps of treating a subject in need of a vascular graft according to some aspects disclosed herein.

FIG. 26 (Panels A-C) show design optimization results. (A) Correlation matrix of design parameters (α,β,a,b) and pressure drop $\hat{J}$. (B) Pressure field distribution on the native aortic model. (C) Pressure field distribution on the optimized aortic model.

FIG. 29 (Panels A-C) are screenshots of CorFix for adjusting (a) shape and size, (b) a centerline, and (c) final rendering of a patient specific Fontan conduit.

FIG. 30 (Panels A-C) are schematic and CorFix screenshots during Freeform Modeling: (a) mesh deformation diagram, (b) screenshot for pulling and (c) screenshot for pushing.

DEFINITIONS

Figure 1:
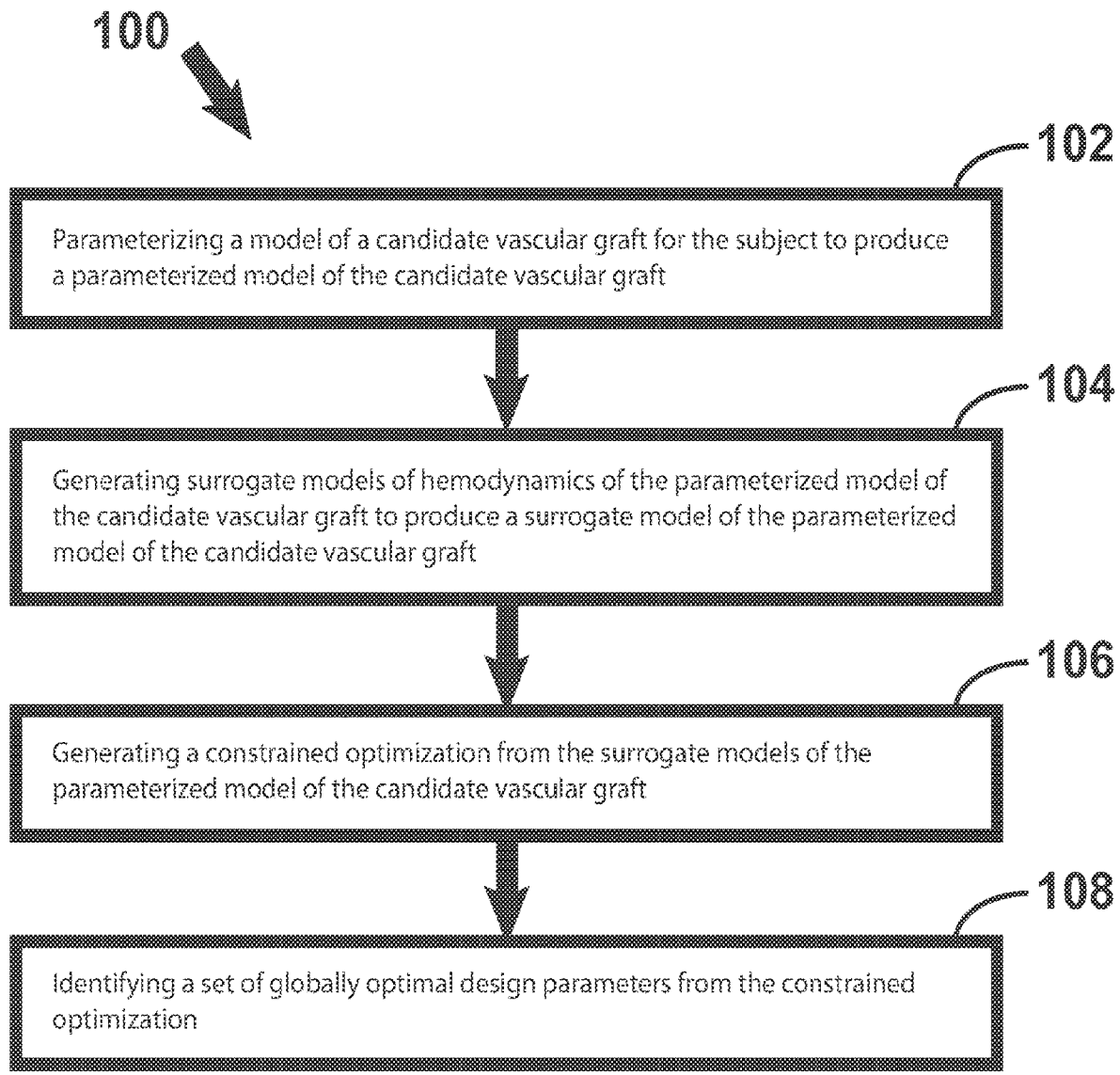
FIG. 1 is a flow chart that schematically depicts exemplary method steps of generating an optimized model of a vascular graft for a subject according to some aspects disclosed herein.

In order for the present disclosure to be more readily understood, certain terms are first defined below. Additional definitions for the following terms and other terms may be set forth through the specification. If a definition of a term set forth below is inconsistent with a definition in an application or patent that is incorporated by reference, the definition set forth in this application should be used to understand the meaning of the term.

As used in this specification and the appended claims, the singular forms "a," "an," and "the" include plural references unless the context clearly dictates otherwise. Thus, for example, a reference to "a method" includes one or more methods, and/or steps of the type described herein and/or which will become apparent to those persons skilled in the art upon reading this disclosure and so forth.

It is also to be understood that the terminology used herein is for the purpose of describing particular embodiments only and is not intended to be limiting. Further, unless defined otherwise, all technical and scientific terms used herein have the same meaning as commonly understood by one of ordinary skill in the art to which this disclosure pertains. In describing and claiming the methods, computer readable media, systems, and component parts, the following terminology, and grammatical variants thereof, will be used in accordance with the definitions set forth below.

About: As used herein, "about" or "approximately" or "substantially" as applied to one or more values or elements of interest, refers to a value or element that is similar to a stated reference value or element. In certain embodiments, the term "about" or "approximately" or "substantially" refers to a range of values or elements that falls within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value or element unless otherwise stated or otherwise evident from the context (except where such number would exceed 100% of a possible value or element).

Machine Learning Algorithm: As used herein, "machine learning algorithm" generally refers to an algorithm, executed by computer, that automates analytical model building, e.g., for clustering, classification or pattern recognition. Machine learning algorithms may be supervised or unsupervised. Learning algorithms include, for example, artificial neural networks (e.g., back propagation networks), discriminant analyses (e.g., Bayesian classifier or Fisher's analysis), support vector machines, decision trees (e.g., recursive partitioning processes such as CART—classification and regression trees, or random forests), linear classifiers (e.g., multiple linear regression (MLR), partial least squares (PLS) regression, and principal components regression), hierarchical clustering, and cluster analysis. A dataset on which a machine learning algorithm learns can be referred to as "training data." A model produced using a machine learning algorithm is generally referred to herein as a "machine learning model."

Subject: As used herein, "subject" or "test subject" refers to an animal, such as a mammalian species (e.g., human) or avian (e.g., bird) species. More specifically, a subject can be a vertebrate, e.g., a mammal such as a mouse, a primate, a simian or a human. Animals include farm animals (e.g., production cattle, dairy cattle, poultry, horses, pigs, and the like), sport animals, and companion animals (e.g., pets or support animals). A subject can be a healthy individual, an individual that has or is suspected of having a disease or pathology or a predisposition to the disease or pathology, or an individual that is in need of therapy or suspected of needing therapy. The terms "individual" or "patient" are intended to be interchangeable with "subject." A "reference subject" refers to a subject known to have or lack specific properties (e.g., known ocular or other pathology and/or the like).

DETAILED DESCRIPTION

The present disclosure relates generally to methods, systems, and computer readable media for optimizing the benefits of surgical procedures. In certain embodiments, the methods, systems, and computer readable media described herein are utilized to optimize cardiovascular surgery and the use of vascular grafts. In an example embodiment described herein, the methods, systems, and computer readable media may be utilized to conduct pre-surgical three-dimensional (3D) planning and design of a patient-specific hemodynamically-optimized vascular graft. Once such a graft has been generated and approved by a surgeon, the design can then be utilized during surgery to guide the surgeon and/or an implantable graft can be manufactured based on the optimized design using, for example, tissue engineering technologies.

By way of additional background, congenital heart disease (CHD) is inherently a disease involving fluid mechanics. Computational modeling/computational fluid dynamics (CFD), a staple feature in the aerodynamics industry, for example, stands to benefit clinicians by providing valuable insight into CHD, reducing uncertainty in decision making and personalizing surgical approaches for children, among other subjects. Computational modeling can improve the care of, for example, children with CHD, however, CFD research has not yet translated into broad clinical acceptance. This is a direct result of unintuitive graphic user interfaces in design software, and the fact that most surgical design processes are primarily operated by engineering teams. Most CFD methods have thus been relegated to retrospective post-hoc analysis, and current designs tools do not directly incorporate the best features of surgeons: surgeon experience, dexterity and intuition. Thus, engineered graft designs, even when fully optimized, lack the surgeon's full confidence in direct implementation. In the modern era of personalized medicine, the tool disclosed herein bridge the gap between computational modeling and clinical medicine, allowing surgeons to directly incorporate their unique understanding of surgical field (for example, surgical adhesions) into the design of grafts, as well as to directly receive the hemodynamic feedback generated by CFD. The tools disclosed herein combine the best of both worlds in engineering design and clinical experience, directly improving clinician confidence in CFD results and the outcomes of CHD surgery in children and other subjects. These and other aspects will be apparent upon a complete review of the present disclosure.

To illustrate, FIG. 1 is a flow chart that schematically depicts exemplary method steps of generating an optimized model of a vascular graft for a subject according to some embodiments. The methods disclosed herein are typically at least partially computer implemented. As shown, method 100 includes parameterizing at least one model of a candidate vascular graft for the subject to produce at least one parameterized model of the candidate vascular graft (step 102). Method 100 also includes generating one or more surrogate models of hemodynamics of the parameterized model of the candidate vascular graft to produce at least one surrogate model of the parameterized model of the candidate vascular graft (step 104), and generating at least one constrained optimization from the surrogate models of the parameterized model of the candidate vascular graft (step 106). In addition, method 100 also includes identifying at least one set of globally optimal design parameters from the constrained optimization (step 108).

Figure 2:
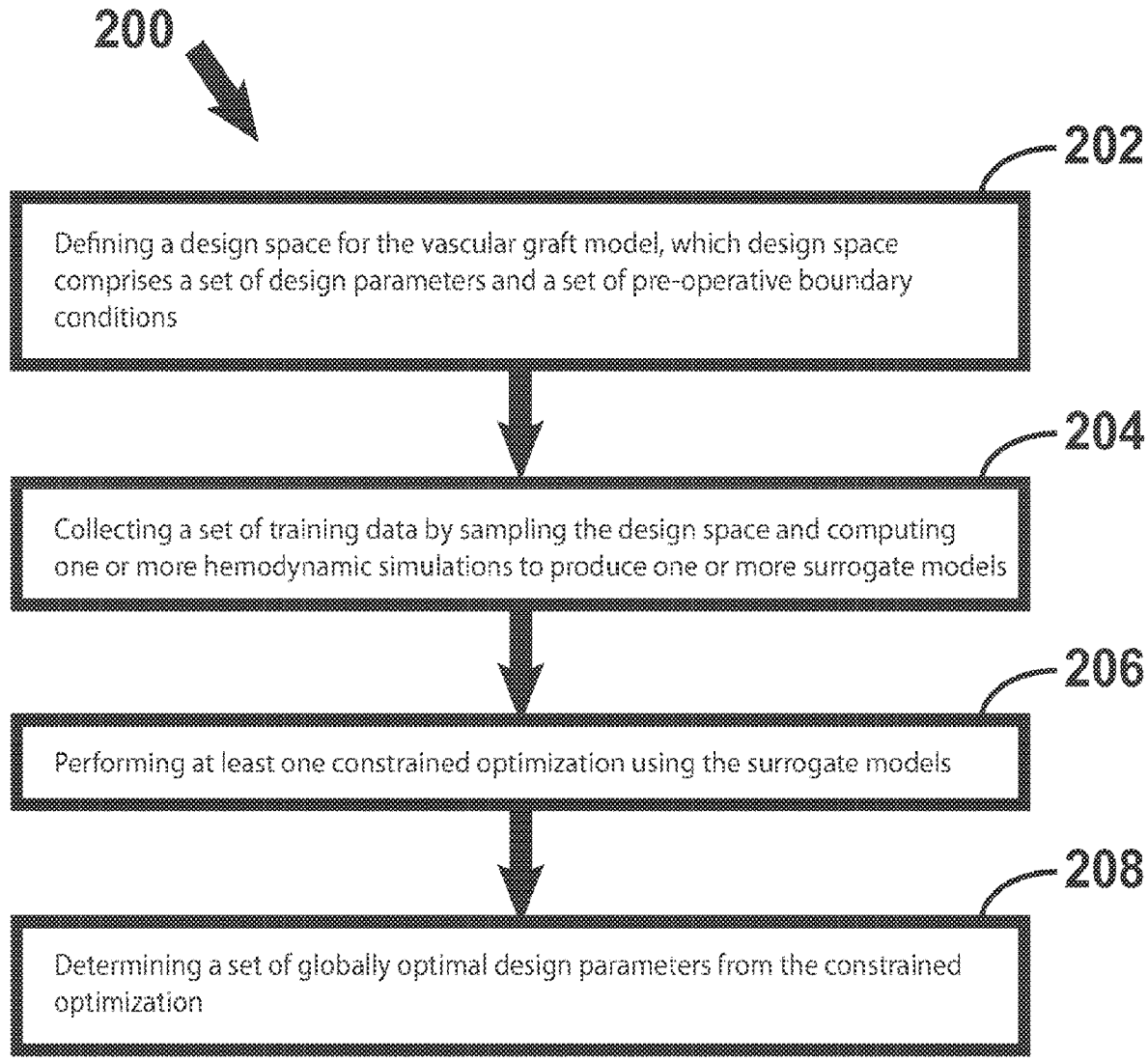
FIG. 2 is a flow chart that schematically depicts exemplary method steps of generating an optimized vascular graft model for a subject according to some aspects disclosed herein.

To further illustrate, FIG. 2 is a flow chart that schematically depicts exemplary method steps of generating an optimized model of a vascular graft for a subject according to some embodiments. As shown, method 200 includes defining a design space for the vascular graft model, which design space comprises a set of design parameters and a set of pre-operative boundary conditions (step 202), and collecting a set of training data by sampling the design space and computing one or more hemodynamic simulations to produce one or more surrogate models (step 204). In addition, method 200 also includes performing at least one constrained optimization using the surrogate models (step 206) and determining at least one set of globally optimal design parameters from the constrained optimization (step 208).

Figure 3:
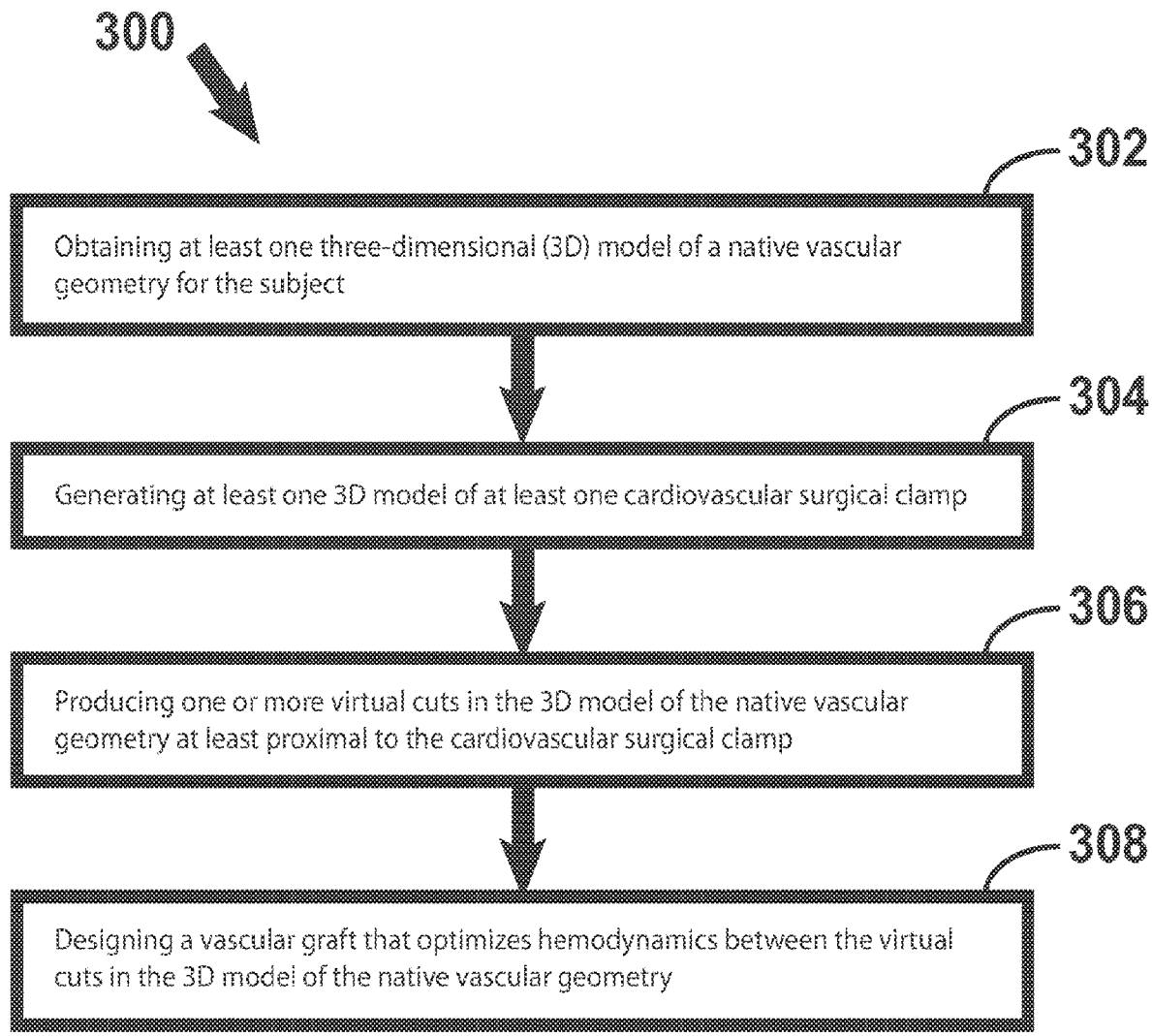
FIG. 3 is a flow chart that schematically depicts exemplary method steps of generating an optimized vascular graft model for a subject according to some aspects disclosed herein.

To further illustrate, FIG. 3 is a flow chart that schematically depicts exemplary method steps of generating an optimized model of a vascular graft for a subject according to some embodiments. As shown, method 300 includes obtaining at least one three-dimensional (3D) model of a native vascular geometry for the subject (step 302), and generating at least one 3D model of at least one cardiovascular surgical clamp (step 304). In addition, method 300 also includes producing one or more virtual cuts in the 3D model of the native vascular geometry at least proximal to the cardiovascular surgical clamp (step 306), and designing a vascular graft that optimizes hemodynamics between the virtual cuts in the 3D model of the native vascular geometry (step 308).

To further illustrate, FIG. 4 is a flow chart that schematically depicts exemplary method steps of treating a subject in need of a vascular graft according to some embodiments. As shown, method 400 includes parameterizing at least one model of a candidate vascular graft for the subject to produce at least one parameterized model of the candidate vascular graft (step 402). Method 400 also includes generating one or more surrogate models of hemodynamics of the parameterized model of the candidate vascular graft to produce at least one surrogate model of the parameterized model of the candidate vascular graft (step 404) and generating at least one constrained optimization from the surrogate models of the parameterized model of the candidate vascular graft (step 406). Method 400 also includes identifying at least one set of globally optimal design parameters from the constrained optimization (step 408). In addition, method 400 also includes fabricating the vascular graft based at least in part on the set of globally optimal design parameters to produce a fabricated vascular graft (step 410), and implanting the fabricated vascular graft into the subject (step 412). Various techniques for fabricating vascular grafts are disclosed herein or otherwise known to those of ordinary skill in the art.

Figure 5:
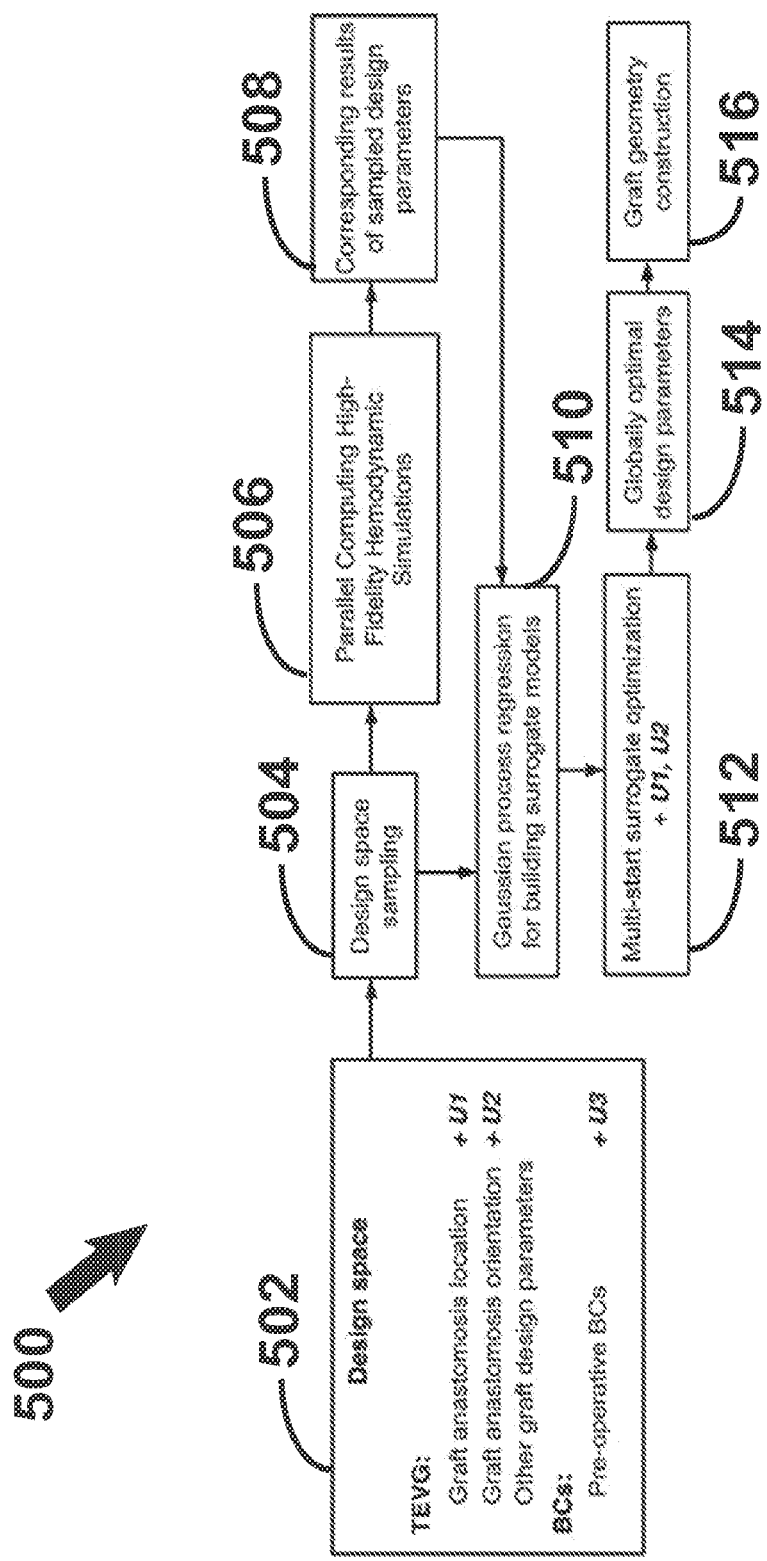
FIG. 5 is a flow chart that schematically depicts exemplary computation framework for robust automatic vascular graft optimization according to some aspects disclosed herein.

Typically, the automatic optimization of tissue engineered vascular grafts or any other manual virtual surgical planning all reply on specifying blood flow boundary conditions (BCs) of patient-specific models by assuming that the post-operative boundary conditions are identical to the pre-operative boundary conditions. Clinical studies show certain discrepancies between the pre-operative and post-operative BCs, which will affect the optimized vascular graft's hemodynamic performance. In addition, there will be displacements of anastomosis between the pre-operative planned location and the real surgical sutured location. It will be another significant source to degrade the performance of automatically optimized vascular grafts. In order to compensate these uncertainties and provide more robust vascular graft design optimization results, an automatic optimization framework 500 for robustly designing patient-specific vascular grafts is further illustrated in FIG. 5.

In this exemplary embodiment, the design space 502 consists of two parts: (1) design parameters of graft geometry, anastomosis location and orientation, (2) the pre-operative boundary conditions. U1, U2, and U3 represent uncertainty models of graft anastomosis location, orientation, and BCs respectively. By sampling the design space 504 and parallelly computing the high-fidelity hemodynamic simulations 506, training data are collected to building surrogate models based on Gaussian process regression 508, 510. Multi-start constrained optimization is performed by using the surrogate models 512. In this exemplary embodiment, there are two ways to introduce the uncertainty of graft anastomosis: (1) introducing U1, U2, in the design space, (2) introducing U1, U2 in the formulation of the constrained optimization. The globally optimized design parameters can thus be well-informed by the uncertainties of the boundary conditions and anastomosis errors 514 and used for graft geometry construction 516.

Some embodiments of the present disclosure provide for patient-specific graft design to, for example, repair hypoplastic aortic arch and coarctation. In some of these embodiments, surgical planning of hypoplastic aortic arch and coarctation repair includes following steps: (1) obtaining a 3D model of native aorta geometry including ascending aorta, supra-aortic branches, and descending aorta; (2) generating 3D CAD model of cardiovascular surgical clamp; (3) placing the clamp in the aortic arch distal to brachiocephalic artery or left subclavian artery; (4) making a virtual cut to separate lower part of the aortic arch and another cut to separate narrowed part of the descending aorta from native geometry; and (5) designing the shape of a patient-specific graft that repairs hypoplastic aortic arch and coarctation together, and optimizes hemodynamics.

In some of these embodiments, two different graft designs can be created based on aortic abnormality, namely, tubular graft design with patch-like extension and branched aorta graft design:

Tubular graft with patch-like extension: After converting the STL format of the geometry to solid part using Solidworks 2019 CAD software (Waltham, MA), a frontal midplane is created at the aortic arch and the selected surgical clamp based on its size, shape, and aorta anatomy is placed. A virtual cut is performed to detach the lower part of the aortic arch by using a sketch on the midplane that starts 1 mm away from the edge of the clamp and ends distal to left subclavian artery. To detach the narrowed part (coarctation) distal to aortic arch, another frontal plane in the middle of descending aorta is generated and a line is sketched on this plane to split the geometry.

Figure 6:
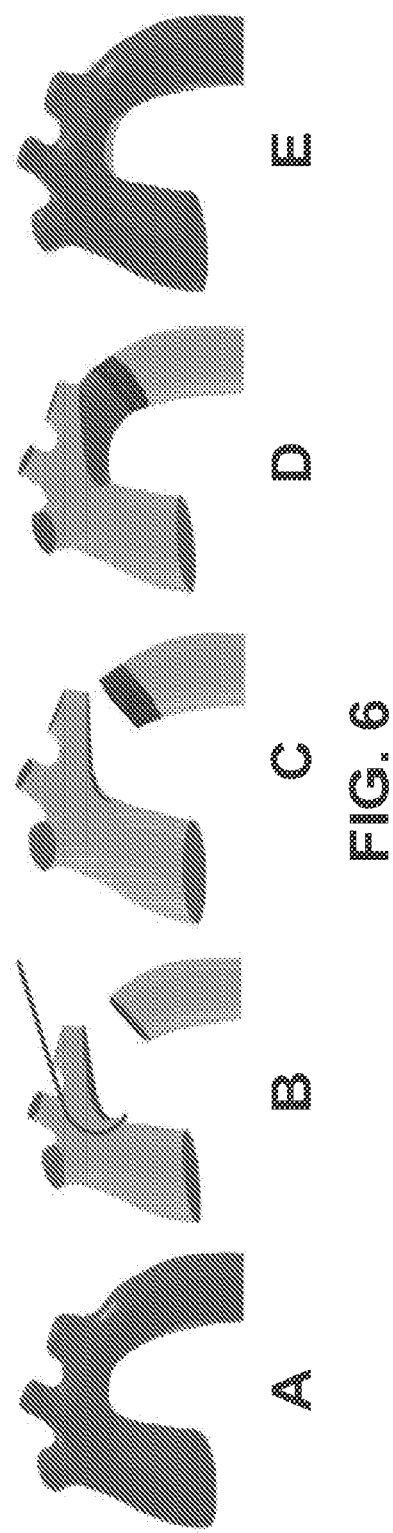
FIG. 6 (Panels A-E) is schematically depicts exemplary method steps of generating an optimized vascular graft model according to some aspects disclosed herein. A. 3D geometry of native aorta, B. aorta is clamped and lower part of hypoplastic arch and coarctation are cut and removed, C. tubular part of the graft is generated using solid loft, D. patch-like part is generated using surface loft and connected to tubular part, and E. designed graft is superimposed onto native aorta FIG. 7 (Panels A-E) is schematically depicts exemplary method steps of generating an optimized vascular graft model according to some aspects disclosed herein. A. 3D geometry of native aorta, B. aorta is clamped abnormal part of the aorta is removed, C. tubular part of the graft is generated using solid loft, D. branched part is generated using surface loft and fill and connected to tubular part, and E. designed graft is superimposed onto native aorta.

Tubular part of the graft is created using solid loft that follows upper and lower guide curves. Each of these guide curves are generated using three-point arch feature in Solidworks. To create the patch-like part of the graft that extends to the aortic arch, surface loft is used with an end constraint that is normal to the profile at the tubular end. The length and the angle of the normal vector are varied to obtain desired shape and diameter that optimizes hemodynamics in aorta. The steps of creation of tubular graft with patch-like extension are shown in FIG. 6.

Figure 7:
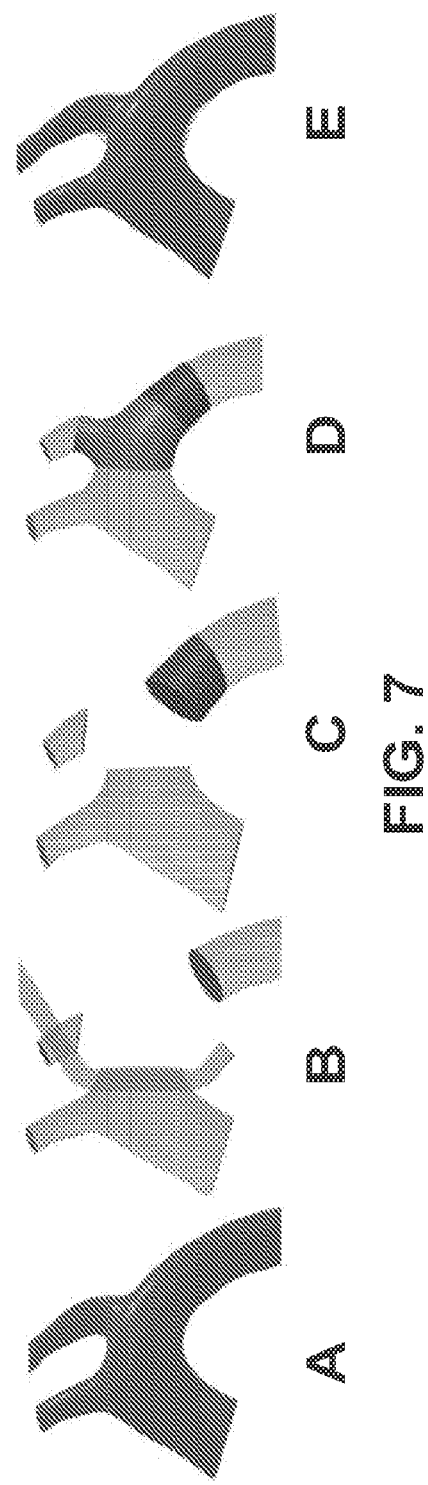

Branched aorta graft Tubular part in descending aorta was created using the steps explained above. Connecting the branch to aortic arch and to tubular part is done by using surface loft feature in Solidworks. After cutting the vessels, native profiles at the cross sections are divided into four segments using split feature and extruded 5 mm. First, the lower surfaces of arch and tubular graft are connected using surface loft feature. Then, the upper surfaces of the arch and tubular graft are connected to the side surfaces of the branch using surface loft. Finally, the front and back surfaces are generated using surface fill. Surface loft and fill operations are performed with tangential start and end constraints that are controlled by the length of the tangential vectors. Then, knit feature is used to fill the gaps between surfaces. The open surfaces of branch, arch, and tubular graft are filled, and all surfaces are converted to one solid part. Finally, 5 mm extrusions that are added in the beginning of the process are removed. The steps of creation of the branched descending aorta graft are shown in FIG. 7.

Certain embodiments of the present disclosure may lead to a one-stop virtual reality (VR) cardiac surgical planning system for cardiovascular disease diagnosis, vascular graft design, and automatic optimization. In some embodiments, these tools for creating patient-specific hemodynamically-optimized vascular grafts utilize an innovative design and workflow that combine user-friendly interaction interfaces, intuitive vascular graft modeling methods, embedded hemodynamic computations, and automatic graft geometry optimizations.

To further illustrate, certain embodiments of the computational framework for optimizing the graft model includes three main components: 1) a free-form deformation technique exploring graft geometries, 2) high-fidelity computational fluid dynamics simulations for collecting data on the effects of conduit design parameters on objective function values like energy loss, HFD and WSS, and 3) employing machine learning methods to develop a surrogate model for predicting results of high-fidelity simulations. The globally optimal design parameters are then computed by using multi-start conjugate gradient optimization on the surrogate model. A hemodynamically-optimized graft model can thus be generated by using the globally optimal design parameters. Surgeons can review the optimized conduit with options of acceptance and rejection. If the optimized graft is accepted, the 3D geometry of the conduit can be exported as a visual guide for surgery or 3D printed and manufactured as TEVG. If the optimized graft is rejected, surgeons can refine the conduit model and re-do the conduit optimization.

In some embodiments, the methods disclosed herein include producing the surrogate models using machine learning techniques. In some of these embodiments, the machine learning techniques include Gaussian process regression. In some embodiments, the methods of the present disclosure include introducing one or more uncertainty models into the design space and/or when performing the constrained optimization. In some embodiments of the methods disclosed herein, the set of design parameters comprises a graft geometry, a graft anastomosis location, and a graft anastomosis orientation. In some embodiments of the methods disclosed herein, the design space further includes at least one uncertainty model of the graft anastomosis location (U1), at least one uncertainty model of the graft anastomosis orientation (U2), and at least one uncertainty model of the pre-operative boundary conditions (U3). In some embodiments, the methods disclosed herein include defining one or more blood flow boundary conditions (BCs) of the vascular graft model.

In some embodiments, the methods disclosed herein further include fabricating a vascular graft using the optimized vascular graft model to produce a fabricated vascular graft. Various techniques are optionally used for manufacturing of patient-specific grafts. Some of these include 3D printing mandrels, and collecting electrospun nanofibers, such as poly(L-lactic acid) (PLLA) and poly(ε-caprolactone) (PCL) on the mandrels to form the patient-specific TEVGs. In some of these embodiments, the methods further include implanting the fabricated vascular graft into the subject.

In some embodiments of the methods disclosed herein, the native vascular geometry comprises an ascending aorta, one or more aortic branches, an aortic arch, a descending aorta, a heart, an inferior vena cava, a superior vena cava, a brachiocephalic artery, at subclavian artery, a left pulmonary artery, a right pulmonary artery, and/or portion thereof. In some embodiments of the methods disclosed herein, the model of the vascular graft comprises a three-dimensional (3D) model. In some embodiments, the methods disclosed herein further include obtaining magnetic resonance angiography (MRA) data for a heart and vascular geometry of the subject, and/or phase-contrast MRI (PC-MRI) data of the subject for determining blood flow data for a computational fluid dynamics (CFD) simulation.

In some embodiments, the methods disclosed herein further include obtaining one or more images of one or more blood vessels of the subject to generate image data. In some of these embodiments, the image data comprises three-dimensional (3D) contrast-enhanced magnetic resonance angiography (MRA) data. In some embodiments, the methods disclosed herein include segmenting one or more images from the subject to produce the surrogate models of hemodynamics of the parameterized model of the candidate vascular graft.

In some embodiments, the methods disclosed herein include parameterizing the model of the candidate vascular graft using a plurality of parameters. In some of these embodiments, the plurality of parameters comprises a 10-dimensional design space $x=\{a, b, \alpha, \beta, \Delta L, D_{12}, v_1, v_2, \theta, D_{45}\} \in R^{10}$, where a and b comprise connection radii, $\alpha$ and $\beta$ comprise connections angles for the model of the candidate vascular graft, $\Delta L$ comprises an offset, $D_{12}$ is a first distance, $v_1$ is a Euclidean distance between two selected points, $v_2$ is a distance between two selected points, $\theta$ is an azimuth angle between a reference direction R and a direction of $v_1$, and $D_{45}$ is a second distance. In some of these embodiments, $\alpha$ is in a range of about $[-45°, 45°]$, $\beta$ is in a range of about $[135°, 180°]$, and $\theta$ is in a range of about $[0°, 360°]$.

In some embodiments, the methods disclosed herein include performing one or more hemodynamic simulations to produce the surrogate model of the parameterized model of the candidate vascular graft. In some of these embodiments, the hemodynamics simulations comprise combining one or more native models and one or more candidate vascular graft models together to produce a full model. In some of these embodiments, the hemodynamics simulations comprise: generating separate surface meshes of the native models and the candidate vascular graft models to produce a set of surface meshes; combining the surface meshes to produce a combined surface mesh, generating at least one mesh for computational fluid dynamics (CFD) simulation, defining one or more boundary areas, and defining one or more % wall shear stress (WSS) measurement areas; and computing hemodynamics using the mesh to produce the surrogate model of the parameterized model of the candidate vascular graft. In some of the embodiments, the methods disclosed herein include evaluating hemodynamic performance of the model of the candidate vascular graft using one or more parameters selected from the group consisting of: indexed power loss (iPL), % WSS, and hepatic flow distribution (HFD).

In some embodiments, the methods disclosed herein include producing the surrogate model of the parameterized model of the candidate vascular graft using Algorithm 1, as disclosed herein. In some embodiments, the methods disclosed herein include generating one or more virtual pathways from a design space of the model of the candidate vascular graft; and eliminating at least one infeasible pathway. In some embodiments of the methods disclosed herein, the model of the candidate vascular graft comprises a model conduit-shaped graft or a model bifurcated Y-graft.

Figure 8:
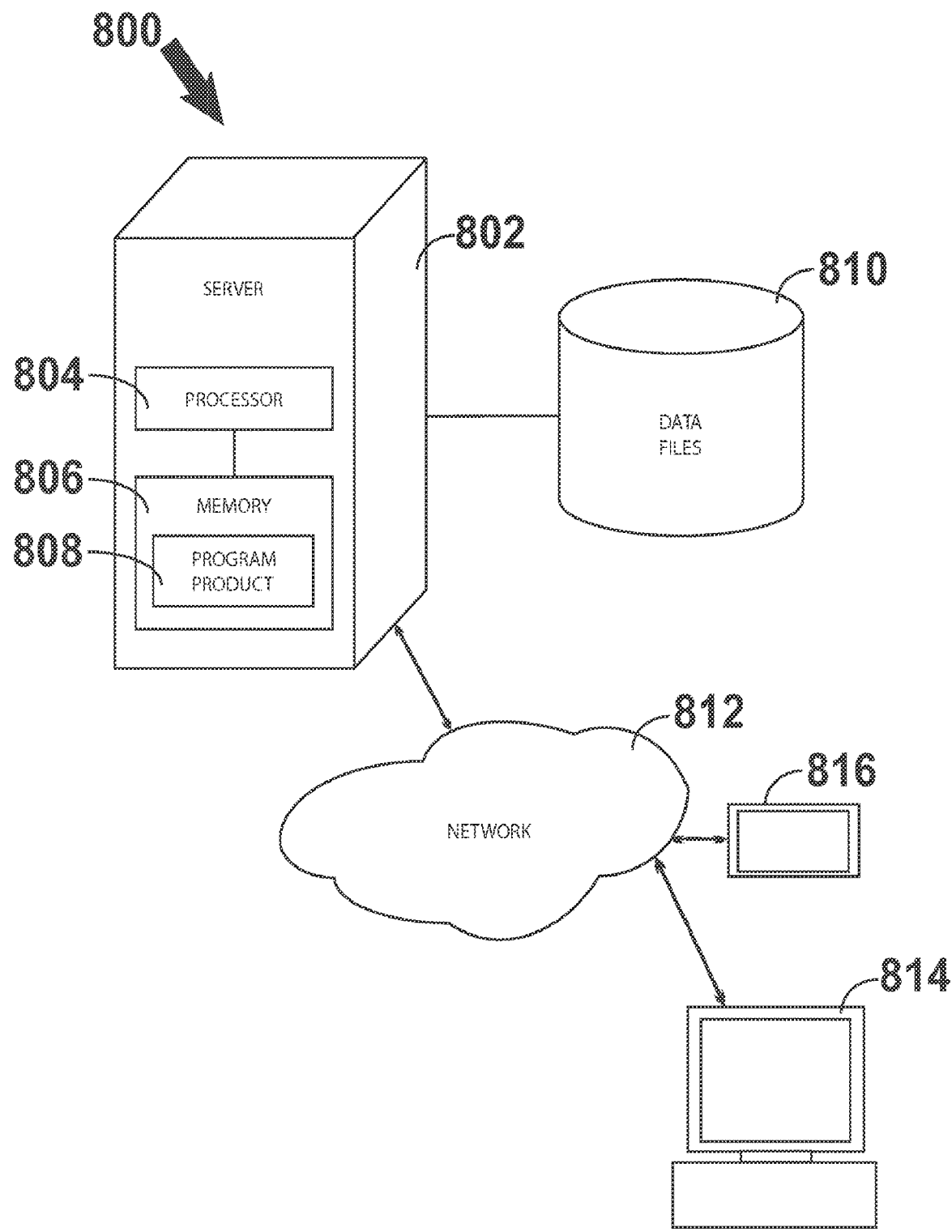
FIG. 8 is a schematic diagram of an exemplary system suitable for use with certain aspects disclosed herein.

The present disclosure also provides various systems and computer program products or machine readable media. In some aspects, for example, the methods described herein are optionally performed or facilitated at least in part using systems, distributed computing hardware and applications (e.g., cloud computing services), electronic communication networks, communication interfaces, computer program products, machine readable media, electronic storage media, software (e.g., machine-executable code or logic instructions) and/or the like. To illustrate, FIG. 8 provides a schematic diagram of an exemplary system suitable for use with implementing at least aspects of the methods disclosed in this application. As shown, system 800 includes at least one controller or computer, e.g., server 802 (e.g., a search engine server), which includes processor 804 and memory, storage device, or memory component 806, and one or more other communication devices 814, 816, (e.g., client-side computer terminals, telephones, tablets, laptops, other mobile devices, etc. (e.g., for receiving optimized vascular graft designs for further analysis, etc.)) positioned remote from camera device 818, and in communication with the remote server 802, through electronic communication network 812, such as the Internet or other internetwork. Communication devices 814, 816 typically include an electronic display (e.g., an internet enabled computer or the like) in communication with, e.g., server 802 computer over network 812 in which the electronic display comprises a user interface (e.g., a graphical user interface (GUI), a web-based user interface, and/or the like) for displaying results upon implementing the methods described herein. In certain aspects, communication networks also encompass the physical transfer of data from one location to another, for example, using a hard drive, thumb drive, or other data storage mechanism. System 800 also includes program product 808 (e.g., related to implementing a method of generating an optimized model of a vascular graft for a subject as described herein) stored on a computer or machine readable medium, such as, for example, one or more of various types of memory, such as memory 806 of server 802, that is readable by the server 802, to facilitate, for example, a guided search application or other executable by one or more other communication devices, such as 814 (schematically shown as a desktop or personal computer). In some aspects, system 800 optionally also includes at least one database server, such as, for example, server 810 associated with an online website having data stored thereon (e.g., entries corresponding to medical image data, etc.) searchable either directly or through search engine server 802. System 800 optionally also includes one or more other servers positioned remotely from server 802, each of which are optionally associated with one or more database servers 810 located remotely or located local to each of the other servers. The other servers can beneficially provide service to geographically remote users and enhance geographically distributed operations.

As understood by those of ordinary skill in the art, memory 806 of the server 802 optionally includes volatile and/or nonvolatile memory including, for example, RAM, ROM, and magnetic or optical disks, among others. It is also understood by those of ordinary skill in the art that although illustrated as a single server, the illustrated configuration of server 802 is given only by way of example and that other types of servers or computers configured according to various other methodologies or architectures can also be used. Server 802 shown schematically in FIG. 8, represents a server or server cluster or server farm and is not limited to any individual physical server. The server site may be deployed as a server farm or server cluster managed by a server hosting provider. The number of servers and their architecture and configuration may be increased based on usage, demand and capacity requirements for the system 800. As also understood by those of ordinary skill in the art, other user communication devices 814, 816 in these aspects, for example, can be a laptop, desktop, tablet, personal digital assistant (PDA), cell phone, server, or other types of computers. As known and understood by those of ordinary skill in the art, network 812 can include an internet, intranet, a telecommunication network, an extranet, or world wide web of a plurality of computers/servers in communication with one or more other computers through a communication network, and/or portions of a local or other area network.

As further understood by those of ordinary skill in the art, exemplary program product or machine readable medium 808 is optionally in the form of microcode, programs, cloud computing format, routines, and/or symbolic languages that provide one or more sets of ordered operations that control the functioning of the hardware and direct its operation. Program product 808, according to an exemplary aspect, also need not reside in its entirety in volatile memory, but can be selectively loaded, as necessary, according to various methodologies as known and understood by those of ordinary skill in the art.

As further understood by those of ordinary skill in the art, the term "computer-readable medium" or "machine-readable medium" refers to any medium that participates in providing instructions to a processor for execution. To illustrate, the term "computer-readable medium" or "machine-readable medium" encompasses distribution media, cloud computing formats, intermediate storage media, execution memory of a computer, and any other medium or device capable of storing program product 808 implementing the functionality or processes of various aspects of the present disclosure, for example, for reading by a computer. A "computer-readable medium" or "machine-readable medium" may take many forms, including but not limited to, non-volatile media, volatile media, and transmission media. Non-volatile media includes, for example, optical or magnetic disks. Volatile media includes dynamic memory, such as the main memory of a given system. Transmission media includes coaxial cables, copper wire and fiber optics, including the wires that comprise a bus. Transmission media can also take the form of acoustic or light waves, such as those generated during radio wave and infrared data communications, among others. Exemplary forms of computer-readable media include a floppy disk, a flexible disk, hard disk, magnetic tape, a flash drive, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave, or any other medium from which a computer can read.

Program product 808 is optionally copied from the computer-readable medium to a hard disk or a similar intermediate storage medium. When program product 808, or portions thereof, are to be run, it is optionally loaded from their distribution medium, their intermediate storage medium, or the like into the execution memory of one or more computers, configuring the computer(s) to act in accordance with the functionality or method of various aspects. All such operations are well known to those of ordinary skill in the art of, for example, computer systems.

To further illustrate, in certain aspects, this application provides systems that include one or more processors, and one or more memory components in communication with the processor. The memory component typically includes one or more instructions that, when executed, cause the processor to provide information that causes medical images, related data, and/or the like to be displayed (e.g., via communication devices 814, 816 or the like) and/or receive information from other system components and/or from a system user (e.g., via communication devices 814, 816, or the like).

In some aspects, program product 808 includes non-transitory computer-executable instructions which, when executed by electronic processor 804 perform at least: parameterizing at least one model of a candidate vascular graft for a subject to produce at least one parameterized model of the candidate vascular graft; generating one or more surrogate models of hemodynamics of the parameterized model of the candidate vascular graft to produce at least one surrogate model of the parameterized model of the candidate vascular graft; generating at least one constrained optimization from the surrogate models of the parameterized model of the candidate vascular graft; and identifying at least one set of globally optimal design parameters from the constrained optimization. Other exemplary executable instructions that are optionally performed are described further herein.

Additional details relating to computer systems and networks, databases, and computer program products are also provided in, for example, Peterson, *Computer Networks: A Systems Approach*, Morgan Kaufmann, 5th Ed. (2011), Kurose, *Computer Networking: A Top-Down Approach*, Pearson, $7^{th}$ Ed. (2016), Elmasri, *Fundamentals of Database Systems*, Addison Wesley, 6th Ed. (2010), Coronel, *Database Systems: Design, Implementation, & Management*, Cengage Learning, $11^{th}$ Ed. (2014), Tucker, *Programming Languages*, McGraw-Hill Science/Engineering/Math, 2nd Ed. (2006), and Rhoton, *Cloud Computing Architected: Solution Design Handbook*, Recursive Press (2011), which are each incorporated by reference in their entirety.

EXAMPLES

Figure 9:
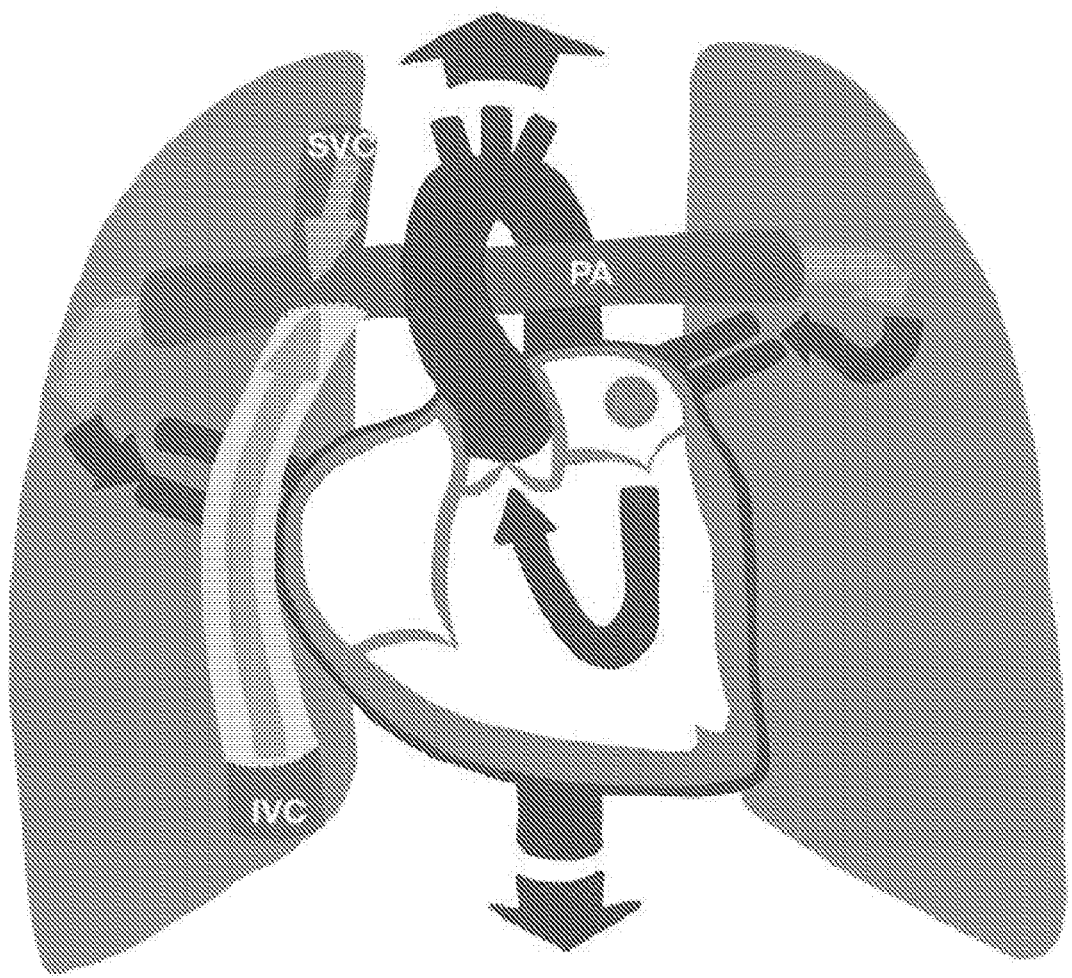
FIG. 9 schematically illustrates a single ventricle heart and a Fontan pathway. The Fontan conduit connects the pulmonary arteries (PAs) and the inferior vena cava (IVC). Deoxygenated blood from the superior vena cava (SVC) and IVC is directed to the lungs.

Example 1: Semi-Automatic Planning and Three-Dimensional Electrospinning of Patient-Specific Grafts for Fontan Surgery I. Introduction Single ventricle heart disease (SVHD) causes oxygenated blood and deoxygenated blood to mix in circulation. Untreated SVHD is associated with a 70% mortality rate during the first year of life. The surgical treatment of SVHD involves three staged surgical procedures. Palliative shunt surgery is performed to introduce aortic flow into the pulmonary arteries and maintain oxygenation. The Glenn procedure disconnects the superior vena cava (SVC) from the right atrium and attaches the SVC to the pulmonary arteries (PAs), which enables the upper body's deoxygenated blood to directly go to the lungs. In the final stage, as illustrated in FIG. 9, the Fontan procedure disconnects inferior vena cava (IVC) from the right ventricle and attaches it to the PAs by using a synthetic extracardiac conduit or via an intra-atrial tunnel. This directs the lower body blood flow to the lungs, bypassing the heart. Although 20-year survival rates after the Fontan procedure are 74%~ 82%, patients may suffer long-term complications including pulmonary arteriovenous malformations (PAVMs), decreased exercise capacity, and protein losing enteropathy, among other complications.

Clinical evidence shows the correlation between hemodynamics in the Fontan pathway and the cause or exacerbation of the complications. Patients can have long-term benefits for health and quality of life by receiving an ideally reconstructed Fontan pathway with a balanced hepatic flow distribution (HFD) and minimum energy loss. However, patient-specific Fontan grafts are still under clinical investigation for the approval by the U.S. Food and Drug Administration (FDA). In addition, the commercially available FDA approved grafts, are manufactured with synthetic materials, which do not grow with the child and can require revision or replacement in the long term.

3D-printable tissue engineered vascular grafts (TEVGs) offer a promising strategy to create patient-specific, hemodynamically optimized Fontan conduits. Manufactured by FDA-approved biodegradable scaffolds, TEVGs allow the patient's own cells to proliferate and provide physiologic functionality and growth over time. Our pre-clinical trial of TEVGs in sheep models showed neotissue formation with mechanical properties comparable to those of the native tissue. To improve Fontan pathway hemodynamics, we adopted iterations of computer-aided-design (CAD) followed by computational fluid dynamic (CFD) simulation and investigated the surgeon's intuition in Fontan pathway construction by using clay modeling. Besides using general-purpose CAD software to design Fontan conduits, specialized modeling tools such as SURGEM can simplify the surgical planning process. Despite these advances, significant engineering efforts and frequent communication with surgeons for feedback are still typically required, which may take weeks to design a Fontan pathway for a single patient, and still result in sub-optimal hemodynamics. There is a need to speed up the design process and reduce human efforts for identifying globally optimized Fontan pathways, which can be achieved by automating the design and optimization process.

Design optimization of Fontan pathways involves solving a nonlinear constrained optimization problem that has been extensively studied for structural optimization of aircraft since late 1950s. Gradient-based and gradient-free optimization methods were developed and utilized in various design optimization tasks. The adjoint approach as one of the most efficient gradient-based optimization methods features that the computation cost of derivatives of objective functions is independent of the design space dimensions. However, the solution may converge to local optima which are significantly worse than the global optimum. In contrast, gradient-free optimization can apply global search strategies on surrogate functions of computationally expensive simulations to find near-globally optimal solutions. Surrogate-based optimization suffers the curse of dimensionality with the design space dimension practically being limited to 10-20. Thus, the application of optimization methods is task dependent. For cardiovascular optimization problems, research has been focused on idealized vessel models for problem simplification. The gradient-based optimization methods were used to optimize design parameters of 2-dimensional (2D) idealized coronary artery bypass grafts. Prior studies employed gradient-free surrogate-based optimization methods to design bifurcated Y-grafts with unequal branch diameters on 3-dimensional (3D) idealized Fontan models analyzing their influence on HFD. Another study demonstrated the usage of the surrogate-based optimization method for designing an idealized Y-graft geometry to minimize power loss by using a wall shear stress (WSS) constraint. The thrombosis risk in the Fontan links to abnormally low WSS. Reducing regions of abnormal WSS in Fontan pathway may potentially prevent thrombus formation. Despite these research achievements, designing patient-specific Fontan TEVGs with optimized hemodynamic performance is still a complex task due to the variety of patient-specific anatomies, confined surgical planning space, and the requirement of simultaneously considering multiple criteria for graft design optimization.

Aiming to fill this gap, we aim to contribute a semiautomatic Fontan pathway planning method to significantly reduce human effort and turnaround time for designing hemodynamically optimized patient-specific grafts. The realization of this work involves solving two key problems. The first problem is how to parameterize Fontan pathways and explore patient-specific design space by considering potential interference with other anatomies. We introduced a 10-dimensional design space for enabling pathway adjustments based on anastomosis locations, orientations, conduit sizes and shape deformation. The feasibility of a Fontan pathway is measured by interference depth with other anatomies, which is computed by an interference detection algorithm developed in this work. The second problem is how to find feasible solutions in the design space that can optimize hemodynamic performance of Fontan models. We performed nonlinear constraint optimization on indexed power loss (iPL) with WSS, HFD and geometric interference as constraints. Surrogate models of hemodynamic parameters and geometric interference were built by using Gaussian process regression. Multi-start pattern search optimization was applied on the surrogate model of iPL to find a near-globally optimal set of design parameters. To automate the Fontan pathway planning and optimization work flow, we developed a computation framework based on our prior work to seamlessly integrate mesh manipulation, hemodynamic simulation, training data collection and surrogate optimization. To evaluate the performance of the our method, we setup hemodynamics performance comparison study among the Fontan models designed by surgeon's unconstrained modeling method, engineer's manual optimization method, and the automatic optimization method, as well as patients' post-surgical Fontan models. We also investigated how graft implantation errors, uncertainty of BCs and exercise conditions affect the hemodynamic performance of optimized grafts. In addition, we also demonstrated the feasibility of combining our Fontan conduit optimization technique with the manufacturing of patient-specific TEVGs by using electrospun biodegradable nanofibers.

II. Workflow of Fontan Surgery

Figure 10:
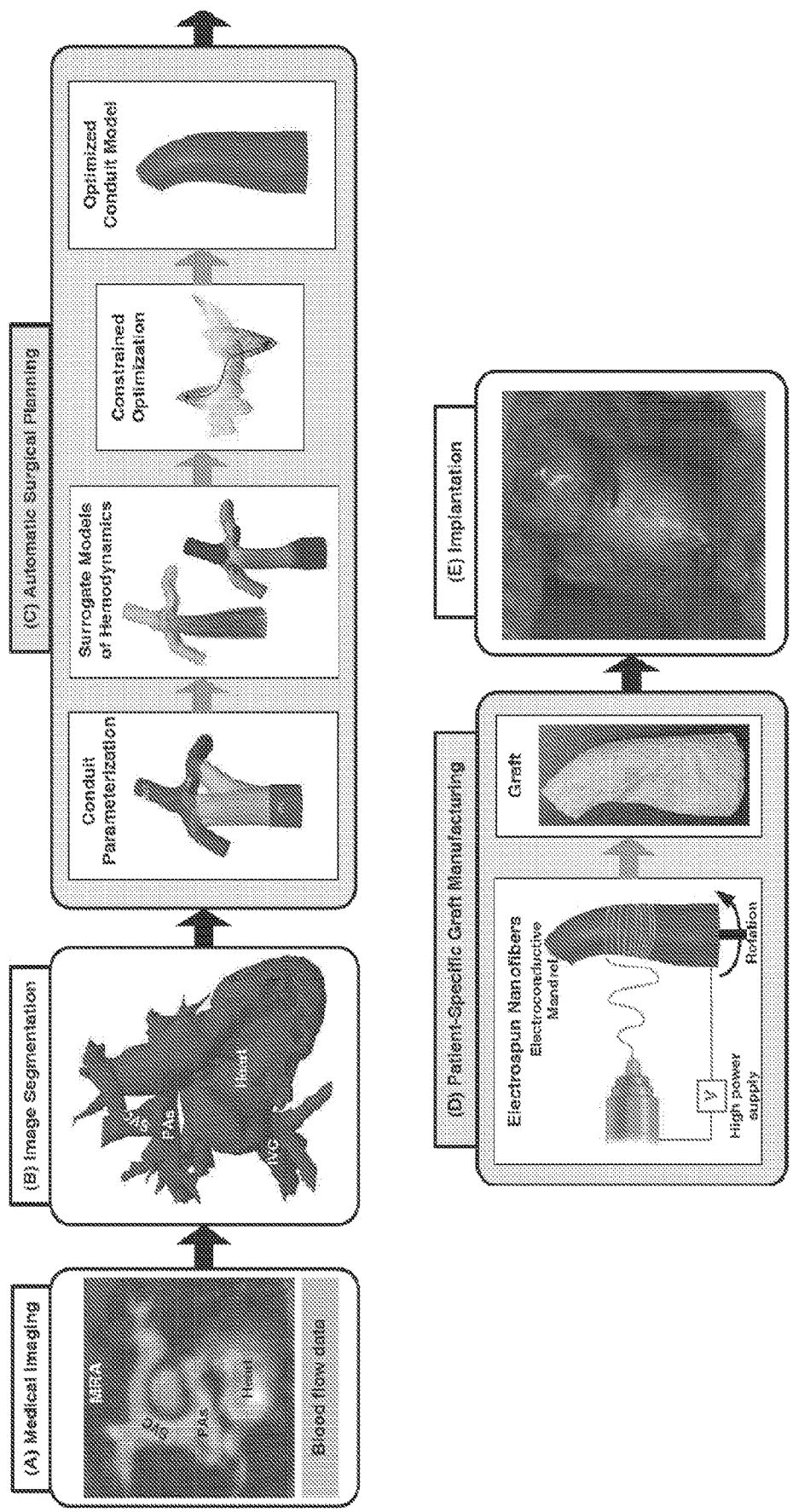
FIG. 10 (Panels A-E) schematically shows a workflow diagram of the semi-automatic Fontan surgical planning, patient-specific graft manufacturing, and implantation. Starting with three-dimensional (3D) contrast-enhanced magnetic resonance angiography (MRA) data, 3D models of the superior vena cava (SVC), the pulmonary arteries (PAs), the inferior vena cava (IVC), the aorta and the heart are reconstructed by image segmentation. Fontan surgical planning is initialized by the 3D models and the blood flow data and includes conduit parameterization, development of surrogate models, and constrained optimization. A patient-specific optimized graft is manufactured by electrospun nanofibers before implantation.

We propose a workflow for designing and manufacturing patient-specific hemodynamically optimized conduit for Fontan surgery, which consists of five consecutive steps as shown in FIG. 10: 1) obtaining magnetic resonance angiography (MRA) data for the patient's heart and vascular geometry, and phase-contrast MRI (PC-MRI) data for the determination of blood flow data for CFD simulation; 2)

image segmentation to reconstruct the 3D models of SVC, IVC, PAs, aorta and heart; 3) Fontan pathway planning and optimization; 4) manufacturing of patient-specific grafts; and 5) graft implantation in the patient. This work focuses on automatically optimizing the Fontan pathways and manufacturing them into patient-specific TEVGs. The automatic graft optimization involves Fontan pathway parameterization, high-fidelity simulations to collect training data, and building surrogate functions of iPL, WSS, HFD, InDep and Nv for design parameter optimization. To manufacture the Fontan conduits, mandrels are 3D-printed according to the geometries of optimized Fontan pathways. Electrospun nanofibers, such as poly(L-lactic acid) (PLLA) and poly(ε-caprolactone) (PCL), are collected on the mandrels to form the patient-specific TEVGs.

Figure 11:
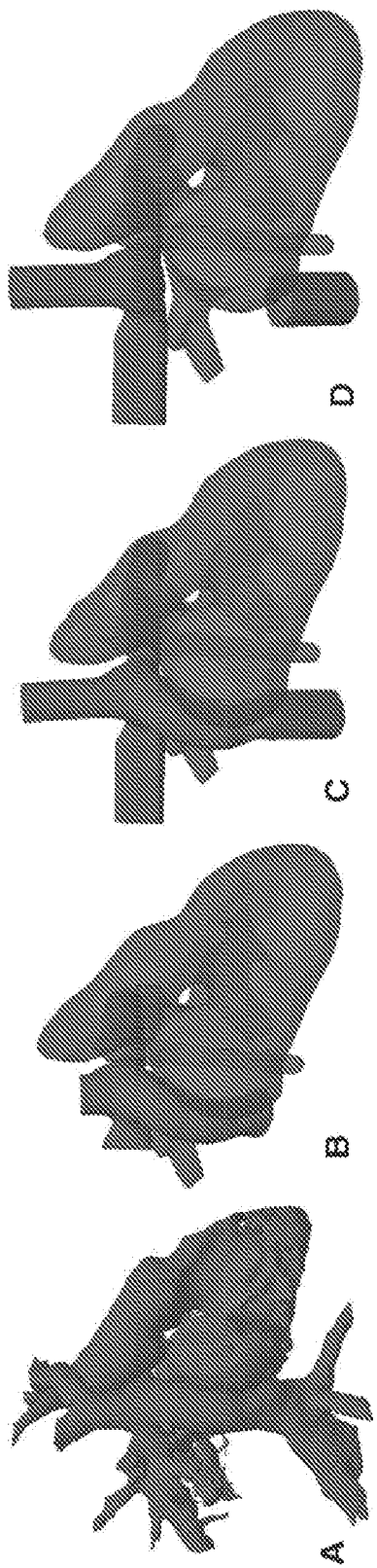
FIG. 11 (Panels A-D) schematically illustrates model preparation for automatic Fontan pathway planning. (A) 3D reconstruction of the Fontan model for revision with the heart model by applying image segmentation on the patient's MRI data. (B)-(C) Preparing Fontan revision model for hemodynamic simulation by making clean cuts and extensions at inlets and outlets for prescribing the BCs. (D) Completed preparation of a Superior cavopulmonary connection (SCPC) model by removing the native Fontan pathway.

In the first two steps of the anticipated workflow, cardiovascular MRA data were collected in DICOM format from two anonymized patients who had received Fontan surgery. Image segmentation of MRA data was conducted by using commercially available software Mimics (Materialise, Leuven, Belgium) for reconstructing 3D Fontan models that include the proximal cavae and branch pulmonary arteries, as illustrated in FIG. 11A. Clean cuts and extensions were made to the smoothed models at inlets and outlets (IVC, SVC, LPA RPA) for partially developing velocity profiles and avoiding spurious influence of the BCs respectively, as shown in FIGS. 11 B and C. Time-averaged flow rates at the inlets and outlets ($Q_{IVC}, Q_{SVC}, Q_{LPA}, Q_{RPA}$), and body surface areas (BSAs) are presented in Table 1. To prepare the models for Fontan pathway planning and graft optimization, the existing, nonoptimized conduits were removed from Fontan models to mimic the patients' vessel structures before receiving the Fontan surgery. FIG. 11 D shows a patient-specific model to use for testing our semi-automatic Fontan pathway planning method.

TABLE 1

PATIENT-SPECIFIC DATA. BSA-BODY SURFACE AREA; $Q_{IVC}$, $Q_{SVC}$, $Q_{LPA}$, $Q_{RPA}$ -TIME-AVERAGED FLOW RATES AT IVC, SVC, LPA, RPA.

| Patient ID | Case 1 | Case 2 |
|---|---|---|
| BSA [m$^2$] | 1.593 | 1.625 |
| $Q_{IVC}$ [m$^3$ s$^{-1}$] | 4.03e−5 | 3.29e−5 |
| $Q_{SVC}$ [m$^3$ s$^{-1}$] | 2.30e−5 | 1.62e−5 |
| $Q_{LPA}$ [m$^3$ s$^{-1}$] | 2.76e−5 | 2.37e−5 |
| $Q_{RPA}$ [m$^3$ s$^{-1}$] | 3.57e−5 | 2.54e−5 |

III. Fontan Pathway Generation

A. Fontan Pathway Parameterization

Figure 12:
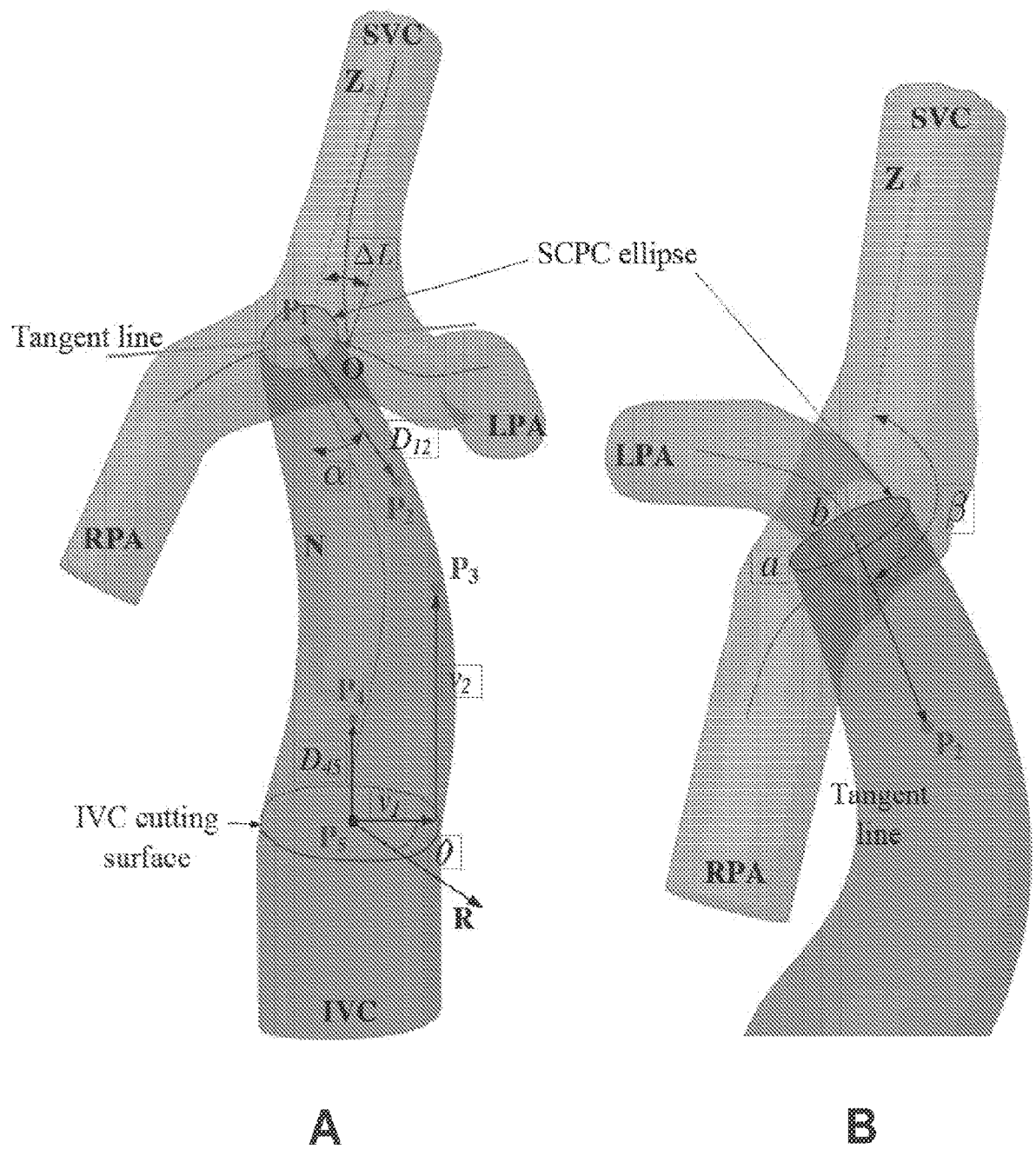
FIG. 12 (Panels A and B) schematically illustrates Fontan conduit parameterization. The conduit starts from the inferior vena cava (IVC) cutting surface, ends at the superior cavopulmonary connection (SCPC) ellipse which moves along the centerline between the left pulmonary artery (LPA) and the right pulmonary artery (RPA). The design parameters in the red boxes explore the geometry of a Fontan pathway.

We focus on designing conduit-shaped grafts instead of bifurcated Y-grafts. From a practical perspective, limitations in available space restrict limb sizes of Y-grafts and impose significant anastomosis challenges, although Y-grafts show promising results on improving HFD. Research studies demonstrate that power loss and WSS of a Fontan pathway correlate to the conduit's diameter. As shown in FIG. 12, the IVC cutting surface curve is unchanged during the pathway planning, we parameterize the conduit's diameter by using the superior cavopulmonary connection (SCPC) ellipse radii a and b. HFD correlates to the conduit's caval offset and connection angle which represent the anatomosis location and orientation of the conduit on the SCPC model. To explore these variations, we employ parameters $\Delta L$ for representing the caval offset on the centerline between the LPA and the RPA (curve length of $OP_1$) and $\alpha$, $\beta$ for connection angle of the conduit. To enable the conduit to have sufficient flexibility for avoiding interference with other anatomies, we parameterize the conduit's trajectory by using a fourth-order Bézier curve. Thus, the conduit's trajectory (grey line) can be explored by varying the locations of $P_1$~$P_5$. $P_1$ is the function of $\Delta L$. $P_2$ is the function $\Delta L$, $\alpha$, $\beta$ and $D_{12}$. $P_3$ is the function of $v_1$, $v_2$ and $\theta$, where $v_1$ is the Euclidean distance from $P_3$ to $\overline{P_3 P_4}$, $v_2$ is the distance from $P_3$ to the IVC cutting surface, $\theta$ is the azimuth angle between the reference direction R and the direction of $v_1$. $P_4$ is the function of $D_{45}$. $P_5$ is a fixed point locating at the center of the IVC cutting surface. In summary, we propose a 10-dimensional design space x={a, b, $\alpha$, $\beta$, $\Delta L$, $D_{12}$, $v_1$, $v_2$, $\theta$, $D_{45}$} $\in R^{10}$, which are highlighted in grey rectangular boxes in FIG. 12.

The conduit's trajectory C(t) is formulated in (1) by using $P_1$~$P_5$.

$$C(t) = \sum_{i=0}^{n=4} \binom{n}{i}(1-t)^{n-i} \cdot t^i \cdot P_{5-i} \quad t \in [0, 1] \quad (1)$$

The conduit attaching point $P_1$ moves along the LPA-RPA centerline (the horizontal grey line in FIG. 12). Its location is defined by an offset parameter $\Delta L$, which represents the curve length of $OP_1$. Note that the tangent line of the LPA-RPA centerline at $P_1$ conincides with the radius b. The location of $P_2$ is defined by four parameters: $\Delta L$, $\alpha$, $\beta$ and $D_{12}$. $\alpha$ denotes the included angle between $\overrightarrow{P_1 P_2}$ and which is perpendicular to the SCPC ellipse surface. $\beta$ represents the included angle between $P_1 P_2$ and Z which is paralleled to the centerline along SVC. $D_{12}$ represents the distance between $P_1$ and $P_2$. $\overrightarrow{P_5 P_4}$ is perpendicular to the IVC cutting surface. $D_{45}$ is the distance between $P_4$ and $P_5$. The upper and lower bounds of a and b are determined by the maximal and minimal inscribed sphere diameters along the LPA-RPA centerline, which are computed by using VMTK. $\alpha$ and $\beta$ are in the range of [−45°,45°] and [135°,180°] respectively. $\theta$ is in the range of [0°,360° ]. The bounds of the other design parameters depend on patient-specific models.

B. Fontan Conduit 3D Modeling

Figure 13:
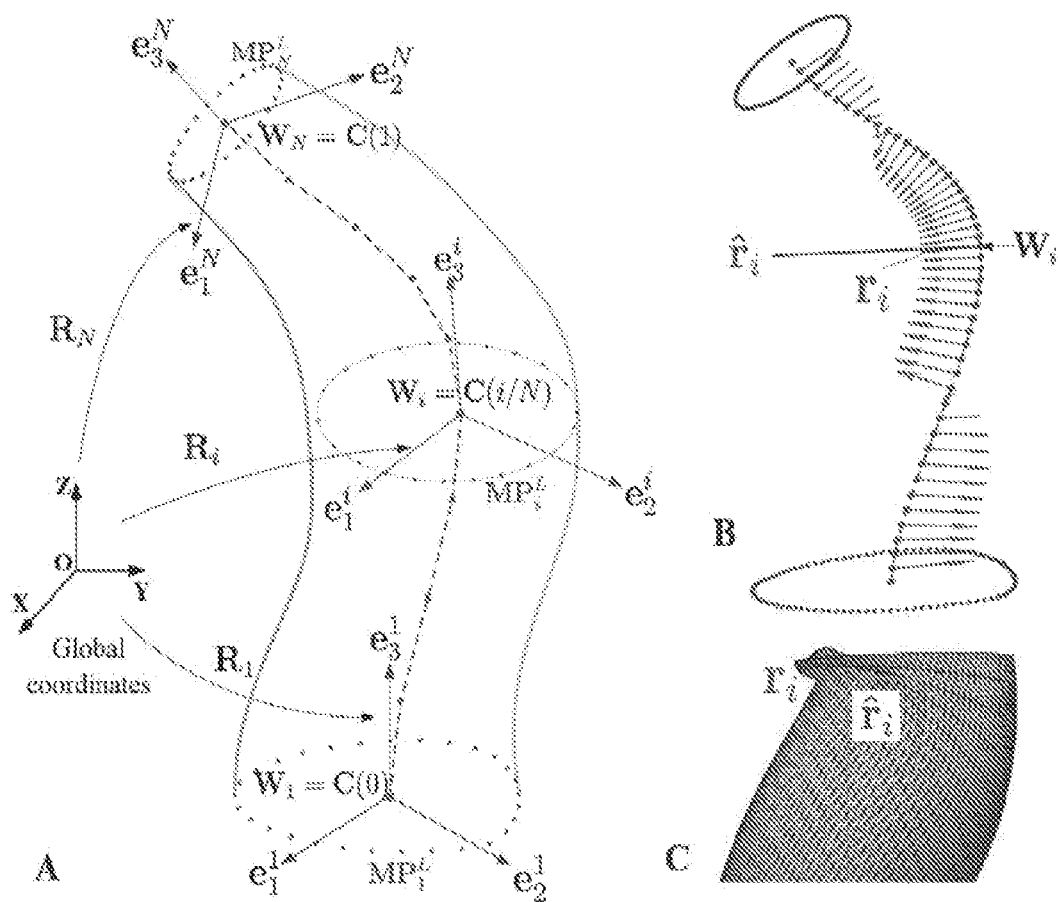
FIG. 13 (Panels A-C) schematically illustrates Fontan conduit modeling and evaluation of conduit model quality. (A) Construction of the conduit's surface points based on a set of design parameters. (B) Conduit quality evaluation by comparing the conduit's centerline curvature radii $\hat{r}$ and the conduit's radii $r_i$. (C) Case illustration of $\|r_i\|>\|\hat{r}_i\|$.

Hemodynamics simulation of Fontan models requires combining the SCPC model, each conduit model and the IVC model into a full Fontan model. To guarantee a smooth Fontan pathway, we quantify the geometric quality of conduits by comparing the radius of curvature of the conduit centerline $\hat{r}_i$ and the conduit's radius vector $r_i$ at a pathway point $W_i$. $r_i$ has the smallest included angle with $\hat{r}_i$ on the i$^{th}$ conduit mesh layer, as illustrated in FIG. 13B. A parameter $N_v$ is designed for indicating number of bad mesh layers with $\|r_i\|>\|\hat{r}_i\|$ (shown in FIG. 13C) that results in self-intersecting mesh on the conduit's surface.

Algorithm 1 describes the method of Fontan conduit 3D modeling. The algorithm's input includes the sampled design parameters $x_s$, the SCPC model for extracting the centerlines, and the IVC model for specifying the surgical cutting surface. The output of the algorithm provides the conduit's mesh model and the model quality indicator $N_v$. As shown in FIG. 13A, the Fontan pathway trajectory C(t) is first discretized and represented as $W_i$=C(i/N), where N denotes the total waypoint number and 1≤i≤N. The SCPC ellipse curve and the IVC cutting curve are also discretized and saved to model point arrays $MP_N \in R^{M \times 3}$ and $MP_1 \in R^{M \times 3}$ respectively in the global coordinate system. To construct the conduit surface points around each $W_i$, local coordinate systems are defined by using unit vectors $e_1^i, e_2^i, e_3^i$. Rotational matrix $R_i=[e_1^i, e_2^i, e_3^i]^T$ converts $MP_i$ to local coordinates $MP_i^L$. The local coordinates of the conduit model points $MP_i^L$ around $W_i$ can be computed by blending $MP_1^L$ and $MP_N^L$ with $f(MP_1^L, MP_N^L, i)$, where f is a blending function. The line 12 of Algorithm 1 shows the equation for calculating the global coordinates of the conduit model points $MP_i$. By computing the radius of the curvature $\hat{r}_i$ and the conduit's radius vector $r_i$, the lengths of $\hat{r}_i$ and $r_i$ are compared to determine if $N_v$ will be increased. In Section VI of this Example 1, we develop a surrogate function for $N_v(x)$ and use it as a nonlinear constraint to optimize the design parameters x.

---

Algorithm 1 Conduit Modeling Algorithm

---

Input: A set of sampled design parameters $x_s \in x$, SCPC model, IVC model
Output: Conduit model, Number of bad layers $N_v$
 1: Initialization $N_v = 0$
 2: Compute N conduit way-points $W \in \mathcal{R}^{N \times 3}$ by (1)
 3: Compute M discretized points of the SCPC ellipse $MP_N \in \mathcal{R}^{M \times 3}$
 4: Compute A discretized points of the IVC cutting curve $MP_1 \in \mathcal{R}^{M \times 3}$
 5: while $i \leq N$ do
 6:   Compute $e_1^i, e_2^i, e_3^i \in \mathcal{R}^{3 \times 1}$ | {Unit vectors of axes of local coordinate systems with the origin at $W_i$.}
 7:   $R_i = [e_1^i, e_2^i, e_3^i]^T$
 8:   $i = i + 1$
 9: end while
10: $MP_1^L = R_1 \cdot MP_1$, $MP_N^L = R_N \cdot MP_N$
11: while $i \leq N$ do
12:   $MP_i = R_i^T \cdot f(MP_1^L, MP_N^L, i) + W_i$
13:   Compute $\hat{r}_i, r_i$
14:   if $\|\hat{r}_i\| \leq \|r_i\|$ then
15:     $N_v = N_v + 1$
16:   end if
17:   $i = i + 1$
18: end while

IV. Computation of Fontan Hemodynamics

A. Fontan Hemodynamics

Figure 14:
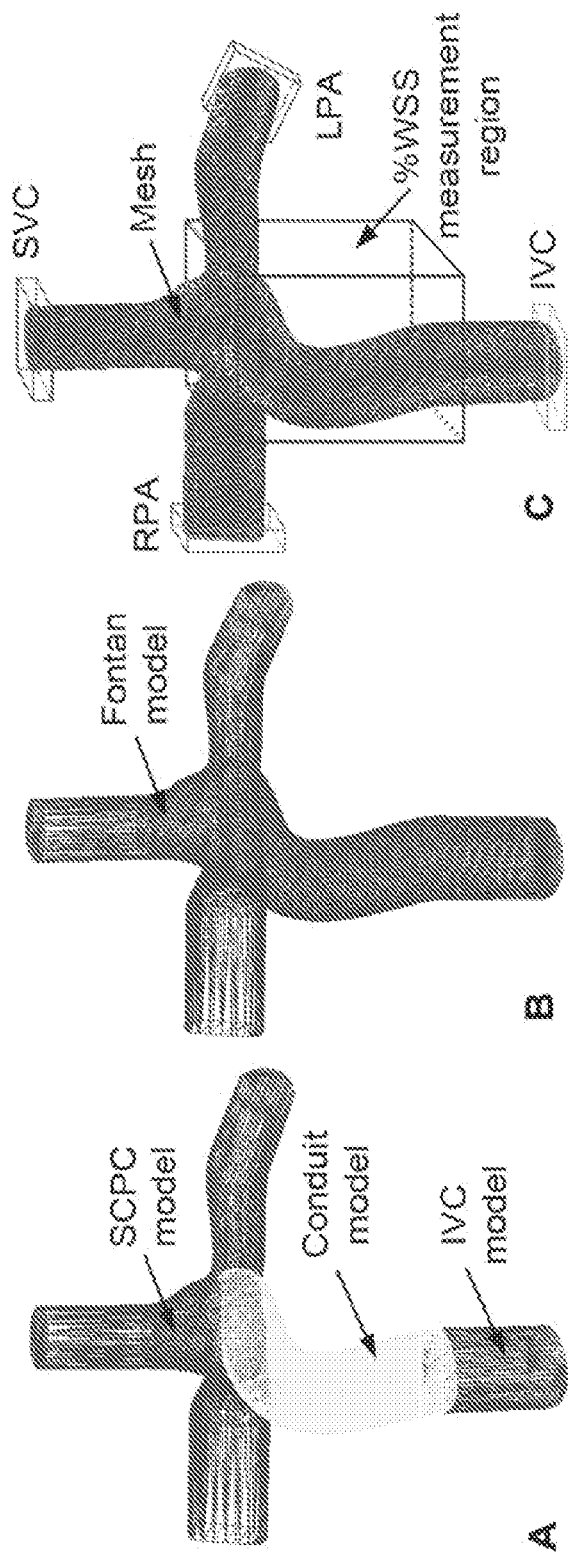
FIG. 14 (Panels A-C) schematically illustrates mesh preparation for Fontan hemodynamic simulation. (A) Illustration of the SCPC model, the inferior vena cava (IVC) model, and the conduit model as individual surface meshes. (B) Merging of the surface meshes from different models into an integrated Fontan surface mesh. (C) Generating mesh for computational fluid dynamics (CFD) simulation and specifying boundary areas and % WSS measurement areas.

For computing Fontan hemodynamics, 3D meshing of Fontan models needs to be generated with defined mesh regions to apply the BCs. FIG. 14 demonstrates the process of mesh generation for Fontan models with a virtually planned pathway. FIG. 14A shows the SCPC model and IVC model, and a planned conduit model as separately models. FIG. 14B shows merging of the models into a single watertight stereolithography (STL) model with no internal mesh. The model merging is conducted by three steps: 1) converting the three separate STL models into solid models; 2) Boolean union the solid models into a single solid model; and 3) converting the single solid model into an STL file. This model merging process is automated by using FreeCAD application programming interfaces.

We employed OpenFOAM, which is an open source software package for CFD simulation, to compute Fontan hemodynamics. The snappyHexMesh mesh generator in OpenFOAM was used to generate mesh for Fontan models. The mesh size is controlled in the range of 0.35 mm~0.7 mm according to our previous mesh convergence study. Three boundary layers with 0.35 mm surface mesh size were applied to each model mesh for computing WSS. To define boundary regions of the mesh model, four bounding boxes are specified in FIG. 14C to indicate the locations of SVC, IVC, LPA and RPA. Since the SCPC. model and the IVC model were unchanged during the surgical planning for the same patient, the bounding boxes can be initialized at the beginning. We used the topoSet utility in OpenFOAM to select mesh surfaces within the bounding boxes, and applied createPatch utility to define the boundary faces. Mass flow rates were prescribed at the inlets and outlets as BCs according to the volumetric flow rates in Table 1 and the blood density.

A few assumptions were made for ensuring reasonable computation time of hemodynamic simulations while still obtaining meaningful hemodynamic parameters. The blood was modeled as incompressible, Newtonian fluid with a density of 1060 $kgm^{-3}$ and a dynamic viscosity of $3.5 \times 10^{-3}$ Pas. Considering the low Reynolds number of the two cases (Re<1000), the blood flow was modeled as laminar. For large vessels such as PAs and venae cavae, it is acceptable to model the vessel walls as rigid structure.

Hemodynamic performance of Fontan models are evaluated by using three parameters: iPL, % WSS of the parameterized Fontan pathway and HFD. The calculation of these parameters involves solving 3D steady-state Navier-Stokes (NS) equations in the domain of a Fontan model. We employed the SimpleFoam solver and set the convergence values of pressure and velocity residuals as $10^{-4}$.

iPL is a dimensionless resistive index that correlates with exercise capacity, which is formulated as $$iPL = \frac{BSA^2}{\rho Q_s^2}\left[\sum_{SVC,IVC} Q\left(\overline{p} + \frac{1}{2}\rho \overline{u}^2\right) - \sum_{LPA,RPA} Q\left(\overline{p} + \frac{1}{2}\rho \overline{u}^2\right)\right] \quad (2)$$

where Q is flow rate, $Q_s = Q_{IVC} + Q_{SVC}$ is the systemic venous flow rate, $\overline{p}$ is static pressure, $\rho$ is the blood density, $\overline{u}$ is flow velocity, BSA is the patient's body surface area.

The normal physiologic range of WSS for 1~10 dynes/$cm^2$ (0.1~1 Pa) [46]. We quantify % WSS as $$\% WSS = \frac{Area_{lowWSS}}{Area_{Conduit}} \quad (3)$$

where $Area_{lowWSS}$ is the luminal surface areas in the Fontan conduit with WSS<1 dynes/$cm^2$ (0.1 Pa), $Area_{Conduit}$ represents the total surface area of the conduit, which can be automatically selected by setting a % WSS measurement region as shown in FIG. 14C.

HFD is defined as the ratio of blood from the IVC to the LPA and RPA, respectively. The HFD was evaluated by applying the one-way coupling Lagrangian particle tracking method on the steady-state flow that is the final solution of the NS equations. A total of 2000 massless infinitesimal particles were randomly distributed at the IVC, and passively carried by the fluid flow. According to the number of particles received at the LPA ($N_{LPA}$) and the RPA ($N_{RPA}$), the HFD was calculated by $$HFD = \frac{HFD_{RPA}}{HFD_{LPA}}, HFD_{LPA} = \frac{N_{LPA}}{N_{TOT}}, HFD_{RPA} = \frac{N_{RPA}}{N_{TOT}} \quad (4)$$

where $N_{TOT}$ represents the total particle number.

V. Computation of Conduit-heart Intersection in Automatic Fontan Surgical Planning The virtually generated Fontan pathways from the conduit's design space may interfere with other anatomies such as the heart. As shown in FIG. 15A, three Fontan pathways are automatically generated, but one of them is an infeasible pathway because of its intersection with the heart. In order to eliminate the infeasible pathways during the automatic planning of Fontan conduits, we define the geometric interference between the heart model and a conduit model by using the maximum intersection depth (InDep). For the heart model, its volume periodically changes during blood pumping cycles. To make conservative intersection estimation, we should use the peak volume of the heart model at the start of systole.

Figure 15:
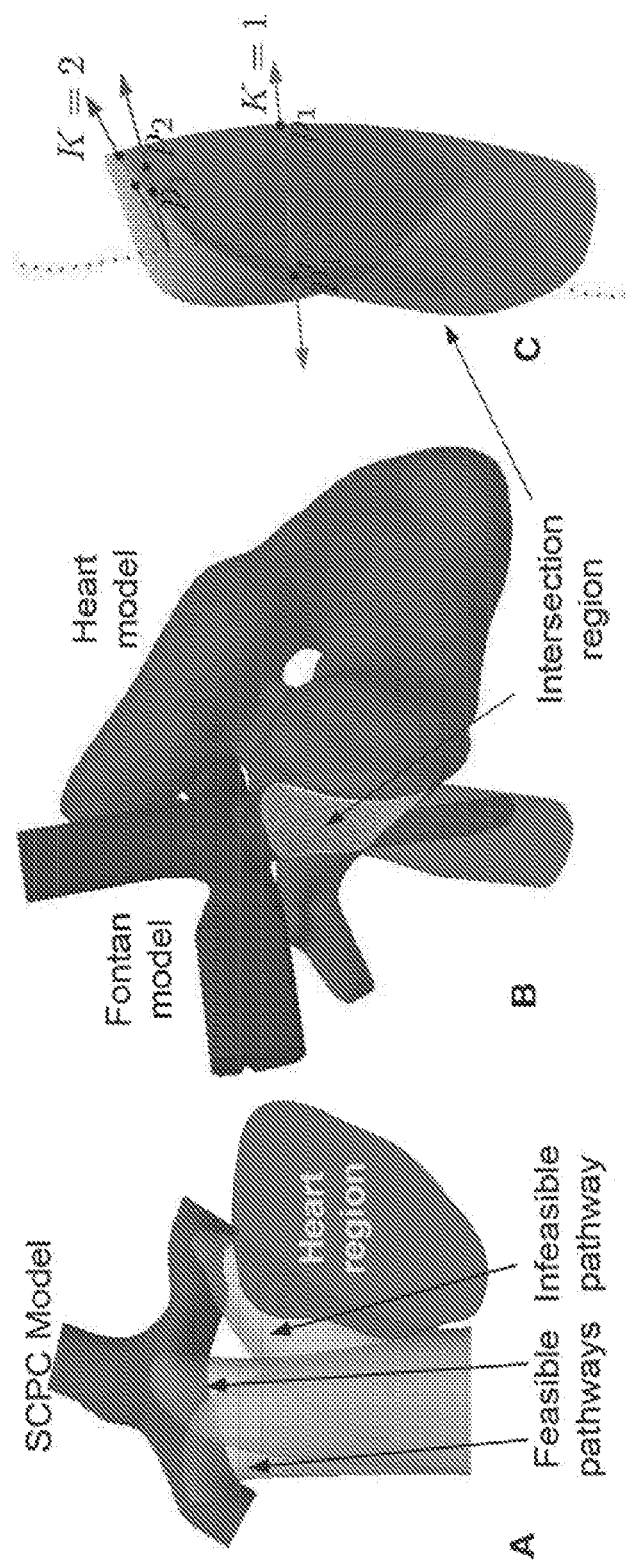
FIG. 15 (Panels A-C) schematically illustrates the computation of geometric interference between a Fontan conduit and the heart model. (A) Illustration of feasible and infeasible Fontan pathways in Fontan surgical planning. (B) 3D Illustration of the geometric interference with the highlighted intersection volume. (C) Illustration of the computing intersection depth (InDep) based on the intersection volume.

Algorithm 2 describes the InDep computation method for each conduit design (Mc). Except the heart model (MH), all FIG. 15. Computation of geometric interference between a Fontan conduit and the heart model. (A) Illustration of feasible and infeasible Fontan pathways in Fontan surgical planning. (B) 3D Illustration of the geometric interference with the highlighted intersection volume. (C) Illustration of computing intersection depth (InDep) based on the intersection volume. the other inputs are identical to the inputs of Algorithm 1. Given $M_C$ and $M_H$, an intersection model $M_I$ can be computed by operating a Boolean intersection $M_C \cap M_H$. A zero matrix $M_{InDep}$ with dimensions of N×M is initialized for containing intersection depths at different locations of $M_C$, where N is number of way-points $W_i (1 \le i \le N)$, M is the number of surface points $MP_j \in R^{M \times 3}$ on the $i^{th}$ layer of Mc. At each $W_i$ (the dots in FIG. 15B), M rays $\gamma_{ij}$ are generated pointing to the conduit surface points $MP_{i,j} (1 \le j \le M)$. We adopt a ray tracing algorithm to compute a list of intersection points $L(M_i, \gamma_{i,j})$ for $M_I$ and $\gamma_{ij}$. There are three different cases: no intersection (K=0), one intersecting point $p_1$ (K=1) and two intersecting points $p_1, p_2$ (K=2). As shown in FIG. 15B, K=1 happens when $W_i$ locates inside $M_I$. In this case, a ray with reversed direction $\gamma'_{i,j}$ is used to find the opposite intersecting point $p^0_1$. The value of $\|p_1 - p'_1\|$ is saved to $M_{InDep}(i,j)$. K=2 may happen when $W_i$ locates outside $M_I$. In this case, $M_{InDep}(i,j) = \|p_1 - p_2\|$. After the ray tracing process, the maximum element in $M_{InDep}(i,j)$ is returned as InDep.

---

Algorithm 2 Intersection Depth of Conduit and Heart Models

Input: A set of sampled design par ameters $x_s \in x$, SCPC model, IVC model, Heart model ($M_H$)
Output: Maximum intersection depth (InDep)
1: Run Algorithm 1, obtain the conduit model $M_C$
2: Compute intersection model $M_I = M_C \cap M_H$
3: Construct zero matrix $M_{InDep} \in R^{N \times M}$
4: while i ≤ N do
5:   while j ≤ M do
6:     Generate a ray $\gamma_{i,j}$ from $W_i$ passing by $MP_{i,j}$
7:     Compute intersections $L(M_I, \gamma_{i,j}) = [p_1, ..., p_K]$
8:     if K=1 then
9:       Reverse $\gamma_{i,j} \to \hat{\gamma}_{i,j}, p'_1 = L(M_I, \hat{\gamma}_{i,j})$
10:      $M_{InDep}(i, j) = \|p_1 - p'_1\|$
11:     end if
12:     if K=2 then

---

Algorithm 2 Intersection Depth of Conduit and Heart Models

13:       $M_{InDep}(i, j) = \|p_1 - p_2\|$
14:     end if
15:     j = j + 1
16:   end while
17:   i = i + 1
18: end while
19: InDep = max($M_{InDep}$)

---

VI. Surrogate-Based Optimization

The design performance of Fontan conduits is measured by five parameters iPL, HFD, % WSS, $N_v$, InDep. To find a set of conduit design parameters $x_0 \in x$ that optimizes the hemodynamics of the Fontan pathway, we conducted constrained optimization based on surrogate models $f_{iPL}(X)$, $f_{HFD}(X)$, $f_{\%\,WSS}(X)$, $f_{Nv}(X)$ and $f_{InDep}(X)$, where x is the design space.

A. Building Surrogate Models

Gaussian process regression (GPR) was used to build surrogate models based on training datasets that were collected from high-fidelity simulations. The lower bounds (LB) and upper bounds (UB) of the design space for the two patient specific cases are illustrated in Table 2. Note that we used the range of RPA-LPA centerline point index $\Delta L_{ind}$ to define the upper bound and the lower bound for design space sampling. $\Delta L$ can be calculated by accumulating the adjacent point distances between $P_1$ and O, as shown in FIG. 12.

TABLE 2

Bounds of Design Space x for Case 1 and Case 2. LB-Lower Bound, UB-Upper Bound.

| | a (mm) | | b (mm) | | α (°) | | β (°) | | $\Delta L_{ind}$ | | $D_{12}$ (mm) | | $v_1$ (mm) | | $v_2$ (mm) | | θ (°) | | $D_{45}$ (mm) | |
|---|---|---|---|---|---|---|---|---|---|---|---|---|---|---|---|---|---|---|---|---|
| x | LB | UB | LB | UB | LB | UB | LB | UB | LB | UB | LB | UB | LB | UB | LB | UB | LB | UB | LB | UB |
| Case 1 | 5 | 14 | 5 | 11 | −45 | 45 | 135 | 180 | 60 | 120 | 3 | 30 | 0 | 50 | 0 | 40 | 0 | 360 | 3 | 30 |
| Case 2 | 5 | 12.5 | 5 | 12.5 | −45 | 45 | 135 | 180 | 190 | 300 | 3 | 30 | 0 | 50 | 0 | 40 | 0 | 360 | 3 | 30 |

To generate $N_s$ sets of design parameters for representing the design space, Latin hypercube sampling (LHS) method was employed. High-fidelity hemodynamic simulations are computationally expensive. For reducing the computation time, we deployed our codes on a high-performance computation cluster (HPCC).

Let $f_e(x)$ represent a surrogate model $$f_e(x) = \zeta_e + c_e^T(x) C_e^{-1} (\hat{f}_e - \zeta_e f), \quad (5)$$

where e={iPL, HFD, % WSS, $N_v$, InDep}, $C_e$ represents the covariance matrix with its elemental kernel function modeled as $$C_e(x^i, x^j) = \exp\left(-\sum_{s=1}^{N_s} \Theta_s \|x^i - x^j\|^2\right). \quad (6)$$

$c_e(x)$ is the covariance vector $$C_e(x) = [C_e(x, x^1), \ldots, C_e(x, x^{N_s})]. \quad (7)$$

$\Theta_s$ denotes the correlation length, which is optimized by maximum likelihood estimation. $\hat{f}_e$ represents the vector of $N_s$ observed high-fidelity parameters. f is a unity vector with dimensions of $1 \times N_s$. $\zeta_e$ is calculated by using generalized least squares in (8).

$$\zeta_e = (f^T C_e^{-1} f)^{-1} f^T C_e^{-1} \hat{f}_e. \quad (8)$$

We implemented GPR to build surrogate models by using the Surfpack software library.

B. Validation of Surrogate Models

The accuracy of surrogate models depends on the number and location of samples in the design space. We applied 10 fold cross-validation to test surrogate models with different numbers of training samples, and used mean absolute error (MAE) to quantify the surrogate model accuracy. The ratio of the training sample number to the validation sample number is 80%: 20%. The numbers of training samples are 500, 1000, 2000 and 3000 for both cases.

Figure 16:
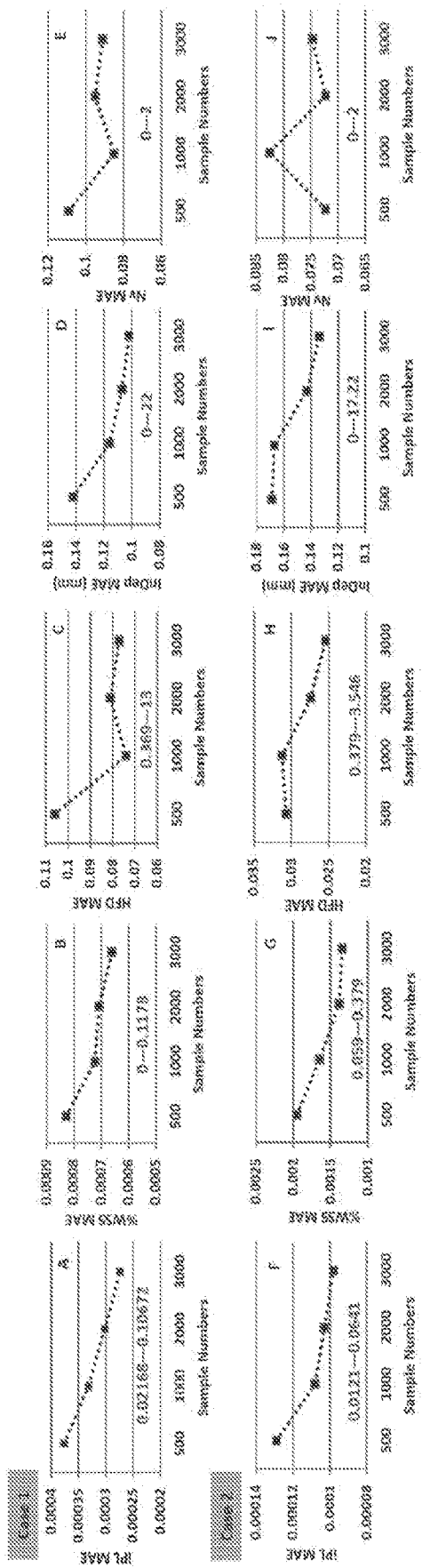
FIG. 16 (Panels A-J) illustrate mean absolute errors (MAEs) between the surrogate model prediction and high-fidelity simulation results. (A)-(E) Surrogate model validation for Case 1. (F)-(J) Surrogate model validation for Case 2. The ranges of high-fidelity simulation results are highlighted below the plots in each sub-figure.

FIG. 16 shows validation results of the surrogate models $f_{iPL}(X)$, $f_{HFD}(x)$, $f_{\% WSS}(X)$, $f_{N_v}(X)$ and $f_{InDep}(X)$ for the two patient-specific cases. In general, the MAE reduces as the training sample number increases from 500 to 3000 for each surrogate model. In Case 1, the MAEs for iPL, % WSS, HFD, InDep and $N_v$ ranged between 2.74E−4 and 3.76E−4, 6.61E−4 and 8.28E−4, 0.074 and 0.106, 0.102 mm and 0.142 mm, 0.085 and 0.109 respectively, as shown in FIG. 16A-E. It is worth noting that $N_v > 2$ may cause bad conduit mesh that fails the Fontan model generation described in Section IV-A of this Example. Therefore, we filtered out the sets of design parameters with $N_v > 2$. Similar description of the validation results applies to Case 2 (FIG. 16F-J). According to the results, we found surrogate models trained by 2000 samples provide good balance between prediction accuracy and computation time.

C. Constrained Nonlinear Optimization

We aim to find a set of design parameter $x_o$ for minimizing iPL while constraining HFD, % WSS, InDep, $N_v$ in acceptable ranges. For HFD, there is no clinical cutoff to prevent pulmonary arteriovenous malformations. Haggerty et al. [Christopher M. Haggerty, Maria Restrepo, and et al. Fontan hemodynamics from 100 patient-specific cardiac magnetic resonance studies: A computational fluid dynamics analysis. *The Journal of Thoracic and Cardiovascular Surgery,* 148 (4):1481-1489, 2014.] show that the mean LPA split is 44% with interquartile range 31% to 57%. Thus we aimed to have the acceptable HFD range to match this cohort as 40%/60%~60%/40%. According to our prior study, we set % WSS below 10% for reducing the thrombosis risk. A maximum of 2 mm intersection depth between a conduit model and the heart model is deemed clinically acceptable. We also need to impose $N_v \leq 2$ for filtering out bad conduit meshes. The constrained nonlinear optimization problem can thus be formulated in (9).

$$\min_{x_o \in x} f_{iPL}(x_o) \quad (9)$$

$$\text{s.t. } 0.67 \leq f_{HFD}(x_o) \leq 1.5$$

$$f_{\% WSS}(x_o) < 10\%$$

$$f_{InDep}(x_o) < 2 \text{ mm}$$

$$f_N(x_o) \leq 2$$

It is desired to find the globally optimal solution to (9). However, unless certain properties of $f_{iPL}(x)$, there is no mathematical guarantee to find global optima. Instead, we sampled multiple start points (different sets of design parameters) to search for near-globally optimal solution in the design space. To minimize $f_{iPL}(x)$, we employed the asynchronous parallel pattern search (APPS) method that does not require gradient information of the objective function.

Figure 17:
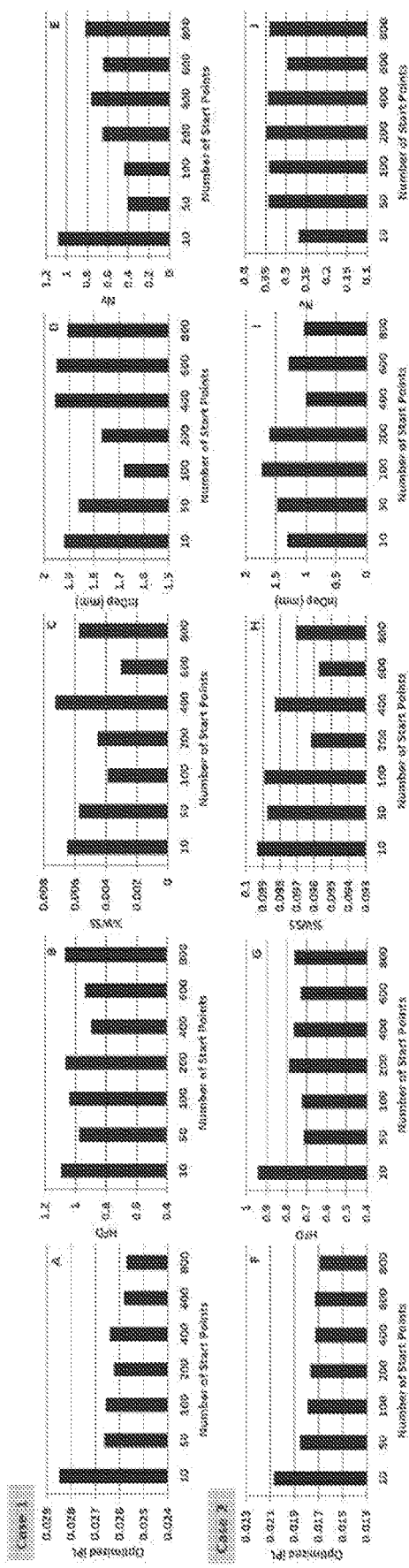
FIG. 17 (Panels A-J) illustrate multi-start constrained optimization results for both of the testing cases. (A)-(E) Optimization results for Case 1. (F)-(J) Optimizations for Case 2. The x axis in each sub-figure represents the number start points used for the optimization. Indexed power loss (iPL) is the objective function to be minimized.

For investigating how the number of start points affects the optimization results, we tested 10, 50, 100, 200, 400, 600 and 800 start points separately for both case 1 and case 2, as shown in FIG. 17. For each number of start points, we repeated the optimization five times, and averaged the values of optimized results. It is important to note that we consider iPL <0.03 as the normal range. This is based on Haggerty et al.'s CFD study of hemodynamic parameters in 100 Fontan patients [Christopher M. Haggerty, Maria Restrepo, and et al. Fontan hemodynamics from 100 patient-specific cardiac magnetic resonance studies: A computational fluid dynamics analysis. *The Journal of Thoracic and Cardiovascular Surgery,* 148 (4): 1481-1489, 2014.]. FIG. 17A and FIG. 17F show the optimized iPL are below 0.03 in all the tests. As the number of start points increases from 10 to 800, the optimized iPL improved from 0.0285 to 0.0257, and from 0.0207 to 0.0169 for the two cases respectively. When the number of start points exceeds 400, the improvement on the optimized iPL is insignificant. The nonlinear constraint functions satisfy our design requirements in all the tests as shown in FIG. 17B-E and FIG. 17G-J. According to the results above, we selected 600 as the start point number and searched for the near-globally optimized design parameters. The values of the surrogate models are also presented in Table 3.

VII. Performance Evaluation

A. Comparison of Various Fontan Pathway Planning Methods

To evaluate the performance of our proposed method, we provide a side-by-side hemodynamics comparison among the Fontan models designed by surgeon's unconstrained modeling (SUM) method, engineer's manual optimization (ManuOpt) method, and the automatic optimization (AutoOpt) method, as well as patients' post-surgical Fontan models (Native) for Case 1 and Case 2.

The procedures of model preparation for both SUM and ManuOpt are similar to those for AutoOpt as described in Section II of this Example. The post-surgical Fontan pathway was removed from the models to create SCPC models as shown in FIG. 11D. For SUM, the SCPC models and the heart models were 3D printed and mounted on fixtures to allow an experienced cardiac surgeon to handcraft his ideal Fontan pathways by using modeling clay. The SUM Fontan models were then 3D scanned to STL files for further analysis. For ManuOpt, Fontan pathways were created over several CAD-CFD iterations by using tube-shaped conduits or bifurcated conduits. The final ManuOpt models were selected with lowest iPL and normal range of HFD and % WSS.

Figure 18:
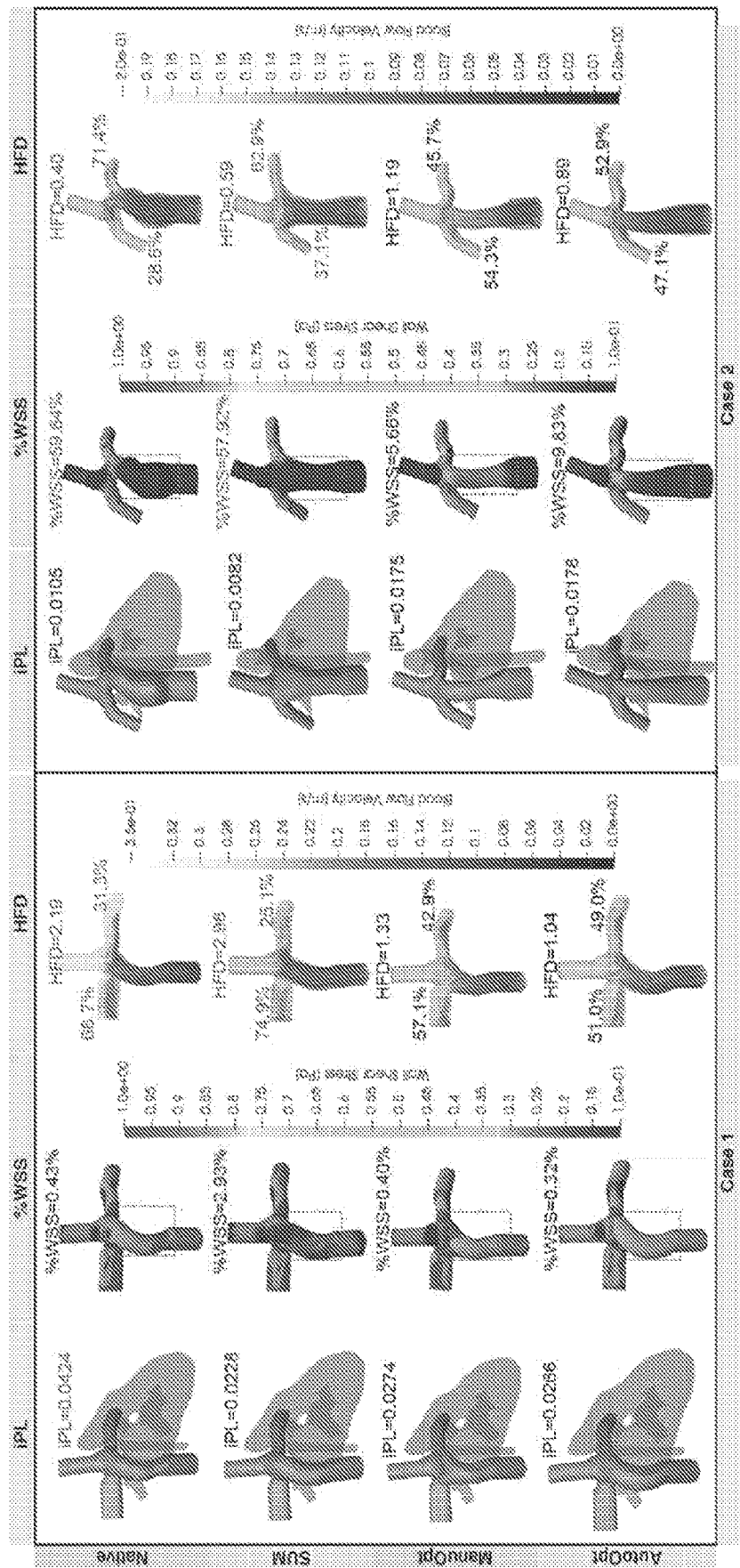
FIG. 18 shows a hemodynamic performance comparison of Fontan pathway designs of Case 1 and Case 2 among native models, the surgeon's unconstrained modeling (SUM), the models from engineer's manual optimization (ManuOpt) and automatic optimization. The values highlighted in red are outside their normal ranges or constraints (iPL<0.03, % WSS<10%, 0.67≤HFD≤1.5). The red rectangles indicate the areas for computing % WSS.

In FIG. 18, the first columns of Case 1 and Case 2 show iPL of the Fontan models with native, SUM, ManuOpt and AutoOpt pathways. The heart and vessel models are also shown to demonstrate the Fontan pathways are anatomically feasible. The second and third columns of Case 1 and Case 2 show % WSS and HFD respectively. Hemodynamics of the Fontan models were computed by using the method in Section IV-A of this Example. Any abnormal hemodynamic parameters are highlighted in dark grey considering the design criteria: iPL<0.03, % WSS<10%, 0.67<HFD<1.5.

In Case 1, only the native model has abnormally high iPL (0.0424). The SUM model has the lowest iPL (0.0228). The iPL of the AutoOpt model (0.0266) is slightly lower than that of the ManuOpt model (0.0274). % WSS of all the cases falls in the defined threshold range. The SUM model's % WSS is significantly higher than that of the other models due to its larger conduit diameter. WSS values are plotted on the Fontan models in the range of 0.1 Pa-1 Pa and the red rectangles indicate the areas for % WSS calculation. The ManuOpt and AutoOpt models both have HFD within the HFD thresholds. The AutoOpt model's hemodynamic performance outperforms that of the ManuOpt model in iPL, % WSS and HFD.

In Case 2, iPL of all the models are within the normal range. Although the native model and the SUM model have significantly lower iPL than that of the ManuOpt and AutoOpt models, their % WSS and HFD are all outside the design thresholds. In this case, the ManuOpt model performs slightly better than the AutoOpt model in iPL and % WSS, but the AutoOpt model's HFD performs slightly better than that of the ManuOpt model.

The ManuOpt models were selected from three consecutive design iterations. Followed by preparation of the patient's models (SCPC, IVC, heart), each iteration includes generating a cohort of graft designs based on multiple design parameters, computing all the generated Fontan models on a HPCC for parallel CFD computation, post-processing the results and selecting the best set of parameter to generate the cohort of graft designs for the next iteration. Each iteration took about one week with most of the time spent on CFD computation and post-processing. The turnaround time (including human effort and computational effort) of designing a ManuOpt model for each patient is about three weeks. In contrast, the design of an AutoOpt model only requires human effort for model preparation and spent most of the time on the training data collection for the surrogate models. We employed a HPCC by using 40 CPU cores and 4 Gigabyte random-access memory (RAM) per core to run 2,000 high-fidelity models, which took approximately 15 hours for each patient. The time spent on building surrogate models and multi-start optimization was negligible (within a few minutes).

B. Sensitivity Analysis

To evaluate the robustness of the proposed automatic TEVG optimization method for Fontan surgery, we performed three different types of sensitivity analysis to investigate (1) how imperfect graft implantation affects the hemodynamic performance of AutoOpt grafts; (2) how uncertainty of LPA/RPA flow split affects the hemodynamic performance of AutoOpt grafts; and (3) how uncertainty of LPA/RPA flow splits affects the training data for building surrogate models of the hemodynamic parameters and subsequently affects the shapes and hemodynamic performance of AutoOpt grafts.

Figure 19:
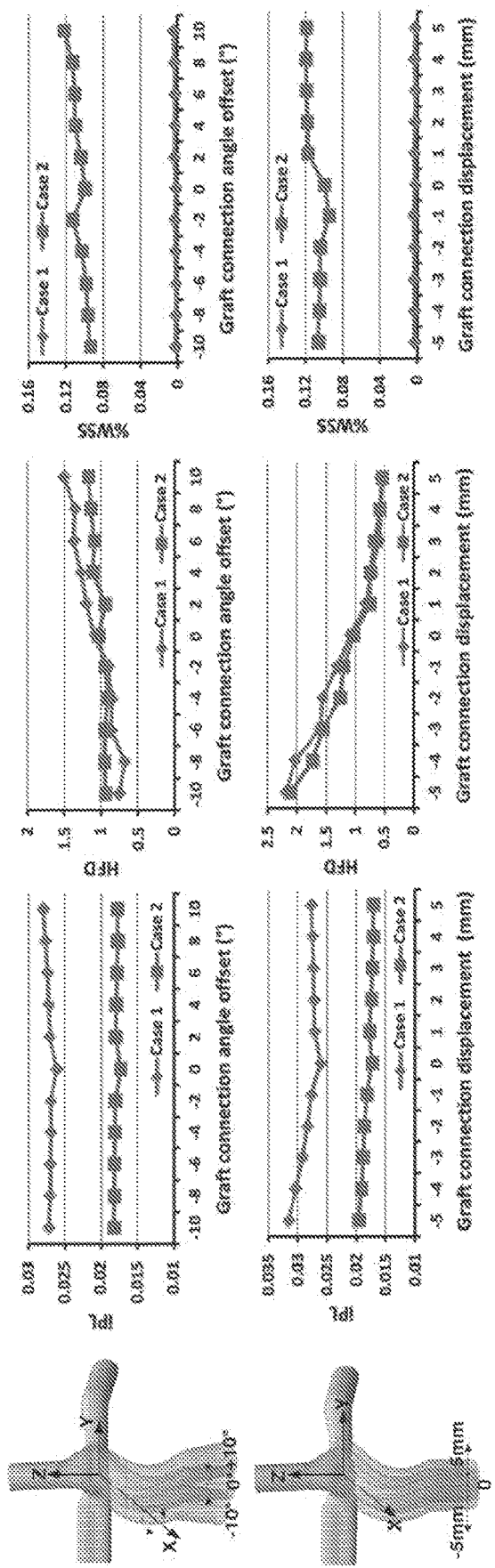
FIG. 19 shows a sensitivity analysis of AutoOpt graft implantation. The top row and the bottom row demonstrate how the graft connection angle offsets and the graft connection displacements affect the hemodynamic performance respectively.

1) Sensitivity Analysis of Graft Implantation: In FIG. 19, we demonstrated two types of graft implantation errors for both of the patient cases. The first row of the plots show how the anastomosis angle offsets ±10° affect iPL, HFD and % WSS. The means ($\mu$) and standard deviations ($\sigma$) of iPL, HFD, % WSS of each patient are represented as $\mu \pm \sigma$. For the patient case 1, we have 0.0271±0.0005 for iPL, 1.0779±0.2811 for HFD, and 0.0029±0.0009 for % WSS. For the patient case 2, we have 0.0179±0.0003 for iPL, 1.0169±0.0955 for HFD, and 0.1057±0.0086 for % WSS.

Multiple regression analysis and two sample t-tests (2 tailed, 95% confidence interval) were performed between the hemodynamic parameters and the anastomosis errors. The value of hemodynamic parameters from each patient case were normalized. Our results show that there were significant correlations between HFD and angle offset (r=0.924, p=8.4E−10), between % WSS and angle offset (r=0.847, p=6.5E−7), between iPL and connection displacement (r=0.849, p=5.9E−7), between HFD and connection displacement (r=0.97, p=9.2E−14), where r is the Pearson's correlation coefficient, p represents p-value with significance level of 0.05. Our results agree with the findings in [Phillip M Trusty, Zhenglun Alan Wei, Timothy C Slesnick, Kirk R Kanter, Thomas L Spray, Mark A Fogel, and Ajit P Yoganathan. The first cohort of prospective fontan surgical planning patients with followup data: How accurate is surgical planning? *The Journal of thoracic and cardiovascular surgery*, 157(3):1146-1155, March 2019.].

2) Sensitivity Analysis of Boundary Conditions in Hemodynamic Performance of AutoOpt Grafts: For testing how uncertainty of LPA/RPA flow splits affects the hemodynamic performance AutoOpt grafts, we introduced ±20% perturbation to the original $Q_{LPA}$ and adjusted $Q_{RPA}$ to conserve the systemic venous flow rate $Q_{IVC}+Q_{SVC}$. The updated BCs $Q'_{LPA}$, $Q'_{RPA}$, $Q'_{IVC}$ and $Q'_{SVC}$ are illustrated in Table 4 in the top 6 rows.

TABLE 4

Boundary conditions (BCs) for sensitivity analysis intruducing ±20% perturbation to $Q_{LPA}$, and BCs of different exercise levels. The values of original BCs are from Table 1.

| | Case 1 BCs | | | | Cass 2 BCs | | | |
|---|---|---|---|---|---|---|---|---|
| Conditions | $\hat{Q}_{LPA}$ [m³/s] | $\hat{Q}_{RPA}$ [m³/s] | $\hat{Q}_{IVC}$ [m³/s] | $\hat{Q}_{SVC}$ [m³/s] | $\hat{Q}_{LPA}$ [m³/s] | $\hat{Q}_{RPA}$ [m³/s] | $\hat{Q}_{IVC}$ [m³/s] | $\hat{Q}_{SVC}$ [m³/s] |
| +20% $Q_{LPA}$ | 3.31e-5 | 3.02e-5 | 4.03e-5 | 2.30e-5 | 2.84e-5 | 2.07e-5 | 3.29e-5 | 1.62e-5 |
| +10% $Q_{LPA}$ | 3.04e-5 | 3.29e-5 | 4.03e-5 | 2.30e-5 | 2.61e-5 | 2.30e-5 | 3.29e-5 | 1.62e-5 |
| +5% $Q_{LPA}$ | 2.90e-5 | 3.43e-5 | 4.03e-5 | 2.30e-5 | 2.49e-5 | 2.42e-5 | 3.29e-5 | 1.62e-5 |
| −5% $Q_{LPA}$ | 2.62e-5 | 3.71e-5 | 4.03e-5 | 2.30e-5 | 2.25e-5 | 2.66e-5 | 3.29e-5 | 1.62e-5 |
| −10% $Q_{LPA}$ | 2.48e-5 | 3.85e-5 | 4.03e-5 | 2.30e-5 | 2.13e-5 | 2.78e-5 | 3.29e-5 | 1.62e-5 |
| −20% $Q_{LPA}$ | 2.21e-5 | 4.12e-5 | 4.03e-5 | 2.30e-5 | 1.89e-5 | 3.02e-5 | 3.29e-5 | 1.62e-5 |
| 2 × $Q_{IVC}$ | 4.52e-5 | 5.84e-5 | 8.06e-5 | 2.30e-5 | 4.01e-5 | 4.29e-5 | 6.68e-5 | 1.62e-5 |
| 3 × $Q_{IVC}$ | 6.27e-5 | 8.12e-5 | 1.209e-4 | 2.30e-5 | 5.55e-5 | 5.94e-5 | 9.87e-5 | 1.62e-5 |

Figure 20:
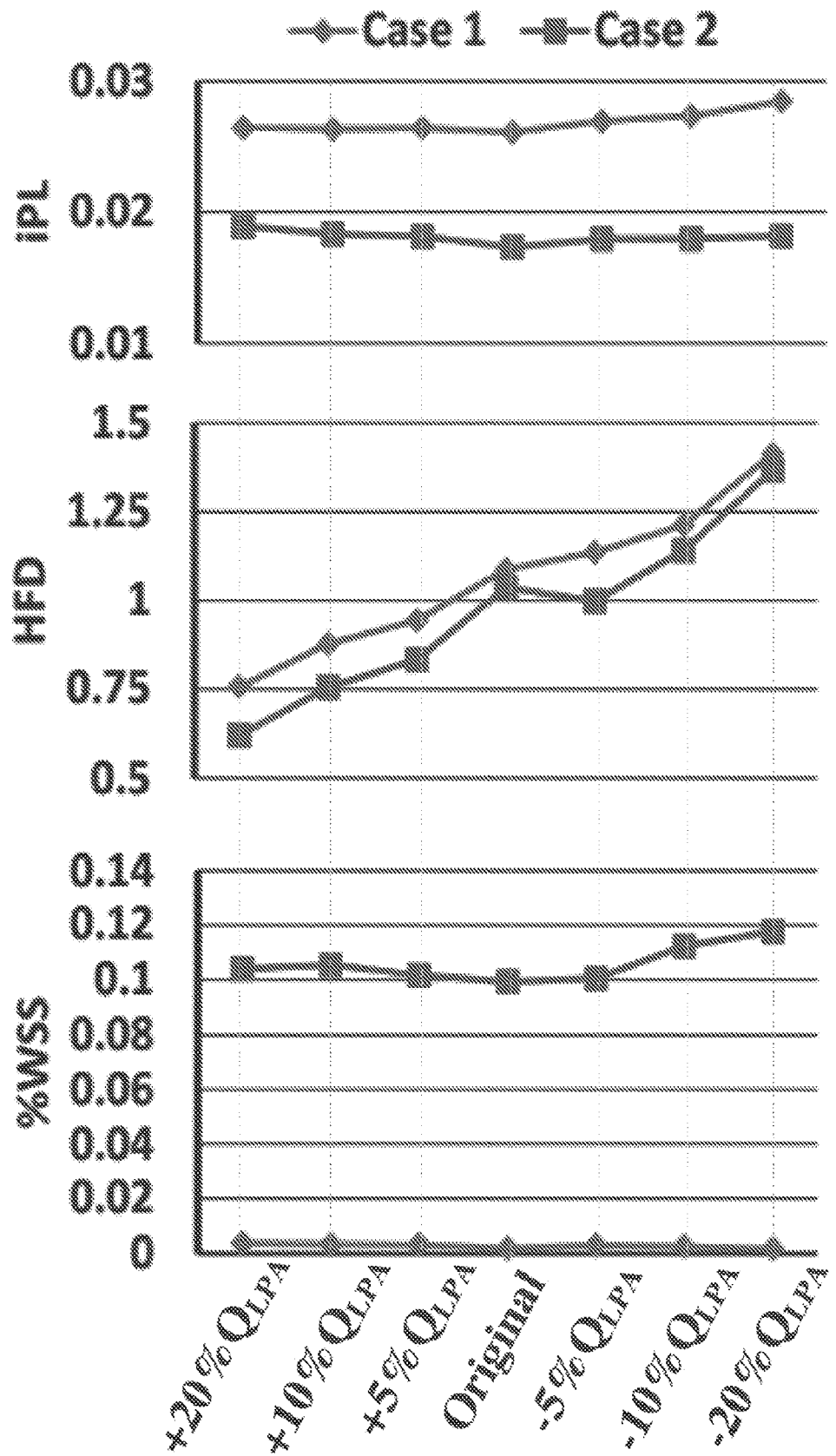
FIG. 20 are plots that show hemodynamic performance of AutoOpt grafts under uncertain boundary conditions.

FIG. 20 shows the iPL, HFD and % WSS of the AutoOpt grafts (developed from the original boundary conditions in Table 1) under the updated BCs. The x-axis represents the BCs in Table 4. The means and standard deviations for iPL, HFD and % WSS are 0.0268±0.0008 (Case 1) and 0.0181±0.0005 (Case 2), 1.0610±0.2207 (Case 1) and 0.9642±0.2512 (Case 2), and 0.0028±0.0007 (Case 1) and 0.1058±0.0068 (Case 2), respectively. The results show only the normalized HFD results significantly correlates with and the uncertainty of flow splits (r=0.989, p=2.9E−11).

3) Sensitivity Analysis of Surrogate-based Optimization:
In the analysis, we firstly evaluated how the uncertainty of LPA/RPA flow splits affects the geometrical shape of AutoOpt grafts (via influencing the training data of surrogate models). We used the optimized design parameters in Table 3 as the initial guesses for the constrained optimization with the updated surrogate models. To quantify the geometrical shape changes (comparing with the AutoOpt grafts by using the training data collected from the original BCs) of the optimized grafts, we introduced a bidirectional root mean square error of Hausdorff distances in (10) to measure their similarly, where p and $p^0$ represent 3D surface points of the two graft models $M_{C1}$ and $M_{C2}$ respectively as shown in FIG. 21A.

$$S = \sqrt{\frac{1}{N}\left\{\sum_{p \in M_{C1}}\left(\min_{p' \in M_{C2}} \|p - p'\|\right)^2 + \sum_{p' \in M_{C2}}\left(\min_{p \in M_{C1}} \|p - p'\|\right)^2\right\}} \quad (10)$$

Figure 21:
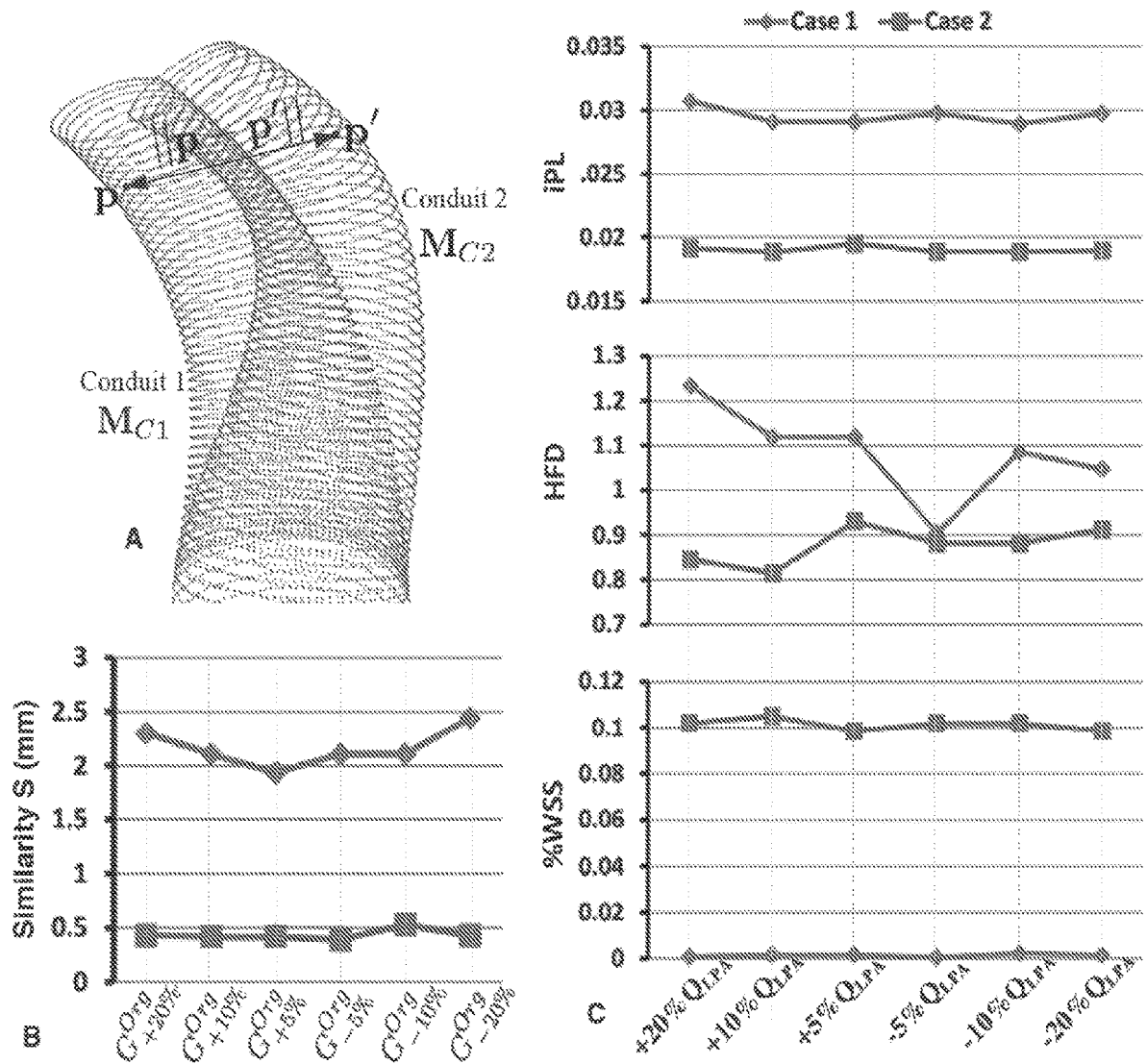
FIG. 21 (Panels A-C) illustrate the geometry changes of AutoOpt grafts by introducing uncertain LPA/RPA flow splits, and their results hemodynamic performance.

FIG. 21B shows the results of graft shape similarity. The categories along the x-axis represent graft shape comparing groups. For example, $G^{Org}_{+20\%}$ represents comparing the shapes of the AutoOpt grafts, which were learned and computed from the original training dataset and a modified training dataset with the BCs indicated in the row of +20% $Q_{LPA}$ in Table 4. The means and standard deviations of S for the two patient cases are 2.165±0.1796 mm and 0.4459±0.0527 mm respectively. The normalized S are not significantly correlated to the uncertainty of the BCs in the training datasets (p>0.05).

FIG. 21C shows the hemodynamic performance of the AutoOpt grafts that were computed from the training data with modified BCs. These BCs are labeled in the x-axis and detailed in row 1 to row 6 in Table 4. The means and standard deviations of iPL, HFD and % WSS are 0.0303±0.0007 (Case 1) and 0.0190±0.0003 (Case 2), 1.0848±0.1081 (Case 1) and 0.8773±0.0423 (Case 2), 0.0015±0.0007 (Case 1) and 0.1013±0.0025 (Case 2), respectively. The statistic analysis indicated none of the hemodynamic parameters are significantly correlated to the uncertainty of BCs in the training datasets (p>0.05).

C. Influence of Exercise Conditions on AutoOpt Grafts

Figure 22:
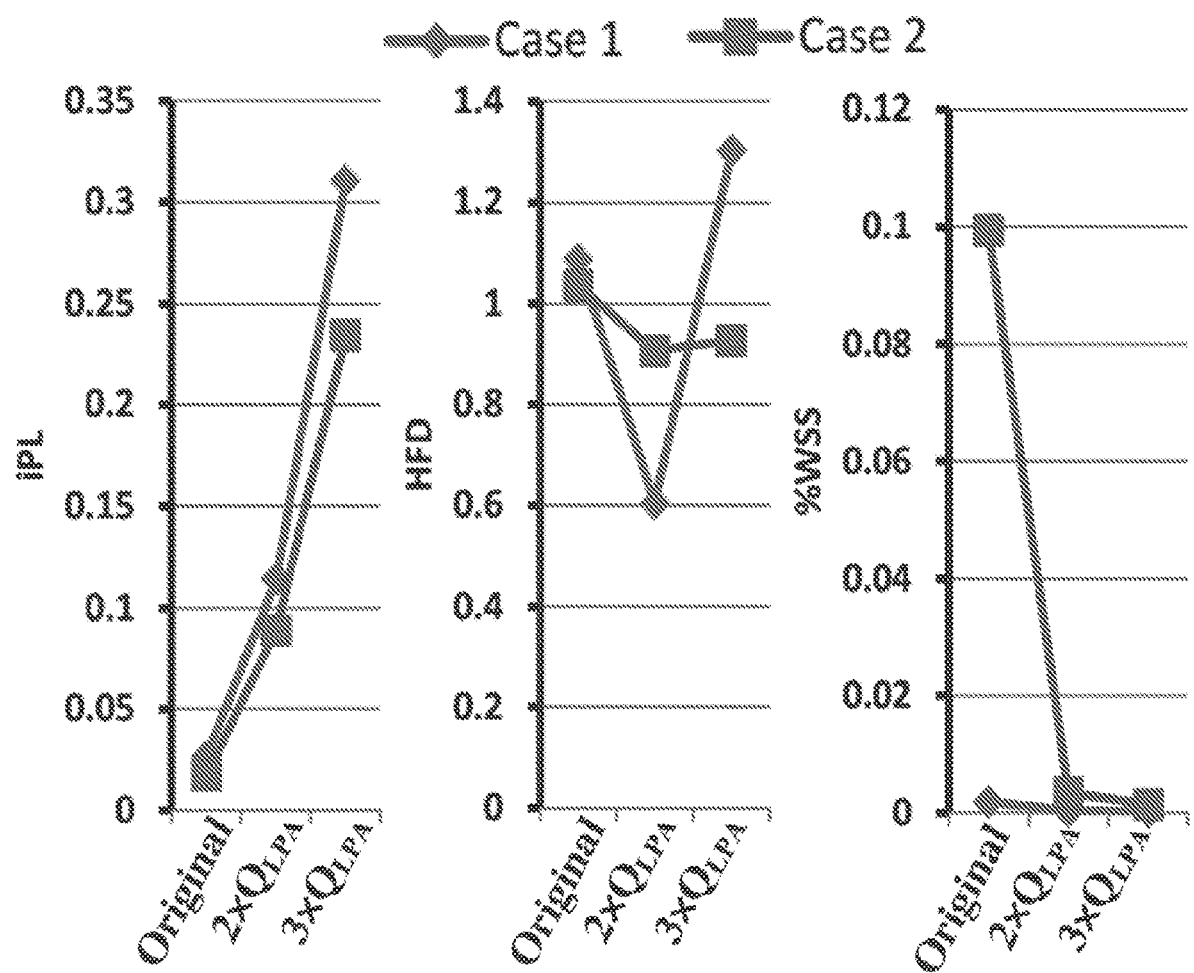
FIG. 22 are plots that show hemodynamic performance of AutoOpt grafts under exercise conditions. Original indicates the boundary conditions (BCs) in Table 1. The BCs of $2 \times Q_{IVC}$ and $3 \times Q_{IVC}$ are indicated in the last two rows of Table 4.

FIG. 22 shows the hemodynamic performance of the AutoOpt grafts (computed from the training datasets with original BCs) by doubling and tripling the averaged flow rates at IVC to mimic different levels of exercise conditions. The flow rates at SVC were kept as original values, and the flow rates at LPA and RPA were calculated based on original flow splits and new systemic venous flow rates at each exercise level. The exercise BCs are in the last two rows of Table 4.

Our result indicates that as the exercise intensity increases, iPL rapidly increases (0.114 under 2×$Q_{IVC}$ Condition, 0.311 under 3×$Q_{IVC}$), and % WSS rapidly decreases. The result aligns with the prior research, which shows the correlation between the patient's exercise capacity and total cavopulmonary connection (TCPC) power loss. The HFD values of both cases are generally within the threshold. One patient (Case 2) has more steady HFD than the other (Case 1) under the exercise conditions.

D. Patient-Specific TEVG Manufacturing

Figure 23:
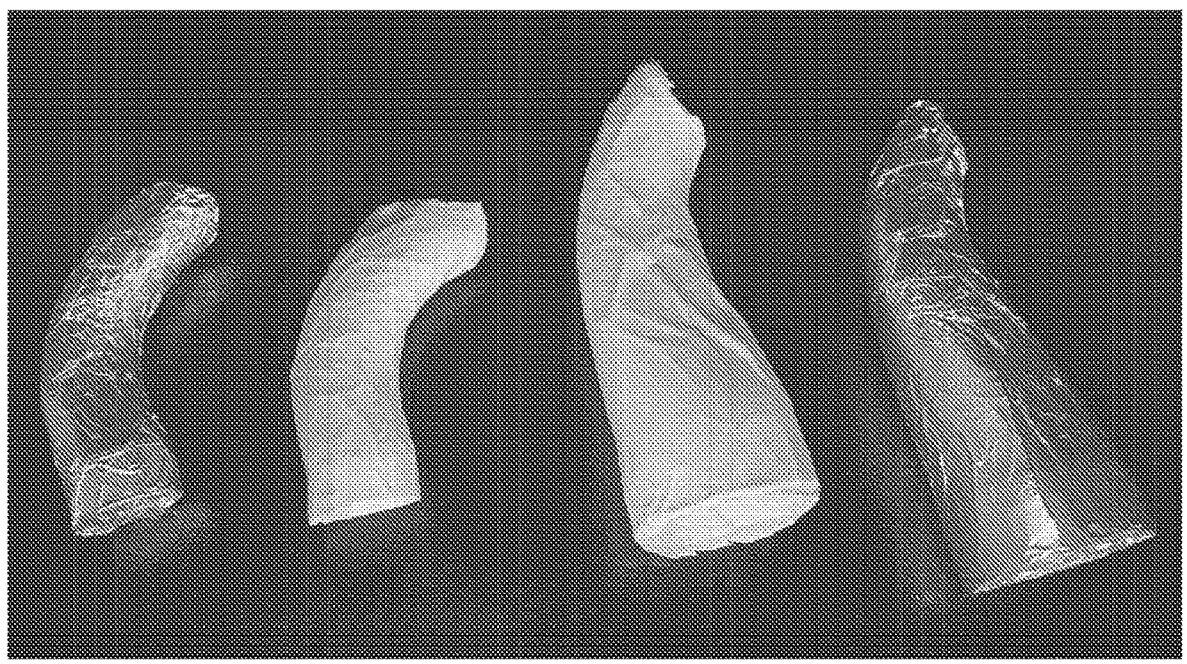
FIG. 23 are images that show manufacturing of the automatically optimized tissue engineered vascular grafts of Case 1 and Case 2.

To demonstrate the feasibility of manufacturing the patient-specific AutoOpt grafts shown in the last row of FIG. 18 for the two patients, we employed electrospinning technique to 3D-print the grafts. The electrospinning process applied high electric field on a polymer solution, which mixed polyglycolide (PGA) and poly(l-lactide-co-caprolactone) (PLCL). By increasing the electric field, the strand of polymer solution squirted out of the spinneret and was collected by grounded spinning mandrels, as conceptually shown in FIG. 2D. The mandrels with the AutoOpt graft geometries were 3D-printed by using acrylonitrile butadiene styrene (ABS) polymers and wrapped by aluminum foil for electroconductivity. In clinical application, the mandrels will be 3D-printed by stainless steel for easy sterilization. FIG. 23 shows the aluminum foil wrapped mandrels and the grafts made by the nanofiber. The 3D-printed TEVG has a uniform wall thickness of 657±36 μm.

The burst pressure and compliance of the TEVGs were evaluated in a sheep model for 6 months in our prior study. The burst pressures of preoperative TEVG, 6-month TEVG and native IVC are 6167±5627 mmHg, 11,685±11,506 mmHg, 13,062±6847 mmHg respectively. There was no significant difference among the groups (p>0.05). The compliance of preoperative TEVG was significantly greater than that of native IVC, but there was no significant difference between 6-month TEVG and native IVC.

VIII. Discussion

To the best of our knowledge, this is the first effort to automatically design patient-specific hemodynamically optimized Fontan grafts. We are aware of that any engineered graft designs, even when fully optimized, lack the surgeon's full confidence in direct implementation. In our prior work, we have developed a patient-specific graft design user interface, which is able take the surgeon's intuitive Fontan pathway planning as the initial design parameters for the automatic optimization method. Our technique can bridge the gap between machine intelligence and clinical medicine, allowing the surgeon to directly incorporate their unique understanding of surgical field into the design of Fontan grafts, as well as directly receiving optimized surgical planning based on the surgeon's preferred Fontan pathways.

We introduced % WSS as a design constraint to prevent oversizing Fontan conduits that can lead to flow stagnation and thrombosis. This measurement is based on our prior study and has not been clinically validated. The threshold % WSS<10% was an arbitrary cutoff. However, it is convenient to alter this measurement in our technique according to other physiologic standards. In addition to % WSS, we used InDep to measure the interference between Fontan pathway and the heart model. Clinically, the conduit's physical interaction is more tolerable with the heart than with other vessels. Although we did not directly consider conduitvessel interaction in this article, it is straightforward to apply an additional $f_{InDep}$ in (9) with stricter thresholds.

One limitation of this work is that we predict the postoperative BCs by using pre-operative BCs. Although a clinical study indicates there are no significant differences in pre- to postoperative changes in flow rates, the differences still will be a factor to affect the accuracy of surgical planning. Further improvement of the prediction of postoperative BCs could be approached by using lumped parameter network that can dynamically adjust flow and pressure at the boundaries for the changes in post-surgical Fontan anatomies. One other limitation is the expressiveness of the design space representation. Manual designs, including the engineer's CAD deigns and the surgeon's clay modeling, allow subtle tuning of the conduit's geometry especially at the conduit-SCPC anastomosis area. A thorough design space study will be conducted to improve this aspect.

IX. Conclusion

We proposed a semi-automatic extracardiac Fontan pathway planning method for designing patient-specific hemodynamically optimized Fontan conduits. We tested the proposed method in two patient-specific models (n=2), and compared hemodynamic performance between ManuOpt Fontan models and AutoOpt Fontan models. The results demonstrated that the AutoOpt model hemodynamically outperformed the ManuOpt model in one case. In the other case, AutoOpt and ManuOpt models have comparable hemodynamic performance. It is worth noting that the average AutoOpt design time was about 15 hours, while the average ManuOpt design time was over two weeks. Our study showed HFD of an optimized Fontan pathway was significantly affected by anastomosis errors and uncertainty of BCs. Accurate prediction of BCs and accurate graft implantation are important to maintain optimal postoperative hemodynamic performance. We also showed the feasibility to 3D-print the AutoOpt conduits as TEVGs by using biodegradable materials.

Example 2: Automatic Shape Optimization of Patient-Specific Tissue Engineered Vascular Grafts for Aortic Coarctation

I. Introduction

Among the leading causes of newborn death, congenital heart disease (CHD) affects nearly 40,000 infants in the US per year with approximately 25% of neonates born with CHD requiring invasive or other potentially lifesaving treatments. Aortic arch anomalies such as aortic coarctation and hypoplasia often require early surgical intervention to preserve normal systemic perfusion.

The current surgical repair techniques of aortic coarctation include 1) resection with end-to-end anastomosis, 2) patch aortoplasty, 3) interposition grafts, and 4) subclavian flap aortoplasty. In cases of significant associated arch hypoplasia, an aortic arch reconstruction may be required, which combines several of the techniques above. The current techniques can result distortion of the aortic arch shape, and is limited by the available synthetic materials such as polytetrafluoroethylene (PTFE) or polyester (Dacron®) which do not grow with the child and thus require revision or replacement. In addition to poor growth, these synthetic materials also demonstrate calcification and stenosis, requiring multiple interventions in the long term that hinder their application in pediatric aorta surgery. Biocompatible materials, including autografts and allografts, works well although they have a limited availability and can be prone to dilation over time.

Tissue engineered vascular grafts (TEVGs) offer a promising strategy for overcoming such complications. Using an FDA approved biodegradable scaffold, such as poly-L-lactide (PLLA) and poly-e-caprolactone (PCL), the patient's own cells can proliferate and provide physiologic functionality and growth over time. To create TEVGs with custom shapes, electrospun nanofibers can be deposited on a 3D printed stainless steel mandrel. For example, our work demonstrated feasible 3D-printed TEVGs in venous circulation using a sheep model. The feasibility of customizing the shapes of TEVGs opens the door to designing patient-specific grafts that achieve optimal patient outcomes during aorta repair. Surgical intuition can be combined with computational predictions of hemodynamics to achieve an optimized, durable, patient-specific design for aortic arch repair.

Our research objective is to develop a computational framework for automatically designing optimal shapes of patientspecific TEVGs for aorta surgery. In our prior research, we have investigated manual design optimization of patient-specific graft geometry by using computational fluid dynamics (CFD) and computer-aided design (CAD) software. Custom design tools for graft geometry manipulation were developed by other research groups for the ease of manual design process. Nonetheless, considering manual design optimization involves time consuming trial-and-error process to achieve suboptimal hemodynamic performance, gradient-based and derivative-free design optimization algorithms in combination with CFD analysis have been used to optimize 2-D/3-D ideal models of coronary artery bypass grafts (CABGs). By using the ideal model assumption, shape parameterization and optimization of graft geometry can be significantly simplified. Different from CABGs, aortic grafts cannot be treated by using ideal models due to the variety of aorta shapes. Therefore, automatic design optimization of patient-specific aortic graft for clinical needs is still an open problem.

In this Example, we demonstrate a computational framework for automatically optimizing the shape of patient-specific tissue engineered vascular grafts. We apply this computational framework to a case of aortic coarctation for proof-of concept. By controlling a set of design parameters to deform a cylindrical lattice applied on a patient's native aorta model, various geometric shapes are generated for computing values of the objective function by CFD simulation. Instead of using commercial CFD software, we employ an open-source CFD solver (OpenFOAM) which is seamlessly integrated in our computational framework. Based on the observation data from CFD simulation, the hemodynamic surrogate model for each patient's aorta is trained by using Gaussian process regression. The globally optimal design parameters can be found by running a multi-start conjugate gradient optimization on the surrogate model for computing the final geometric shapes of the TEVGs. The primary contributions of this paper include: 1) demonstration of an automatic optimization pipeline for designing TEVGs; 2) an effective freeform deformation method for representing and exploring the shape of aortic grafts; and 3) online training and optimizing the hemodynamic surrogate model to identify the optimal design parameters.

II. Method

Figure 24:
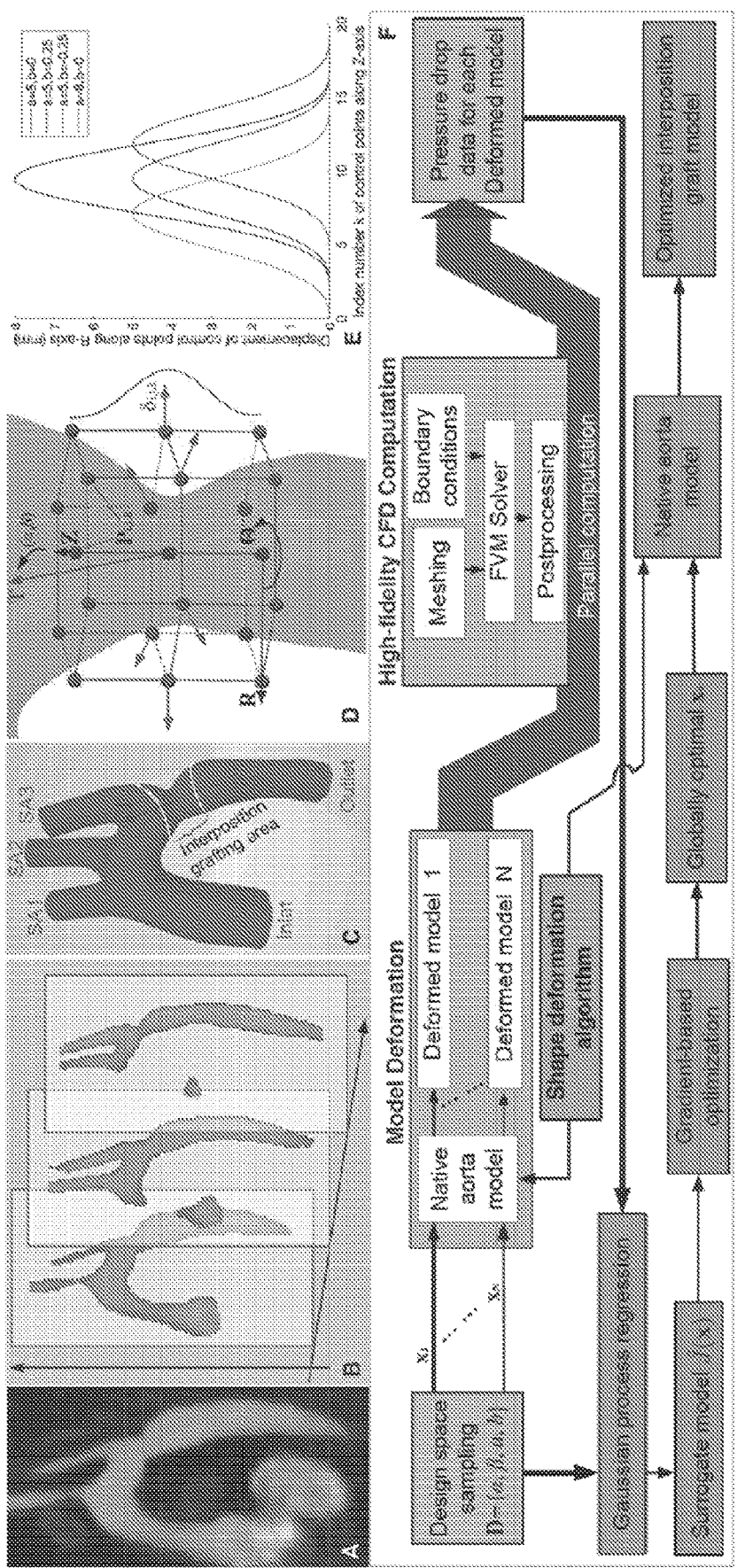
FIG. 24 (Panels A-F) show an illustration of aorta model preparation and computational framework of design optimization. (A) 3D contrast-enhanced magnetic resonance angiography (MRA) of aorta. (B) Slices of the MRA dataset for 3D aorta model reconstruction. (C) Region of interest for design optimization (red circle) and boundaries for numerical computation. (D) Illustration of the shape deformation method. (E) Displacement patterns of control points by varying a and b in $\delta_{i,j,k}$. (F) Computational framework for automatic design optimization.

FIG. 24 shows the preparation of a patient's native aorta model and the computational strategy for design optimization. Contrast-enhanced magnetic resonance angiography (MRA) data as shown in FIG. 24A was used to build a 3D virtual model of the aorta through a segmentation process, in which a sequence of spatially distributed slices of MRA dataset were created as shown in FIG. 24B. The shape deformation method (FIG. 24D) is applied on the smoothed 3D aorta model (FIG. 24C) to explore optimal shapes of the coarctation area.

The objective of this proof-of-concept design optimization is to minimize the energy loss J of blood flow between the inlet and the outlet shown in FIG. 24C by deforming the shape of the coarctation area. The design space D includes design parameters to control deformation of the cylinder lattice and subsequently control the shape of the aorta model. FIG. 24F demonstrates the computational framework of automatic design optimization. A computationally low-cost Gaussian process surrogate model is developed to replace the high-fidelity CFD for approximating the objective function J(x). The training data of the surrogate model are obtained by running a limited number of high-fidelity CFD simulation as shown in the yellow blocks of FIG. 24F. By applying gradient-based optimization on the surrogate model, the globally optimal design parameters $x_0$ can be found. The optimal shape of graft for the area of aortic coractation is restored by feeding $x_0$ to the shape deformation algorithm. In the following, we discuss the major components of our method in detail.

A. Graft Shape Deformation and Parameterization

The shape deformation algorithm for graft optimization in this Example is based on free-form deformation (FFD). The main idea of FFD is to deform an object by warping the space that contains the object. We construct a cylinder lattice as shown in FIG. 24D to cover the space where the coarcation is located. Given a set of arbitrary global coordinates (r, θ, z) in the space, the reference coordinates ($\hat{r}$, $\hat{\theta}$, $\hat{z}$) of the unit trivariate space can be calculated by $\hat{r}=r/|R|$, $\hat{\theta}=\theta/|\Theta|$, $\hat{z}=z/|Z|$.

The warping of the space is formulated in the mapping function $X_m(\hat{r}, \hat{\theta}, \hat{z})$ with nodes $P_{i,j,k}$ on the lattice as control points.

$$X_m = \sum_{i=0}^{n_r}\sum_{j=0}^{n_\theta}\sum_{k=0}^{n_z} B_{i,n_r}(\hat{r})B_{j,n_\theta}(\hat{\theta})B_{k,n_z}(\hat{z})(P_{i,j,k} + \delta_{i,j,k}), \quad (1)$$

where $r=i/n_r$, $\theta=j/n_\theta$, $z=k/n_z$. $n_r$, $n_\theta$ and $n_z$ are the number the control points in directions of R, Θ and Z without counting the local origin point. $B_{i,n_r}(\hat{r})$, $B_{j,n_\theta}(\hat{\theta})$ and $B_{k,n_z}(\hat{z})$ are the $n_r$-order, $n_\theta$-order and $n_z$-order Bernstein basis polynomial functions. We introduce a vector parameter $\delta_{i,j,k}$ with dimensions of $3\times(n_r+1)\times(n_\theta+1)\times(n_z+1)$ for adding a spatial offset on $P_{i,j,k}$.

The coordinates of $P_{i,j,k}$ are represented as $$P_{i,j,k} = X_0 + \frac{i}{n_r}R + \frac{j}{n_\theta}\Theta + \frac{k}{n_z}Z, \quad (2)$$

where $0\leq i\leq n_r$, $0\leq j\leq n_\theta$, $0\leq i\leq n_z$. In this study, we set $n_r=1$, $n_\theta=14$, $n_z=20$, $|R|=18$ mm, $|\Theta|=2\Pi$ and $|Z|=20$ mm for creating a cylinder space to contain the segment of coarctation.

To efficiently explore the geometry deformation at the coarctation region, our strategy is to move the control points in groups instead of controlling all the dimensions of $\delta_{i,j,k}$ individually. Considering the shape of the coarctation area, an intuitive shape exploration is to stent this area. Therefore, in this paper we design a deformation function in (3) to move the control points radially away from the centerline Z of the cylinder lattice.

$$\delta_{1,j,k} = a\left(1 - \left(\frac{2k}{n_z} - 1 - b\right)^2\right)^8 \quad (3)$$

The profiles of (3) are illustrated in FIG. 24E. This function is only dependent on node index k in Z direction, applies to the control points on the cylinder wall (red nodes in FIG. 24D), and moves the control points in R direction. We set $\delta_{0,j,k}$ to zero for keeping the blue nodes (FIG. 24D) along the centerline unmovable. The parameters a and b are used to adjust the peak magnitude and offset for various patterns of deformation.

In order to provide more freedom on exploring the shape deformation, we introduce two additional parameters α and β, which control the direction of the cylinder lattice's Z-axis around T shown in FIG. 24C-D. T is a tangent vector of the aorta model's centerline at the point $p_o$.

Figure 25:
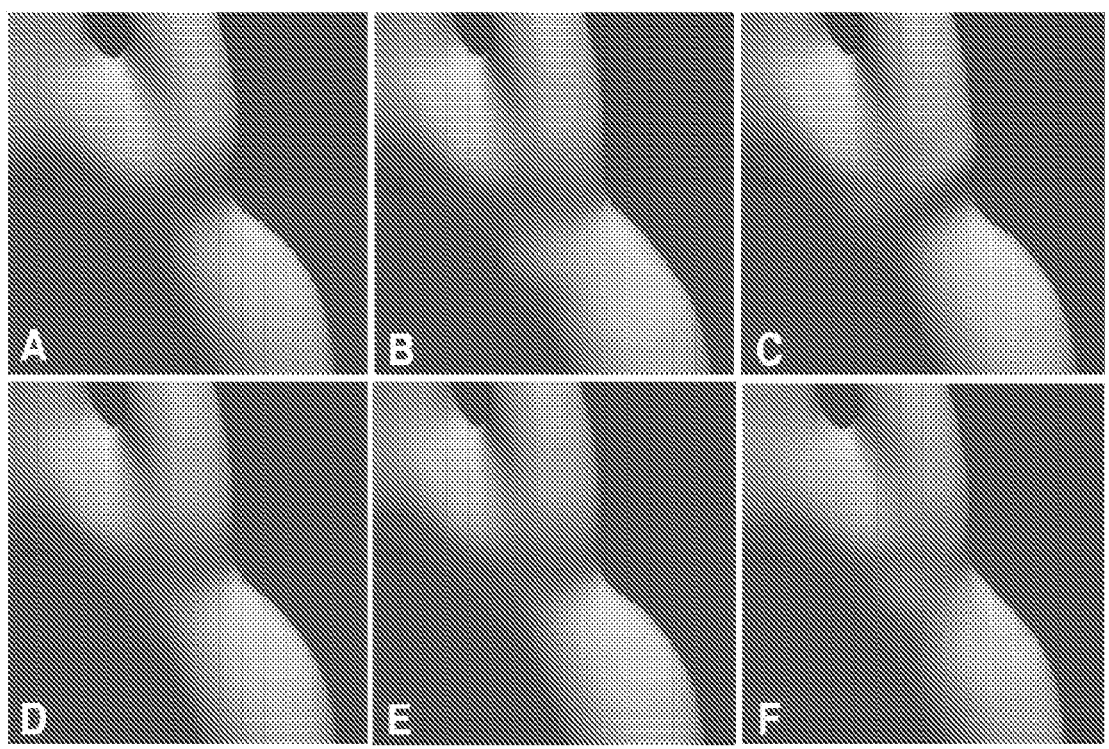
FIG. 25 (Panels A-F) show an illustration of the shape deformation algorithm with randomly sampled design parameters x=(α,β,a,b). (A) Native model $x_A$=(0°, 0°, 0 mm, 0). (B) $x_B$=(27.6°, 5.3°, 7 mm, −0.24). (C) $x_C$=(75.4°, 9.1°, 5 mm, 0.24). (D) $x_D$=(304.6°, 3.7°, 3.5 mm, −0.1). (E) $x_E$=(54.2°, 9.7°, 2.1 mm, 0.04). (F) $x_F$=(201.3°, 20.8°, 4.5 mm, −0.15).

FIG. 25 demonstrates shape deformation of the aorta model by controlling the design parameters x=(α, β, a, b)∈D⊂R⁴. The design space D in this study is set as a∈[0.10 mm], b∈[−0.25, 0.25], α∈[0°, 360°] and β∈[0°, 10°] according to the specific model tested in this paper. The following task is to find a set of design parameters that yield the minimized energy loss of blood flow.

B. Gaussian Process Surrogate Model and Optimization

The energy loss of blood flow is represented by inlet outlet pressure drop J(x) for each deformed aorta model in this proof-of-concept study. The measurement of J(x) involves running computationally expensive CFD simulation that prohibits searching for all different combinations of design parameters. An alternative solution for this task is to train a surrogate model s(x) to approximate the exact objective function J(x) by using Gaussian process regression:

$$J(x)=\hat{\gamma}+c^T(x)\hat{C}^{-1}(J-\hat{\gamma}f), \quad (4)$$

represents the covariance matrix with the kernel function modeled as $$C(x^i, x^j) = \exp\left(-\sum_{s=1}^{n_\theta}\theta_s|x^i - x^j|^2\right). \quad (5)$$

c(x) is the covariance vector $$c(x)=[C(x,x^1), \ldots, C(x,x^{n_s})]. \quad (6)$$

$\theta_s$ denotes correlation parameters. J represents the vector of $n_s$ observed pressure drops ($n_s=50$ in this study) which are obtained by using the method in Section II-C of this Example. $x^i$ (i=1, . . . , $n_s$) represents the sampled design parameters by using Latin hypercube sampling (LHS) method. f is a unity vector with a dimension of $1\times n_s$. $\hat{\gamma}$ is obtained by using generalized least squares as $$\hat{\gamma}=(f^TC^{-1}f)^{-1}f^TC^{-1}J. \quad (7)$$

The objective of design optimization is to find x. for minimizing s(x), which is mathematically described in (8).

$$x_o = \underset{x \in D}{\mathrm{argmin}}\hat{J}(x) \quad (8)$$

In order to search globally optimal design parameters, we employ a multi-start conjugate gradient method on s(x) by sampling sets of design parameters in the design space D. Then we use $x_o$ as the input of the shape deformation algorithm to apply on the native model of aorta. An optimized TEVG can thus be manufactured by 3D electrospinning based on the shape of the optimally deformed model.

C. High-Fidelity CFD Computation

The hemodynamics of the aorta is governed by the Navier Stokes equation and the continuity equation in (9) and (10) based on the following assumptions for ensuring reasonable computation time: 1) blood was modeled as Newtonian, incompressible laminar flow with constant viscosity of $\mu=3.5\times10^{-3}$ Pa·s and a density of $\rho=1.06\times10^3$ kg·m$^{-3}$, 2) the aorta geometry was modeled with rigid walls.

$$u \cdot \nabla u + \frac{\nabla p}{\rho} - \nu\nabla^2 u = 0 \quad (9)$$

$$\nabla \cdot (\rho u) = 0 \quad (10)$$

In equations (9) and (10), u is the fluid velocity vector, p is the velocity pressure, and $v=\mu/\rho$ is the kinematic viscosity. As illustrated in FIG. 1C, the boundary conditions of the inlet (peak flow rate 0.96 m·s$^{-1}$), outlet (pressure 9119.1 Pa), SA1 (mass flow rate 0.087 kg·s$^{-1}$), SA2 (mass flow rate 0.048 kg·s$^{-1}$), and SA3 (mass flow rate 0.057 kg·s$^{-1}$) were measured by MRI and invasive cardiac catheterization. The blood flow velocities at the aorta wall were assumed as zero.

To solve the velocity field and the pressure field in the computation domain, we employ OpenFOAM software package for meshing deformed aorta models (using snappyHexMesh mesher), solving (9) and (10) (using SimpleFoam solver), and extracting the inlet-outlet pressure drop J from the computed numerical results. The computational framework proposed in this paper supports parallel computation of the high-fidelity simulation for different deformed models, which can significantly reduce the total computation time.

III. Results

A. Configuration and Computation Performance

The proposed computational framework of design optimization was written in C++ programming language, and run on a PC with the operating system of Ubuntu 18.04 LTS. The PC is with the configuration of Intel® Core™ i9-9900 CPU @3.10 GHz and 32 GB random-access memory.

The total computation time of the automatic optimization shown in FIG. 24F mainly depends on the number of computing cores for parallel computation (8 cores were used for this work), the number of high-fidelity CFD observation for training the surrogate model ($n_s$=50), the number of mesh cells for each deformed model (about 0.5 million), the type of blood flow for CFD computation (laminar flow), and the dimension of design space D ($D \subset R^4$). In this work, it took about 3 hours and 20 minutes to complete the computation of design optimization.

B. Optimization Results

For searching the globally optimal design parameters, we sampled 20 sets of design parameters as the initial guesses for multi-start optimization on $\hat{I}$. Table 5 shows the optimized design parameters that yield 5 smallest $\hat{J}$ values. The optimized $\hat{J}$ falls in the short range from 6.65 mmHg to 6.71 mmHg. To investigate the correlations among $\hat{J}$ and the design parameters ($\alpha$, $\beta$, a, b), we illustrate the correlation matrix in FIG. 26A. The cold colors represent negative correlation and the warm colors represent positive correlation. The numbers shown in the grid are the correlation coefficients. The data show $\alpha$, $\beta$ and a have negative correlations with $\hat{I}$, while b has positive correlation with $\hat{J}$. The design parameters a and a show stronger correlations with $\hat{J}$ than $\beta$ and b.

TABLE 5

SELECTED 5 RESULTS OF MULTI-START OPTIMIZATION

| | α(°) | β(°) | a(mm) | b | $\hat{J}$ (mmHg) |
|---|---|---|---|---|---|
| 1 | 222.43 | 4.56 | 4.08 | −0.14 | 6.65 |
| 2 | 296.21 | 3.80 | 4.27 | −0.07 | 6.71 |
| 3 | 241.84 | 5.06 | 4.12 | −0.15 | 6.69 |
| 4 | 136.33 | 2.46 | 4.07 | −0.14 | 6.68 |
| 5 | 359.41 | 4.42 | 4.42 | −0.11 | 6.67 |

FIG. 26B and FIG. 26C show the anterior and posterior coronal views of the native and optimized aorta models. We demonstrate the comparison of pressure field distribution for the native and optimized models. The optimized model was generated by using the design parameters in the first row of Table 5. The deformation areas are highlighted in the yellow rectangles. The pressure field maps are represented by using kinematic pressure p/p with the unit of m$^2$·s$^{-2}$. We extracted the inlet-outlet pressure drops and converted kinematic pressure m$^2$·s$^{-2}$ to the clinically relevant pressure unit mmHg as $J_n$=9.54 mmHg and $J_o$=6.69 mmHg respectively. The results show about 30% energy loss reduction of blood flow in aorta by optimizing the aortic geometry at the coractation area.

Although significant improvement in energy loss was achieved in the optimized aorta graft, we can see that the coarctation was not completely fixed in FIG. 26C. We think the design space dimension used in this paper should be further increased by reformulating (3) to gain more freedom for exploring the remaining coarctation area, which will be conducted in our future study.

IV. Conclusion

This Example provided an initial evidence to demonstrate the effectiveness of our automatic shape optimization method for TEVG design. We proposed a shape deformation method with a set of design parameters to explore optimal graft shapes. To identify the optimal design parameters, we optimized a Gaussian process surrogate model, which is generated by using a set of observation data from high-fidelity CFD simulation. The optimization results showed about 30% energy loss reduction of blood flow in the optimized aorta model. According the preliminary results, we found using four design parameters for the graft shape exploration was unable to fully remove the coarctation area. An improvement on the dimension of the design space is needed.

In addition, the laminar flow assumption used in this paper simplified the numerical computation of (9) and (10) to ensure reasonable computation time while still capable of capturing important fluid dynamic characteristics. But the Reynolds number of blood flow in aorta is typically greater than 2100 that suggests turbulent flow. In the future study, we plan to investigate if the different assumptions result in significant differences of optimized grafts.

Example 3: CORFIX: Virtual Reality Cardiac Surgical Planning System for Designing Patient Specific Vascular Grafts

1. Introduction

In this Example, we developed a novel virtual reality (VR) vascular graft design software, CorFix, that provides solutions to aforementioned challenges. CorFix bridges CAD and surgery by featuring 3D visualization of anatomies with depth perception, diagnostic tools, and design guidelines for unlocking the potential for designing a truly patient specific vascular grafts and for expanding the breadth of the users. To evaluate the software, we've performed usability and design performance study where we Compared CAD Software and CorFix by 8 Experienced Engineers.

II. Method: Corfix Surgical Planning System

The VR surgical planning software, CorFix, was built in Unity 3D (California, USA) using Alienware Aurora R8 (Dell, Florida, USA) with Intel Core i7-9700 processor, NVIDIA GeForce RTX-2080Ti, and 16 GB of RAM. CorFix was displayed on Oculus Rift S and controlled by the Touch controller (Oculus VR, California, USA). The anatomies (i.e. proximal cavae, branch pulmonary arteries, and heart) were obtained by segmenting anonymized magnetic resonance angiography (MRA) data that is late-phase, nongated, and breath-held. The MRA data was converted into OBJ format, which is imported directly into CorFix, via automatic thresholding and manual methods. CorFix is designed for diagnostics and surgical planning of Fontan in VR to provide better depth perception of CAD models with stereoscopic visualization compared to the 2D display. With the consultation of experienced cardiologists and cardiac surgeon, zoom, rotation, label, ruler, and clipping and cutting vessels, parametric modeling, and freeform modeling were featured for diagnostics and surgical planning, respectively.

2.1 Diagnostic and Visualization Features 2.1.1 Zoom and Rotation. The zoom and rotation features were implemented by updating the scale and translating the 3D coordinates of the anatomies by the mapped x, y, and z values from the thumbstick of the Touch controller.

2.1.2 Labeling. The labelling feature (FIG. 27A) consists of a pointer sphere, distance line renderer, and text canvas. The pointer sphere identifies the location of each label on the anatomy. A distance line renderer is drawn between the pointer spheres and the text canvas. Haptic feedback and color modification were incorporated to provide a visual and tactile sensory feedback while typing.

2.1.3 Ruler. The virtual ruler (FIG. 27B) calculates the Euclidian distance between the user identified points. Then, 1 Unity unit to 0.1 cm and the zoom scale were multiplied for real-life-unit conversion.

Figure 27:
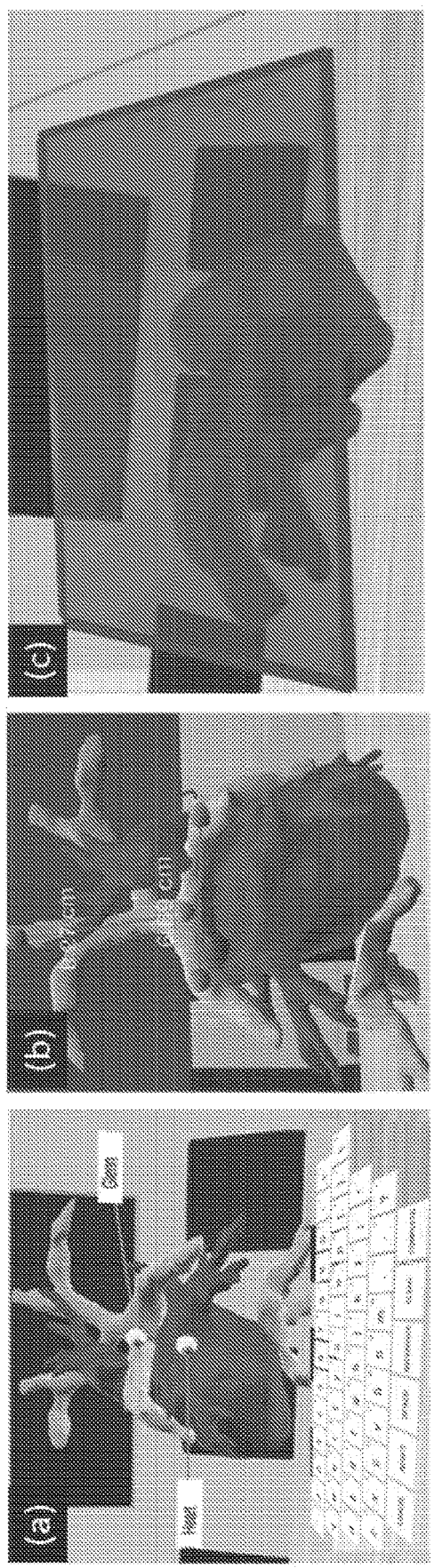
FIG. 27 (Panels A-C) are screenshots of diagnostic functionalities of CorFix: (a) labeling, (b) ruler, and (c) clipping.

2.1.4 Clipping. The clipping feature required ceasing the rendering of the 3D coordinates of the anatomies beyond the clipping plane. To accomplish this, the vector of the clipping board was projected onto the anatomy vector. Any vectors below 0 were not rendered resulting in a sliced view of the anatomy (FIG. 27C).

2.2 Surgical Planning Feature 2.2.1 Vessel Cut and Relocation. During Fontan surgery, surgeons detach the IVC from the right atrium and relocate it to a desired coordinate for connecting a conduit. To mimic this surgical step, a virtual plane that defines a cutting region and an angle of the IVC was developed. To make the cut and physically separate the IVC from the rest of the anatomy, imported anatomy was first converted to triangular meshes using the mesh filter function in Unity. Triggering a 'Cut' button signals the system to find intersecting points between the virtual plane and each triangle mesh of a vessel. These intersecting points were saved into a 3D Cartesian point array. To generate a new mesh around the cut, a centroid of the array and its two adjacent arrays were connected into triangles. Then, collider was assigned to the mesh for the cut vessel to be grabbed and relocated using the Touch controller.

2.2.2 Parametric Modeling of Conduit. The shape of the conduit is represented by an ellipse, which is generated at the anastomosis region defining the entry angle and the shape of the conduit. To modify the radii of the ellipse, two control points are added on the ellipse (FIG. 28A), which can be grabbed and adjusted by the Touch controller. Then, the ellipse is drawn by finding a set of points on the ellipse by using the user defined radii as input for the polar coordinate equation for a radius. The generated points are then connected to the center of the ellipse by creating triangular meshes forming an elliptical surface. The ellipse is rotated by translating its x, y, and z coordinates around the tangent vector while its normal vector is assigned at the center of the ellipse (FIG. 28A).

Figure 28:
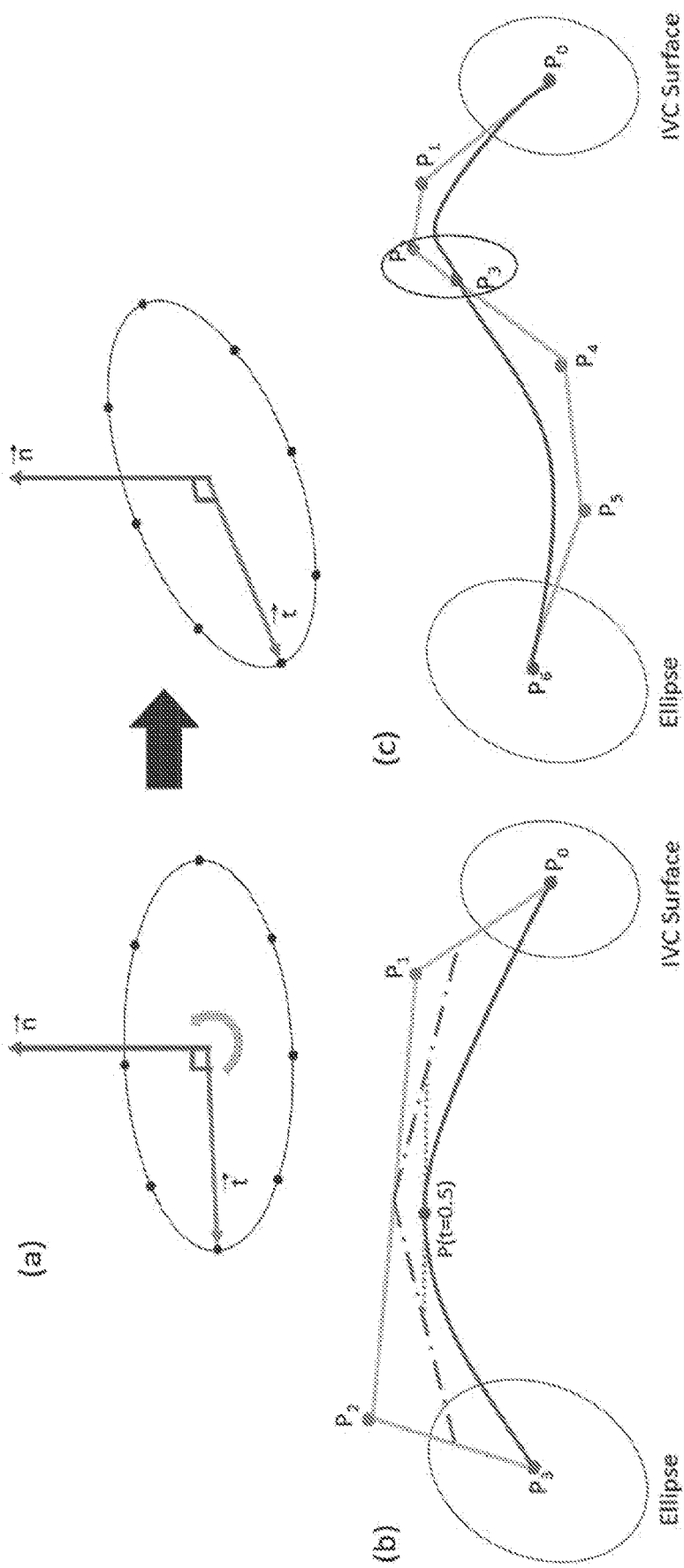
FIG. 28 (Panels A-C) schematically show the parametric design of conduits: (a) rotating ellipse around the normal vector, (b) defining the conduit's pathway using a cubic Bezier curve, and (c) using split cubic Bezier curves.

Cubic Bezier curve is chosen for defining the pathway of the conduit for easy control over tangents and all anchor points being on the pathway. The formula to the pathway is:

$$P(t) = P_0(1-t)^3 + P_1(3t(1-t)^2) + P_2(3t^2(1-t)) + P_3(t^3)$$

where $P_0$ and $P_3$ are the anchor points located at the centers of the cut IVC surface and the ellipse and $P_1$ and $P_2$ are the handles (FIG. 28B). The handles on the Bezier are set perpendicular to the ellipse and the IVC surface as default. For a more complex pathway control, a new anchor point can be added onto the Bezier curve splitting the original Bezier curve into two cubic Bezier curves (FIG. 28C). These additional anchor points also serve as centroids for the new ellipses. This step is reversible by removing the new anchor points and its two adjacent handles.

To connect the ellipses between the sections on the pathway, the following interpolation function is utilized in four steps:

$$\Delta p = p_1 - p_0 = (x_1 - x_0, y_1 - y_0, z_1 - z_0) = (x, y, z) \tag{1a}$$

$$\|\Delta\| = \sqrt{(x^2 + y^2 + z^2)} \tag{1b}$$

$$f(t) = \frac{\arctan\left(7\left(t - \frac{1}{2}\right)\right)}{2.588} + \frac{1}{2} \tag{1c}$$

$$r_t = r_0 + \|\Delta\| \cdot f(t) \tag{1d}$$

where $p_0$ and $p_1$ are 3D coordinates of the anchor points, $\Delta$ is a norm vector showing a total distance between $p_1$ and $p_0$, f(t) is the interpolation adjustment factor at t, t is the location on the Bezier curve, $r_0$ is the radius at point $p_0$, and $r_t$ is the interpolated radius at t, which goes from 0 to 1. At every 3 Unity units, a vertex of an ellipse radii is calculated.

2.2.3 Conduit Freeform Modeling. Freeform modeling enables users to pull or push the mesh by pressing down the trigger button on the Touch controller. To mimic the simplest visualization of clay deformation by fingers, both the pulling (FIG. 30B) and pushing (FIG. 30C) of the mesh is accomplished by using a Gaussian function with ⅓ standard deviation and zero mean. The values between g(0) and g(1) were used to define the strength of the deformation in relation to the distance between the hit point to the adjacent vertices (FIG. 30A). The adjacent vertices represent the coordinates inside the user defined radius boundaries. The radius sets how wide the mesh is deformed. The magnitude is the product of the Gaussian function defined by the user, which controls the strength of the deformation. For a pushing deformation, the sign of the Gaussian function is defined as negative.

III. Experiment

Eight engineers (4 female and 4 male) who were at least 18 years of age and had a minimum of 6 months prior experience in utilizing CAD software, SolidWorks, were recruited for the design comparison study of CAD and CorFix. Of the eight engineers, 6 were PhD students (5 mechanical engineering and 1 computer science) and 2 were graduating seniors of undergraduates (1 mechanical engineering and 1 computer science). Their participation was completely voluntary without any compensation. Each participant received two Fontan surgical cases to design, one case per software to avoid potential learning bias from the first design task. The order of modeling software and surgical cases were randomized using a Latin Square design approach [3]. The surgical cases were prepared as multi-angle and cross-sectional sketches to ensure that 1) prior medical expertise was not necessary for the experiment and 2) the study mimics the workflow where doctors provide 2D drawings of their preference of conduit designs and engineers create the 3D vascular grafts. Providing the 2D drawings allowed both CAD and CorFix to present surgical cases using the same level of depth perception, which ensured that the level of understanding of the surgical cases were identical between the two softwares.

The anatomies of the surgical cases were manually meshed to be compatible with SolidWorks before the experiment, which is not necessary for CorFix SolidWorks was viewed on a 24" Dell P2417 monitor with 1080p screen resolution. Before the experiment, all participants were given a 10-minute tutorial on CorFix. The tutorial entailed 1) adjusting the VR goggle for sizing and focus, 2) controls (e.g. buttons and functions), and 3) CorFix environment. To capture design performances, task completion time and design accuracy (e.g. centerline and girth of the designed vascular grafts) were acquired. All participants filled out the NASA Task Load Index (NASA-TLX) and System Usability Scale (SUS) surveys for assessing perceived workload and usability of each software at the end of each modeling task. This study was approved by the Institutional Review Board (IRB) at the University of Maryland, College Park.

IV. Data Analysis and Results

Figure 31:
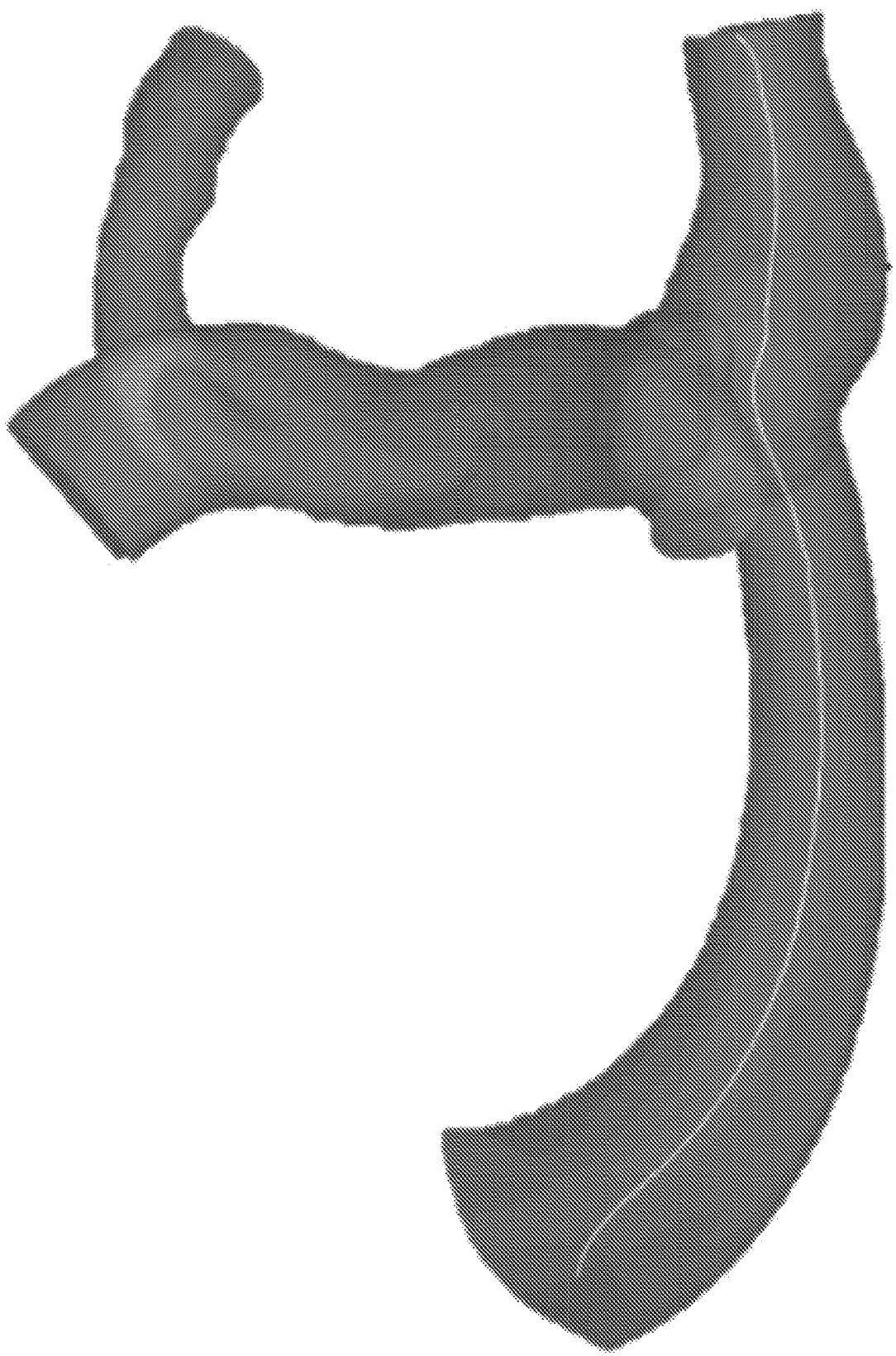
FIG. 31 schematically shows an example of centerline and girth extraction for a Fontan conduit.
Figure 32:
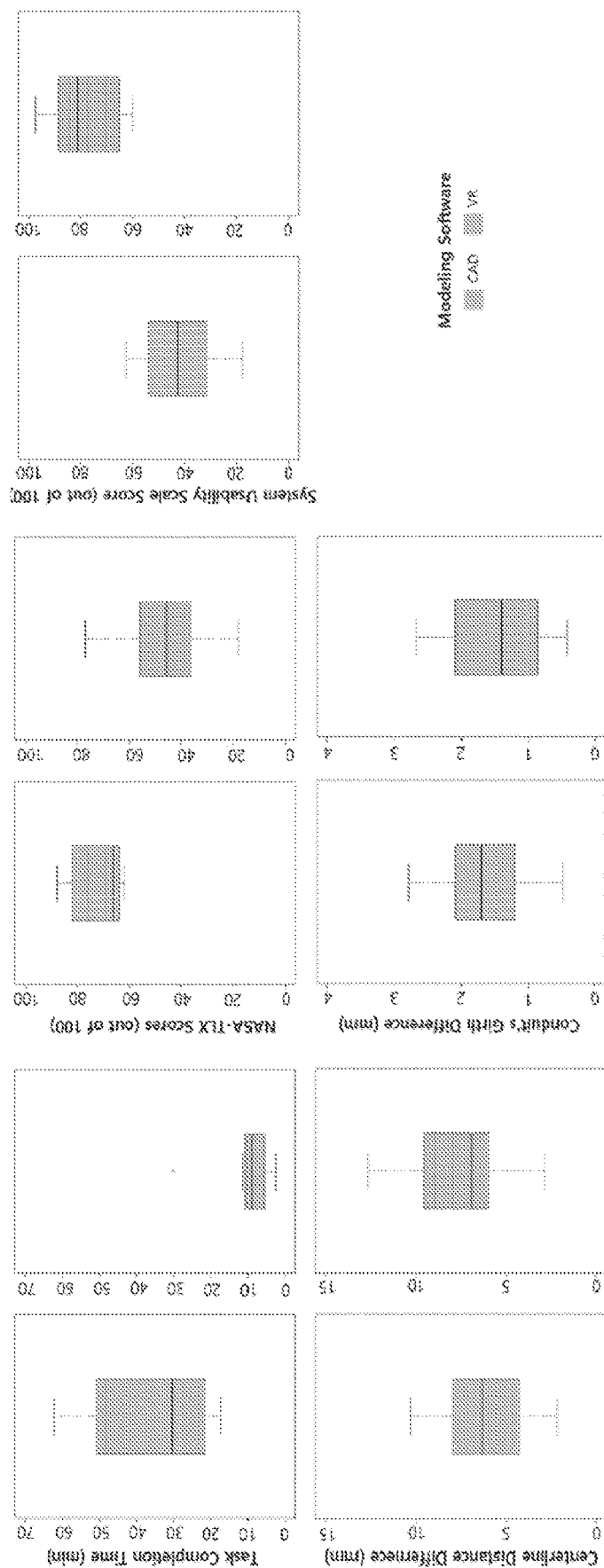
FIG. 32 show boxplots of task durations, NASA-TLX scores, SUS scores, centerline difference, and girth difference for Fontan conduit designs for all eight participants.

The design failure rate was calculated by dividing the number of surgically infeasible designs by the total number of designs. The centerlines and girths of the grafts were extracted using the Vascular Modeling Toolkit (VMTK) as illustrated in FIG. 31. The differences between the centerlines of the surgical case and designed conduits were captured by Euclidean distance. All data was compared between male and female participant groups using unpaired t-test. The averaged centerline and girth differences, task completion time, and NASA TLX and SUS scores between the CAD and VR software were compared by paired t-test. All statistical tests were performed in R 3.6.2 and p-values below 0.05 were deemed statistically significant.

The participants spent an average of 30.27 minutes and 8.98 minutes for completing the design tasks using CAD and CorFix, respectively, which was statistically different (p=0.004). Though the design task using CAD took 3.4 times longer, the design failure rate of CAD was 75% when CorFix was 0%. Of the failed designs in CAD, 5 cases were not fully connected to Glenn and 2 cases did not match the outline of the IVC. All designs, even the failed designs, from both modeling systems had statistically indifferent centerlines (p=0.355) and girth (p=0.667) to the provided surgical cases. The t-test showed that our participants rated CorFix as less perceived workload (p=0.007) and more user friendly system (p<0.001) then CAD. There was no statistical difference in any of the data between the male and female participants.

V. Discussion and Conclusion

Although prior experiences in 3D modeling using SolidWorks, 6 out of 8 participants created surgically infeasible graft designs in CAD. Though CAD provided tools to easily rotate, pan, and zoom in/out of the patient anatomies, the failed designs were not connected to the pulmonary artery or were in the size of the cut vessel. These results showed that despite the numerous tools that CAD provides, without providing specific design parameters and steps, the vascular graft design task remains a challenge to engineers. All graft designs were surgically feasible and the participants' performances were approximately 3.4 times faster in CorFix in spite of the one time 10 minute tutorial. Furthermore, the participants rated higher usability and lower workload scores for CorFix compared to CAD for this patient specific Fontan graft design task. For this experiment, some of the work steps including cutting and relocating inferior vena cava and meshing anatomies were performed for the participants prior to the experiment. Since most CAD software products require significant effort and time for meshing the 3D models to begin the editing process, the difference in task completion time and perceived workload between the CAD and CorFix would have been even greater. Additionally, without a designated surgical features and depth perception, making a cut and relocating a vessel would have been a significant challenge in CAD.

To evaluate the hemodynamic performances of the grafts, 3D modelling is an essential process, which can complement the experience and intuition physicians gain through iterative care of cardiovascular disease. Therefore, engineers, who are not medically trained, can offer significant contributions in designing grafts in 3D CAD software. However, creating patient specific vascular grafts requires an ability to design while visualizing and modifying patient anatomies with accuracy of depth perception, which is quite a challenge in CAD. Lack of medical expertise combined with the challenges faced in CAD results in the design surgically infeasible grafts or grafts that unnecessarily increase the surgical difficulty. Since engineers performed better in CorFix than CAD despite only a 10-minute training session, we hypothesize that our system may be simple but strong enough to allow medical doctors to perform the design task regardless of their engineering backgrounds. By enabling doctors to take over the design task, we remove uncertainty factor of surgical feasibility and preference. We plan to further develop the system by adding another conduit shape, bifurcation, and an automated CFD feature to combine the design and evaluation task in one software. Cardiac surgeons and cardiologists would then be able to simulate surgery in advance and design hemodynamically optimized patient specific vascular grafts in one software.

Example 4: Virtual Cardiac Surgical Planning Through Hemodynamics Simulation and Design Optimization of Fontan Grafts I. Introduction Congenital heart disease (CHD) affects 0.8% of the population, with ¼ of infants requiring life-saving intervention as a neonate. For patients with complex CHD involving a single functioning ventricle, surgeons perform a series of openheart surgeries to modify the venous circulation. The third surgery, the Fontan operation, connects the inferior vena cava into the superior cavopulmonary anastomosis via intracardiac patch (lateral tunnel Fontan) or a conduit (extracardiac Fontan). The Fontan graft's geometry influences hemodynamics of blood flow into the pulmonary arteries, and novel designs such as a y-shaped (bifurcated) graft have been previously proposed. Despite significant development in the Fontan operation, graft designs are still constrained by material type and availability, potentially resulting in suboptimal cardiovascular hemodynamics and post-surgical complications including cardiac performance impairment, pulmonary arteriovenous malformation, and thrombosis. Many studies approached this problem via simulating the blood flow inside Fontan and predicting hemodynamics using the computational fluid dynamics (CFD), none have addressed the risk of thrombosis in a Fontan graft.

The simulation approach can be combined with a manufacturing process using computer-aided design (CAD), CFD and electrospinning of tissue-engineered vascular grafts (TEVGs) to create patient-specific designs as part of virtual surgical planning. With the use of these, patient-specific Fontan graft designs may be the key to improving the quality of surgery and patient outcomes. As patient-specific Fontan grafts become closer to reality, we continue to refine the workflow of virtual surgical planning by identifying an accurate, time-efficient and clinically relevant CFD approach to virtual surgical planning of Fontan grafts. The objective of this study is to investigate and propose the best set of CFD parameters (i.e. meshing strategy, wall layering, and CFD solver choice) for the Fontan circulation simulation. Additionally, along with CFD simulation of conventional hemodynamic parameters such indexed power loss and hepatic flow distribution (CFD), we introduce a novel hemodynamic parameter, non-physiological wall shear stress, that acts as a surrogate for risk of thrombosis.

II. Methods

Figure 33:
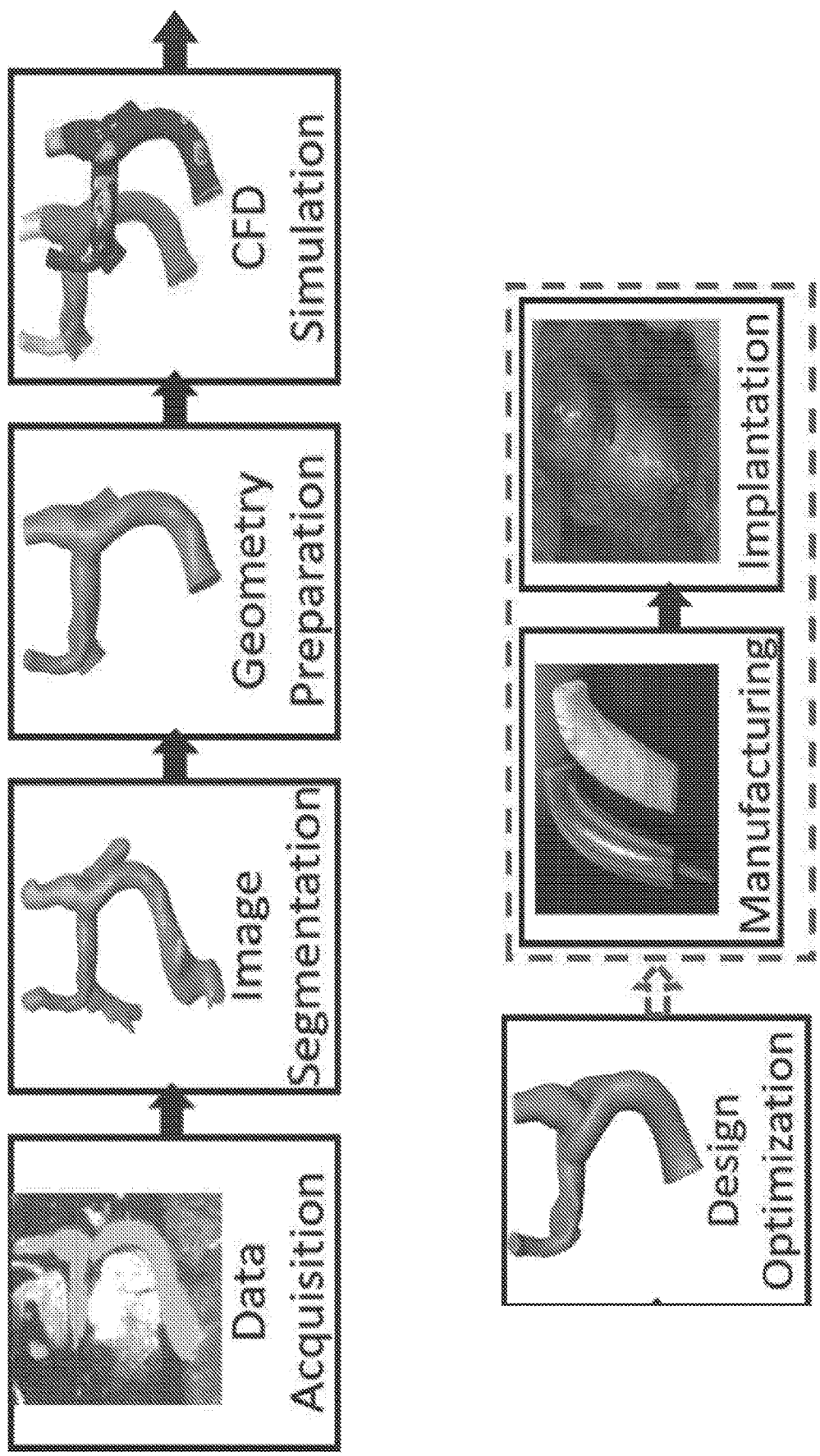
FIG. 33 schematically show a workflow diagram of the virtual Fontan design optimization.

This section summarizes the sequential steps for simulating and optimizing the Fontan designs. Our approach consists of seven steps (see FIG. 33) including two previously reported steps on manufacturing and implanting patient specific 3D printed grafts, which we will combine in the future for improving Fontan surgeries. Sections 2.1 and 2.2 of this Example entails the methods for MRI data acquisition (i.e. anatomy and boundary flow data), image segmentation, and geometry preparation. Section 2.3 of this Example lays out the details of the CFD simulation (i.e. meshing, number of wall layers, and solver settings). Based on the calculated hemodynamics, various Fontan design parameters are optimized in three iterations to correct the flow and pressure in the graft, which is explained in Section 2.4 of this Example.

2.1 Data Acquisition and Image Segmentation

The magnetic resonance angiogram (MRA) data, consisting of a late-phase, nongated, breath-held acquisition with pixel size ~1.4×1.4 mm, served as a roadmap to build a 3-dimensional (3D) Fontan model, including the proximal cavae and branch pulmonary arteries, using a commercially available image segmentation software (Mimics; Materialise, Leuven, Belgium). Both automatic thresholding and manual methods were used to identify the blood pool of the Fontan in each slice of the angiogram, allowing for the creation of a 3D Fontan model them exported using the stereolithography (STL) file format. This STL file was hollowed and smoothed. Following, retrospectively-gated, through plane phase-encoded velocity maps were acquired across the IVC, SVC, LPA, and RPA using standard sequences, reconstructing 30 phases per cardiac cycle with a velocity encoding threshold of 150 cm/second. The time-averaged IVC and SVC flow rates were derived from the phase velocity data and prescribed as inlet boundary conditions to the CFD simulations. The time-averaged RPA and LPA flow rates were prescribed as outlet flow splits (the ratio of LPA to RPA). All patient data was collected with the Institutional Review Board approval.

2.2 Geometry Preparation

All models were modified by a "Deform" function which globally smooth out the models' surfaces, reducing irregular surfaces, using Meshmixer (Autodesk Inc., San Rafael, CA). Deformation of the original model from smoothing was minimized by applying "Shape Preserving" method. Since the smoothed models were extremely fine meshed and caused some software to crash, the mesh size was reduced by 50%, leaving us with around 30,000 triangles per model. Then, 50 mm long extensions were added at each end of the boundaries for two important purposes. The inlet extensions enabled the velocity profiles to fully develop before the blood enters the computationally interesting areas. The outlet extensions allowed the numerical flow data to stabilize and provide more accurate results. The boundary cuts were adjusted in CAD (SolidWorks, Dasault, France) to ensure smooth extensions of the boundaries. The final model was converted into the text-based Parasolid file and showed improved cell qualities including aspect ratio, maximum skewness, and minimum orthogonal values (Table 6), the deterministic features for the numerical computation accuracy and stability.

TABLE 6

Impact of Smoothing and Cutting on Cell Quality

| | Designed model | Aspect ratio | Max skewness | Min orthogonal |
|---|---|---|---|---|
| P1 | Non-edited | 30.303 | 0.975 | 2.548e−2 |
| | Smoothed | 17.355 | 0.917 | 8.310e−2 |
| | Smoothed & cut | 16.927 | 0.802 | 0.198 |
| P2 | Non-edited | 32.315 | 0.927 | 7.309e−2 |
| | Smoothed | 17.602 | 0.817 | 0.183 |
| | Smoothed & cut | 17.005 | 0.797 | 0.203 |

2.3 CFD Simulation

Performance Metric. The blood flow inside the Fontan graft was virtually simulated through CFD (ANSYS, Pennsylvania, USA) to determine its performance by the indexed power loss (iPL), hepatic flow distribution (HFD), and the non-physiological wall shear stress percentage (% WSS). iPL, a deterministic factor of the abrupt blood flow changes causing cardiac performance impairment, was calculated using the Eq. 1, derived from power loss (Eq. 2):

$$iPL = \frac{PL}{\rho Q_s^3 / BSA^2} \quad (1)$$

-continued $$PL = \sum_{inlets} \int_A \left(p + \frac{1}{2}\rho v^2\right) v \times dA - \sum_{outlets} \int_A \left(p + \frac{1}{2}\rho v^2\right) v \times dA \qquad (2)$$

where p being the static pressure, ρ the density, A the boundary area, v the velocity, $Q_s$ the systemic venous flow, and the BSA the body surface area. Unbalanced HFD overstresses the heart and progresses malformation of pulmonary arteriovenous. HFD was estimated by computing the ratio of the number of particles passed through each outlet from the IVC. The particles at the IVC were evenly spaced with a 0.1 mm marker size and 1 mm spacing factor setting. The percentage of Fontan and outlet areas falling below 1 dynes/cm² in WSS were estimated since the low WSS represents the low-flow in venous stasis causing deposition of procoagulant. In summary, Fontan models with iPL lower than 0.03, HFD between 40:60 or 60:40, and % WSS below 10% were considered to have healthy hemodynamic performance.

Meshing. Mesh size was tested to bolster the computation accuracy and time efficiency. The meshing could either be uniform where the elements are roughly the same size or non-uniform with a max element size defined. Our test runs confirmed that the CFD results between uniform and non-uniform were similar, but non-uniform meshing performed much faster (see Table 7). Following, the max element sizes, between 0.7 mm to 1.5 mm, were tested to identify the best size for creating mesh around the sharp corners and minimize numerical errors (Table 8). The recommended minimum orthogonal quality is 0.01, and only the 0.7 mm max mesh size was able to get sufficing values. Also considering that the lowest aspect ratio and lowest max skewness was with 0.7 mm, a max element size of 0.7 mm was selected for non-uniform meshing.

TABLE 7

Hemodynamics Results Between Non-uniform and Uniform Meshing

| Simple, 0.7 mm, 5 layers | | iPL | HFD (LPA %) | % WSS | Computing time (hr:min) |
|---|---|---|---|---|---|
| P1 | Non-uniform | 0.036 | 57.68 | 1.035 | 15:12 |
|  | Uniform | 0.036 | 58.08 | 1.128 | 39:21 |
| P2 | Non-uniform | 0.008 | 33.25 | 13.628 | 14:52 |
|  | Uniform | 0.008 | 31.80 | 13.323 | 18:02 |

TABLE 8

Impact of Max Element Size on Cell Quality

| Original model | | Aspect ratio | Max skewness | Min orthogonal |
|---|---|---|---|---|
| P1 | 0.70 mm | 15.004 | 0.887 | 0.114 |
|  | 1.00 mm | 23.259 | 0.953 | 4.697e−2 |
|  | 1.25 mm | 19.017 | 0.944 | 5.571e−2 |
|  | 1.50 mm | 16.492 | 0.912 | 8.844e−2 |
| P2 | 0.70 mm | 18.069 | 0.883 | 0.117 |
|  | 1.00 mm | 20.615 | 0.906 | 9.384e−2 |
|  | 1.25 mm | 19.197 | 0.931 | 6.928e−2 |
|  | 1.50 mm | 19.451 | 0.937 | 6.318e−2 |

Wall Layer. The number of wall layers was explored to obtain accurate WSS measurements. Considering previously reported wall layer values, the range of three to six was tested. These variations had minimal impact on the Fontan hemodynamics and the computing time (Table 9). Thus, the study concluded to use five layers, which is the default setting in ANSYS.

TABLE 9

Hemodynamics Results Under the Varying Number of Wall Layers

| PISO, 1.25 mm | | iPL | HFD (LPA %) | % WSS | Computing time (hr:min) |
|---|---|---|---|---|---|
| P1 | 3 | 0.0355 | 57.69 | 0.90 | 13:04 |
|  | 4 | 0.0357 | 57.62 | 0.92 | 14:11 |
|  | 5 | 0.0360 | 57.90 | 1.03 | 15:12 |
|  | 6 | 0.0362 | 58.45 | 1.06 | 15:15 |
| P2 | 3 | 0.0083 | 32.74 | 13.32 | 14:42 |
|  | 4 | 0.0082 | 32.94 | 13.51 | 14:41 |
|  | 5 | 0.0082 | 32.97 | 13.56 | 14:51 |
|  | 6 | 0.0083 | 33.08 | 13.29 | 14:17 |

Solver. We compared the pressure-based segregated algorithms including simple, coupled, and PISO. Despite the PISO and coupled algorithms known to be computationally heavy but more accurate, results were close to that of simple algorithm (Table 10). Hence, simple solver was applied to solve the laminar flow, which was confirmed by the Reynolds number. The simulated blood was assumed to be a Newtonian fluid with 1060 kg/m3 density and 3.71 mPas viscosity [13]. Our CFD simulation used the 3D unsteady Navier-Stokes equations with 40 iterations with each iteration timestep lasting 0.001s. The x,y,z-velocity and mass conservation residual convergence values were set to $10^{-5}$.

TABLE 10

Hemodynamics Results Under Various Solver Algorithms

| 0.7 mm, 5 layers, non-uniform | | iPL | HFD (LPA %) | % WSS | Computing time (hr:min) |
|---|---|---|---|---|---|
| P1 | Simple | 0.036 | 57.68 | 1.035 | 13:65 |
|  | Coupled | 0.036 | 58.02 | 0.998 | 18:51 |
|  | PISO | 0.035 | 57.89 | 1.075 | 15:12 |
| P2 | Simple | 0.008 | 33.25 | 13.628 | 08:23 |
|  | Coupled | 0.008 | 33.28 | 13.863 | 23:54 |
|  | PISO | 0.008 | 33.23 | 13.647 | 14:52 |

2.4 Design Optimization

Figure 34:
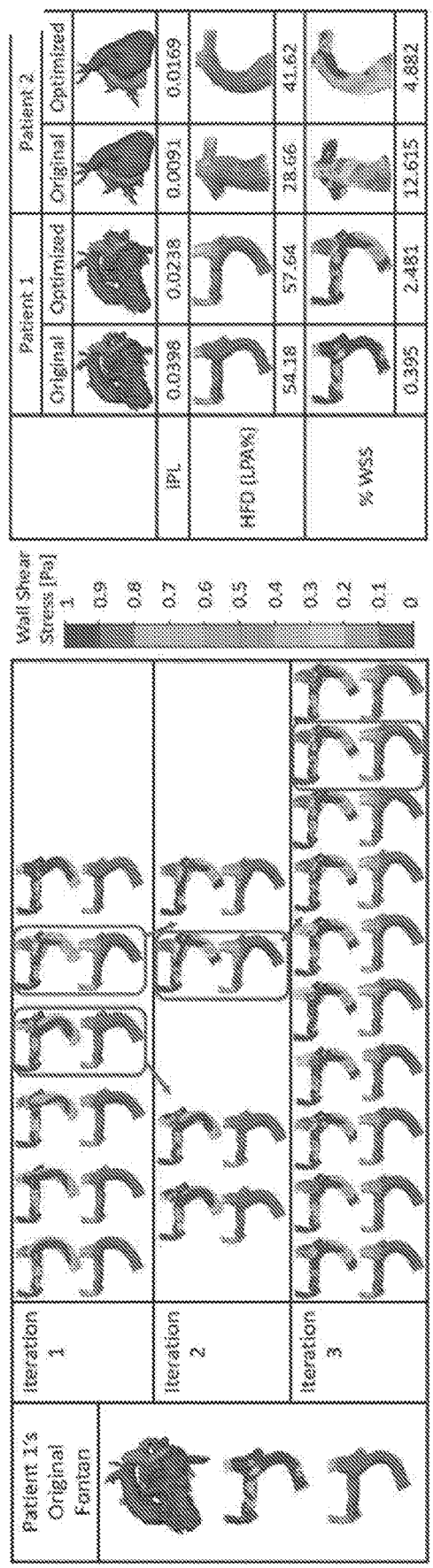
FIG. 34 show iterative design for optimizing the first patient's Fontan graft (Left), and a comparison of performance for original and optimized Fontan grafts (Right).

Fontan grafts were optimized by three consecutive iterations of design modifications based on the patient's anatomy and the performance metric results (FIG. 34). The first iteration included identifying possible paths and anastomoses regions with the assistance of experienced cardiologists. The possible paths avoided colliding with the surrounding anatomy, including heart, major vessels, and spine. Then, the surgically adequate tube-shaped and the y-shaped (bifurcated) Fontan grafts were designed. For a tube-shaped graft, a 3D spline was drawn between 2 points. The starting point was placed at the center of the IVC and the end point was chosen at the center of an ellipse drawn on the identified anatomoses region at the SVC. The IVC's outline and the ellipse on the SVC with the 3D spline as the centerline were selected for 3D lofting. For easier spline control, 1 or 2 extra points along the intended spline path were added. The bifurcated graft was made with two ellipses on the SVC and connecting it with the IVC using the 2D surface loft function in CAD. Manipulating the curvature of the graft was accomplished by adding an ellipse in between the SVC and IVC, similar to adding 1 or 2 spline points for a tube-shaped graft. The bifurcated Fontan grafts were not always feasible if the identified path was too narrow for two ellipses to be connected. The second iteration involved changing the geometrical parameters of the prior designs considering the hemodynamic performance. The entry angle and the center curve of the Fontans were adjusted when the iPL was higher than 0.03. The location, dimensions, and angles of the ellipse on the anastomoses region acted as the manipulator tool of the direction and the amount of the inlet flow heading to Glenn, adjusting the HFD. High % WSS was controlled by reducing the girth of the Fontans. The significance of each geometrical parameter on the hemodynamic performance was summarized and applied for making slight adjustments to further improve Fontan performance during the third iteration. The Fontan grafts were optimized to achieve the lowest iPL, while maintaining below 10% for % WSS and between 40:60 and 60:40 HFD.

III. Result

The Fontan grafts were optimized hemodynamically for each patient (FIG. 34) using our approach. The optimized Fontan designs had significant improvements on hemodynamics with 40% decrease in iPL for patient one (P1) with a y-shaped graft and 45% increase in flow distribution to the LPA and 61% reduction in % WSS for the second patient (P2) with a tube-like graft.

IV. Discussion and Conclusion

We developed 3 benchmark parameters that were based off Haggerty et al.'s larger CFD cohort simulation of 100 patients [Haggerty, C. M., et al.: Fontan hemodynamics from 100 patient-specific cardiacmagnetic resonance studies: a computational fluid dynamics analysis. J Thorac. Cardiovasc. Surg. 148(4), 1481-1489 (2014)]. This ensured providing patientspecific designs in the hemodynamic optimal when compared to other Fontan patients. % WSS is completely a novel parameter, but is based on relevant clinical data and should be incorporated in all Fontan simulations moving forward. Of note, our method creates a tradeoff between iPL and risk of thrombosis, as larger Fontan grafts will have less power loss but increased risk of thrombosis. This is clinically appropriate given the risk of thrombosis in patients with Fontans.

Reducing computational time whilst maintaining accuracy allows more time for feedback from the surgeon and the design team before the Fontan operation. Inevitable, some adjustments are needed in the initial proposed designs, and shorter computational time allows for more design iterations. Our decisions on CFD simulations were made to balance the accuracy and computational time. Rigid wall was assumed in the current CFD simulations. However, fluid-structure interaction is known to provide higher accuracy in WSS calculation and should be implemented in future studies.

This study introduces the unique virtual simulation workflow and computational fluid dynamics for optimizing the Fontan graft design. The re-designed Fontan grafts of two patients using this approach showed significant improvements in hemodynamic parameters (i.e. iPL, HFD, and % WSS). We believe that our unique integration of surgical design and flow simulation has the potential to enable cardiac surgeons to effectively simulate patient specific designs for the Fontan operation, potentially improving the surgical outcomes of patients with complex CHD. Future studies will entail applying this approach on more patient models and manufacturing the designs for implantation.

Example 5: Implantation of Cardiovascular Grafts with In Vivo Testing

Although synthetic Fontan conduits are fixed in size, patients grow immensely after the surgical repair. This puts newborns with congenital cardiac abnormalities at an increased risk of conduit complications such as rapid graft dysfunction, anastomotic stricture formation, size mismatch related geometric disruption, and pulmonary artery obstruction. The lack of growth potential and suboptimal biocompatibility in synthetic conduits can be addressed using customized conduits that are printed using electrospinning technology. Here, we investigate the feasibility of performing vascular repair using a customized and electrospun conduit.

5.1 Exploration of Mandrel Designs for Electrospinning Customized Conduits

Figure 35:
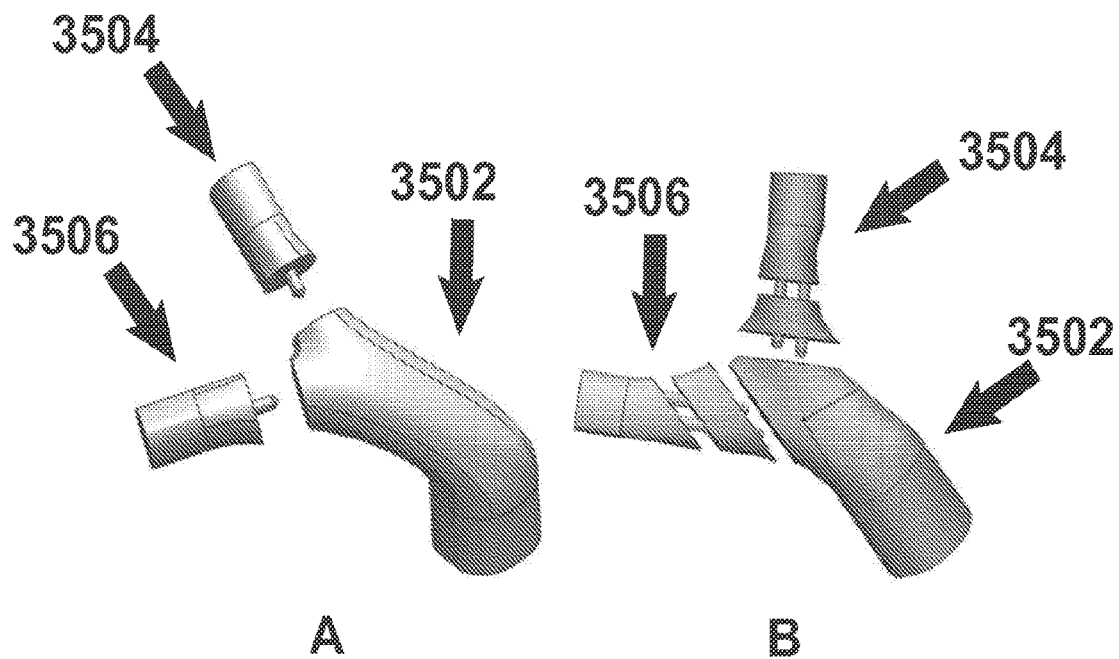
FIGS. 35 A and B schematically illustrate three-part piece and five-part piece mandrel designs, respectively, according to exemplary embodiments.

Creating a customized TEVG using electrospinning technique typically involves a metal collector, a mandrel, in the desired shape of the final scaffold. Depends on the design structure of the mandrel, removing the final scaffold without damage can be a challenge. Since electrospinning works by extruding fiber out onto the rotating mandrel, a complex geometry may have spots with uneven thickness inducing the chance of rupture. To identify the solutions to these challenges, two mandrel separation designs, a three-part piece FIG. 35A and a five-part piece FIG. 35B, and three mandrel handle designs were investigated. The three-part piece mandrel (FIG. 35A) consisted of the main pulmonary artery (MPA) 3502, right pulmonary artery (RPA) 3504, and left pulmonary artery (LPA) 3506. To remove the MPA without stretching or ripping a scaffold, the boundaries of the LPA and RPA were set at the region where the flaring at the MPA was minimized. The three bodies were held together during the rotation by the 2.5 mm diameter and 5 mm long cylindrical extrusions made perpendicular to the center of the LPA and RPA being flushed into the MPA. For easier insertion of the cylindrical extrusions, its tip was chamfered at 45°. This design approach well protected the scaffold at the MPA region but removing other pieces without ruining the scaffold was still a challenge. As a remedy, additional separations were made on the LPA and RPA resulting in the five-part piece (FIG. 36C) approach. The five-part piece consisted of MPA 3602, distal RPA 3604, proximal RPA 3606, distal LPA 3608, and proximal LPA 3610. The five-part piece design involved pulling out the proximal PAs followed by the MPA to let the flared regions, distal PAs, easily slip out from the MPA path. To secure all parts during the rotation, two parallel cylindrical extrusions were made at the proximal PAs. These extrusions were made long enough to penetrate both the distal PAs and the MPA.

Figure 36:
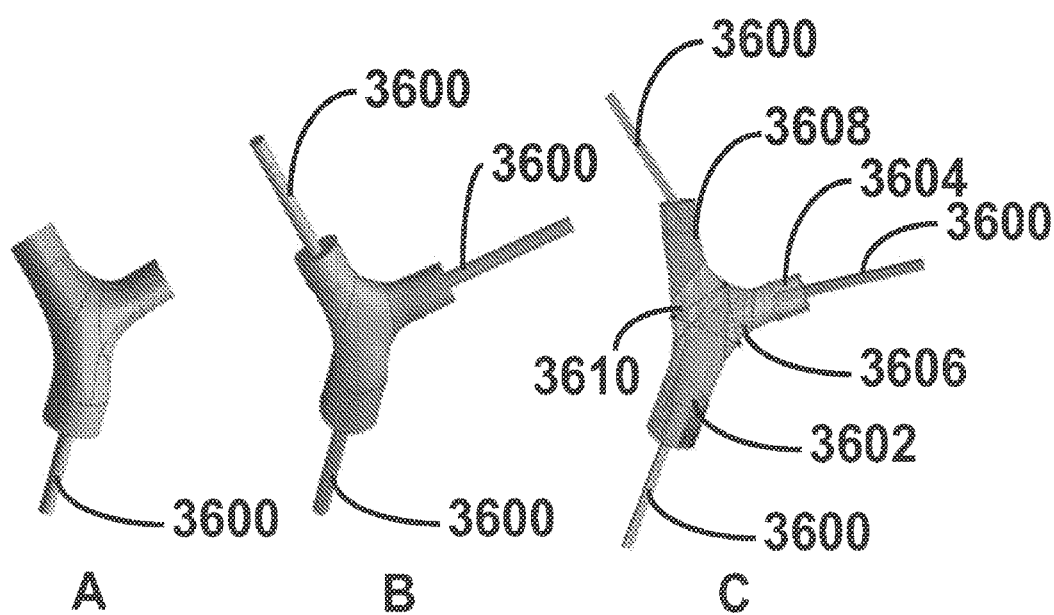
FIG. 36 A-C schematically illustrate three modifications of the handles (A: one cylindrical handle, B: cylindrical handle at each ending, and C: square cylindrical handles at each ending) according to exemplary embodiments.

Unevenly printed spots on the scaffold were avoided by exploring different designs of the handles 3600, which are clamped for rotating the mandrels. The first design attempt involved attaching a 50 mm long cylindrical handle at the bottom of the MPA (FIG. 36A). The printed conduits, however, showed overly thin layered regions at the flaring locations that are perpendicular to the handle 3600. To address this issue, cylindrical holders 3600 were added perpendicularly to each end (FIG. 36B). Installing three cylindrical holders enabled modifying the rotational axis of the mandrel which covered some portions of the flaring regions. Yet, the fiber still could not be emitted onto the deepest curve at each flaring region and the handles could not keep the mandrel secured during the rotation. The further modification, therefore, included making a square cylinder at each ending that was perpendicular to the invisible lines connecting the two nearest points representing the deepest curve at the flaring regions (FIG. 36C).

Figure 37:
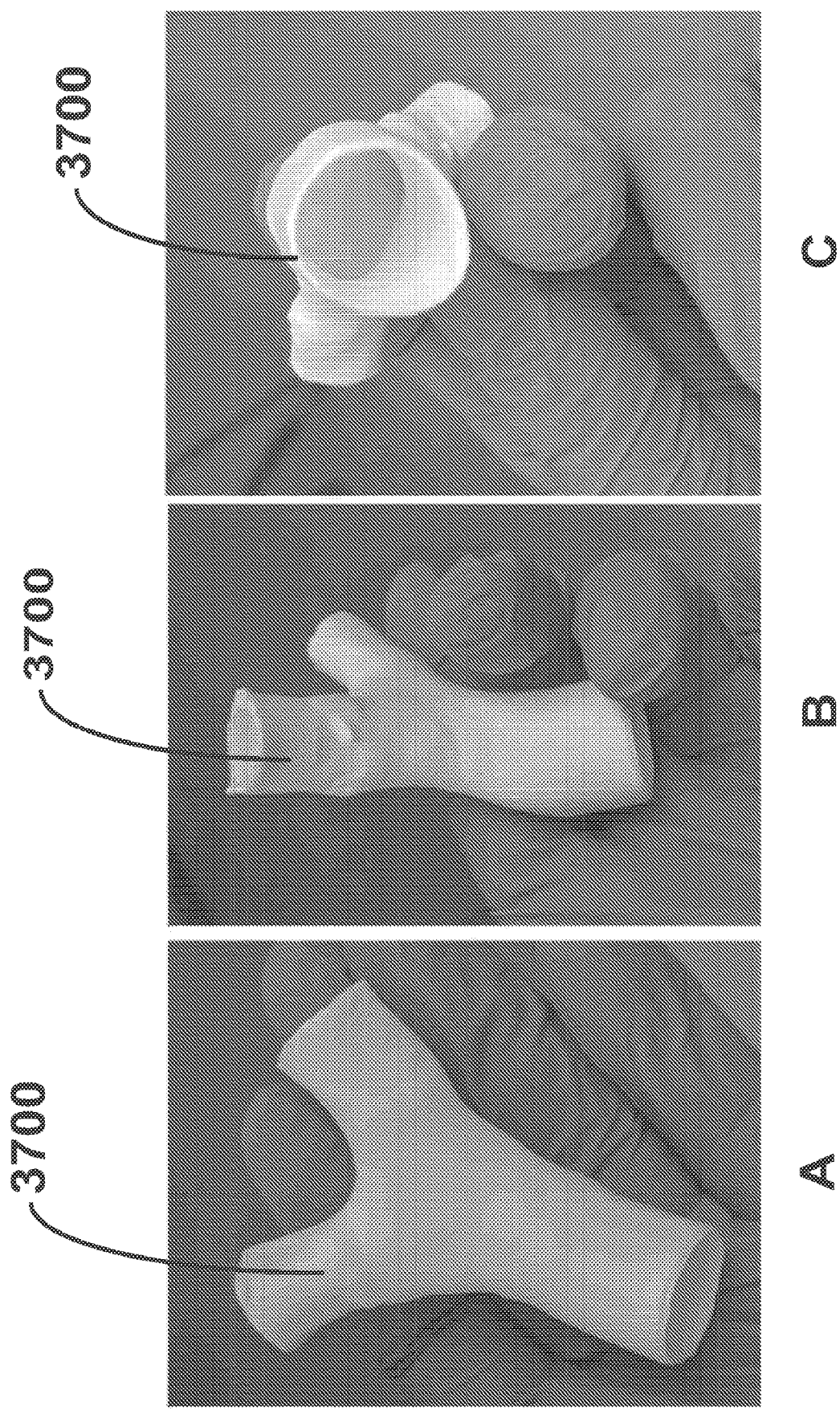
FIG. 37 A-C show images of an exemplary electrospun customized conduit from various angles.

The conduit mandrels that incorporated the five-piece part and three square cylinder holders were 3D printed in titanium with the confirmation of the stability, spinnability, and consistency of electrospinning. Then, the biodegradable nanofiber material composed of a 1:1 ratio of polycaprolactone (PCL) and poly-L-lactide-co-ε-caprolactone (PLCL) were used to coat the 3D printed mandrels (Nanofiber Solutions, OH). After depositing the fibers, the mandrels were disassembled and the remaining grafts 3700 (FIGS. 37 A-C) was placed in a standard Tyvek pouch and sterilized using vaporized hydrogen peroxide and ozone (STERIZONE VP4, Getinge, NY).

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, devices, systems, computer readable media, and/or component parts or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. A method of generating an optimized model of a vascular graft for a subject at least partially using a computer, the method comprising:
   parameterizing, by the computer, at least one model of a candidate vascular graft for the subject using a plurality of parameters to produce at least one parameterized model of the candidate vascular graft, wherein the plurality of parameters comprises a 10-dimensional design space x={a, b, α, β, ΔL, $D_{12}$, $v_1$, $v_2$, θ, $D_{45}$}∈$R^{10}$, where a and b comprise connection radii, α and β comprise connections angles for the model of the candidate vascular graft, ΔL comprises an offset, $D_{12}$ is a first distance, $v_1$ is a Euclidean distance between two selected points, $v_2$ is a distance between two selected points, θ is an azimuth angle between a reference direction R and a direction of $v_1$, and $D_{45}$ is a second distance;
   generating, by the computer, one or more surrogate models of hemodynamics of the parameterized model of the candidate vascular graft to produce at least one surrogate model of the parameterized model of the candidate vascular graft;
   generating, by the computer, at least one constrained optimization from the surrogate models of the parameterized model of the candidate vascular graft; and,
   identifying, by the computer, at least one set of globally optimal design parameters from the constrained optimization, thereby generating the optimized model of the vascular graft for the subject.

2. The method of claim 1, comprising producing the surrogate models using at least one machine learning technique.

3. The method of claim 2, wherein the machine learning technique comprises a Gaussian process regression.

4. The method of claim 1, further comprising fabricating a vascular graft using the optimized vascular graft model to produce a fabricated vascular graft.

5. The method of claim 4, further comprising implanting the fabricated vascular graft into the subject.

6. The method of claim 1, comprising segmenting one or more images from the subject to produce the surrogate models of hemodynamics of the parameterized model of the candidate vascular graft.

7. The method of claim 1, wherein α is in a range of about [−45°,45°], β is in a range of about [135°,180°], and θ is in a range of about [0°,360°].

8. The method of claim 1, comprising performing one or more hemodynamic simulations to produce the surrogate model of the parameterized model of the candidate vascular graft.

9. The method of claim 1, comprising producing the surrogate model of the parameterized model of the candidate vascular graft using a conduit modeling algorithm with input comprising one or more sampled design parameters $x_s$, a superior cavopulmonary connection (SCPC) model for one or more extracting centerlines, and an inferior vena cava (IVC) model for specifying a surgical cutting surface, and with output comprising a conduit mesh model and a model quality indicator $N_v$.

10. A method of generating an optimized vascular graft model for a subject at least partially using a computer, the method comprising:
    defining, by the computer, a design space for the vascular graft model, which design space comprises a set of design parameters, a set of pre-operative boundary conditions, at least one uncertainty model of the graft anastomosis location (U1), at least one uncertainty model of the graft anastomosis orientation (U2), and at least one uncertainty model of the pre-operative boundary conditions (U3);
    collecting, by the computer, a set of training data by sampling the design space and computing one or more hemodynamic simulations to produce one or more surrogate models;
    performing, by the computer, at least one constrained optimization using the surrogate models; and,
    determining, by the computer, at least one set of globally optimal design parameters from the constrained optimization, thereby generating the optimized vascular graft model for the subject.

11. A system, comprising at least one controller that comprises, or is capable of accessing, computer readable media comprising non-transitory computer executable instructions which, when executed by at least one electronic processor, perform at least:
    parameterizing at least one model of a candidate vascular graft for a subject using a plurality of parameters to produce at least one parameterized model of the candidate vascular graft, wherein the plurality of parameters comprises a 10-dimensional design space x={a, b, α, β, ΔL, $D_{12}$, $v_1$, $v_2$, θ, $D_{45}$}∈$R^{10}$, where a and b comprise connection radii, α and β comprise connections angles for the model of the candidate vascular graft, ΔL comprises an offset, $D_{12}$ is a first distance, $v_1$ is a Euclidean distance between two selected points, $v_2$ is a distance between two selected points, θ is an azimuth angle between a reference direction R and a direction of $v_1$, and $D_{45}$ is a second distance;
    generating one or more surrogate models of hemodynamics of the parameterized model of the candidate vascular graft to produce at least one surrogate model of the parameterized model of the candidate vascular graft;
    generating at least one constrained optimization from the surrogate models of the parameterized model of the candidate vascular graft; and, identifying at least one set of globally optimal design parameters from the constrained optimization.

12. The system of claim 11, wherein the instructions further perform at least:
producing the surrogate models using at least one machine learning technique.

13. The system of claim 12, wherein the machine learning technique comprises a Gaussian process regression.

14. The system of claim 11, wherein the instructions further perform at least:
introducing one or more uncertainty models into the design space and/or when performing the constrained optimization.

15. The system of claim 11, wherein the instructions further perform at least:
defining one or more blood flow boundary conditions (BCs) of the vascular graft model.

16. The system of claim 11, wherein the instructions further perform at least:
obtaining magnetic resonance angiography (MRA) data for a heart and vascular geometry of the subject, and/or phase-contrast MRI (PC-MRI) data of the subject for determining blood flow data for a computational fluid dynamics (CFD) simulation.

17. The system of claim 11, wherein the instructions further perform at least:
obtaining one or more images of one or more blood vessels of the subject to generate image data.

18. The system of claim 11, wherein the instructions further perform at least:
segmenting one or more images from the subject to produce the surrogate models of hemodynamics of the parameterized model of the candidate vascular graft.

19. The system of claim 11, wherein $\alpha$ is in a range of about $[-45°,45°]$, $\beta$ is in a range of about $[135°,180°]$, and $\theta$ is in a range of about $[0°,360°]$.

20. The system of claim 11, wherein the instructions further perform at least:
producing the surrogate model of the parameterized model of the candidate vascular graft using a conduit modeling algorithm with input comprising one or more sampled design parameters $x_s$, a superior cavopulmonary connection (SCPC) model for one or more extracting centerlines, and an inferior vena cava (IVC) model for specifying a surgical cutting surface, and with output comprising a conduit mesh model and a model quality indicator $N_v$.

* * * * *